(12) United States Patent
Chen et al.

(10) Patent No.: US 12,456,063 B1
(45) Date of Patent: *Oct. 28, 2025

(54) TOPOLOGICAL ORDER DETERMINATION IN CAUSAL GRAPHS

(71) Applicant: SAS Institute Inc., Cary, NC (US)

(72) Inventors: Xilong Chen, Chapel Hill, NC (US); Sylvie Tchumtchoua Kabisa, Morrisville, NC (US); Dillon Frame, Chapel Hill, NC (US); Ming-Chun Chang, Cary, NC (US); Wanxi Gu, Beijing (CN); Gunce Eryuruk Walton, Raleigh, NC (US); David Bruce Elsheimer, Clayton, NC (US); Chuan Xu, Morrisville, NC (US)

(73) Assignee: SAS Institute Inc., Cary, NC (US)

( * ) Notice: Subject to any disclaimer, the term of this patent is extended or adjusted under 35 U.S.C. 154(b) by 1 day.

This patent is subject to a terminal disclaimer.

(21) Appl. No.: 19/175,902

(22) Filed: Apr. 10, 2025

Related U.S. Application Data

(63) Continuation of application No. 18/947,502, filed on Nov. 14, 2024, now Pat. No. 12,314,874.

(51) Int. Cl.
*G06N 5/04* (2023.01)
*G06N 20/00* (2019.01)

(52) U.S. Cl.
CPC .............. *G06N 5/04* (2013.01); *G06N 20/00* (2019.01)

(58) Field of Classification Search
CPC ................................ G06N 20/00; G06N 5/04
See application file for complete search history.

(56) References Cited

U.S. PATENT DOCUMENTS

| | | | |
|---|---|---|---|
| 11,443,198 B1* | 9/2022 | Chen | ................... G06F 17/16 |
| 12,056,207 B1 | 8/2024 | Chen et al. | |
| 2018/0011882 A1 | 1/2018 | Taylor | |
| 2022/0108334 A1 | 4/2022 | Chauhan | |
| 2023/0138016 A1 | 5/2023 | Kaiser | |
| 2025/0045263 A1 | 2/2025 | Chen et al. | |
| 2025/0045355 A1 | 2/2025 | Chen et al. | |
| 2025/0045611 A1 | 2/2025 | Chen et al. | |

(Continued)

OTHER PUBLICATIONS

Wang, "Learning directed acyclic graphs via bootstrap aggregating", 2014. (Previously supplied). (Year: 2014).*

(Continued)

*Primary Examiner* — Dave Misir
(74) *Attorney, Agent, or Firm* — Bell & Manning, LLC

(57) ABSTRACT

A system and method include generating a topological order of a DAG by creating residual series vectors, calculating normality statistic and MSE values for the residual series vectors, comparing the normality statistic values with a critical value, for each normality statistic value that is less than or equal to the critical value, adding a variable index to a temporary order list and the MSE value to an MSE list, counting a number of elements in the temporary order list, if the number of elements in the temporary order list is zero, updating an order list based on the normality statistic values or if the number of elements in the temporary order list is not zero, updating the order list based on at least one of the temporary order list or the MSE list, and outputting the order list as the topological order of the DAG.

27 Claims, 38 Drawing Sheets

(56) References Cited

U.S. PATENT DOCUMENTS

2025/0053615 A1     2/2025     Chen et al.

OTHER PUBLICATIONS

Non-Final Office Action in U.S. Appl. No. 19/020,125 dated May 9, 2025, 24 pages.

Final Office Action in U.S. Appl. No. 118/905,480 dated Apr. 30, 2025, 66 pages.

Non-Final Office Action in U.S. Appl. No. 18/751,584 dated Apr. 24, 2025, 59 pages.

Yi Wang, Yi Li, Hongbao Cao, Momiao Xiong, Yin Yao Shugart, and Li Jin. "Efficient test for nonlinear dependence of two continuous variables." BMC bioinformatics 16 (2015): 1-8.

James H. Goodnight, "A Tutorial on the SWEEP Operator" (Aug. 1979) pp. 149-158.

Rolland, P., Cevher, V., Kleindessner, M., Russell, C., Janzing, D., Schölkopf, B., & Locatello, F. (2022). Score matching enables causal discovery of nonlinear additive noise models. In International Conference on Machine Learning (pp. 18741-18753). PMLR.

Montagna, F., Noceti, N., Rosasco, L., Zhang, K., & Locatello, F. (2023). Scalable causal discovery with score matching. In Conference on Causal Learning and Reasoning (pp. 752-771). PMLR.

"Anderson-Darling Test." In Wikipedia, The Free Encyclopedia. Feb. 24, 2024. https://en.wikipedia.org/wiki/Anderson%E2%80%93Darling_test.

Li, Adam. dodiscover.toporder.SCORE. 2024. https://www.pywhy.org/dodiscover/dev/generated/dodiscover.toporder.SCORE.html.

Non-Final Office Action issued Sep. 29, 2024 for U.S. Appl. No. 18/751,509, 14 pages.

Non-Final Office Action issued Sep. 29, 2024 for U.S. Appl. No. 18/751,584, 15 pages.

Non-Final Office Action issued Oct. 11, 2024 for U.S. Appl. No. 18/761,865, 17 pages.

"Erdös-Rényi model." Wikipedia, The Free Encyclopedia. Wikipedia, The Free Encyclopedia, Mar. 26, 2024. https://en.wikipedia.org/w/index.php?title=Erd%C5%91s%E2%80%93R%C3%A9nyi_model&oldid=1215607832.

"Scale-free network." Wikipedia, The Free Encyclopedia. Wikipedia, The Free Encyclopedia, Mar. 26, 2024. https://en.wikipedia.org/w/index.php?title=Scale-free_network&oldid=1215607982.

Non-Final Office Action in U.S. Appl. No. 18/905,480 dated Nov. 29, 2024, 16 pages.

Non-Final Office Action in U.S. Appl. No. 18/802,737 dated Dec. 2, 2024, 15 pages.

Final Office Action in U.S. Appl. No. 18/761,865 dated Dec. 30, 2024, 13 pages.

Final Office Action in U.S. Appl. No. 18/751,509 dated Dec. 31, 2024, 18 pages.

Final Office Action in U.S. Appl. No. 18/751,584 dated Dec. 31, 2024, 15 pages.

Final Office Action in U.S. Appl. No. 18/802,737 dated Mar. 18, 2025, 18 pages.

Non-Final Office Action in U.S. Appl. No. 19/020,125 dated Mar. 27, 2025, 10 pages.

* cited by examiner

TOPOLOGICAL ORDER DETERMINATION IN CAUSAL GRAPHS

CROSS REFERENCE TO RELATED APPLICATIONS

The present application is a continuation of U.S. patent application Ser. No. 18/947,502 filed on Nov. 14, 2024, the entirety of which is incorporated herein by reference.

BACKGROUND

Causal graphs are used in a variety of applications, such as medicine, economics, forensics, utilities, transportation, communication networks, etc., to represent probabilistic or causal relationships between variables. A Directed Acyclic Graph (DAG) is a type of causal graph. A DAG includes a plurality of nodes or vertices representing variables and connected by edges representing relationships between the connected nodes. To make inferences using a DAG, a topological order of the DAG needs to be known. Determining the topological order is a known combinatorial NP-hard problem that scales super-exponentially with the number of variables in the DAG, thus making the DAG learning process computationally difficult, if not computationally infeasible.

SUMMARY

In accordance with at least some aspects of the present disclosure, a non-transitory computer-readable medium having computer-readable instructions stored thereon is disclosed. The computer-readable instructions when executed by a processor cause the processor to receive input data comprising a plurality of observation vectors, each of the plurality of observation vectors comprising variable values of a plurality of variables, wherein a number of the plurality of variables in each of the plurality of observation vectors is n, and wherein each of the plurality of variables is associated with a unique variable index and generate, using machine learning, a topological order of a directed acyclic graph (DAG) by: (A) creating a plurality of residual series vectors, each of the plurality of residual series vectors associated with one variable of the plurality of variables, (B) calculating a normality statistic value for each of the plurality of residual series vectors to obtain a plurality of normality statistic values, (C) calculating a mean squared error value for each of the plurality of residual series vectors, (D) comparing each of the plurality of normality statistic values with a predefined critical value, (E) for each value of the plurality of normality statistic values that is less than or equal to the predefined critical value, adding (a) the variable index of the variable of the plurality of variables associated with the value to an empty temporary order list; and (b) the mean squared error value of the variable of the plurality of variables associated with the value to an empty mean squared error list, (F) counting a number of elements in the temporary order list, (G) responsive to determining that the number of elements in the temporary order list is equal to zero, updating an order list based on the plurality of normality statistic values or responsive to determining that the number of elements in the temporary order list is not equal to zero, updating the order list based on at least one of the temporary order list or the mean squared error list, (H) repeating (A) through (H) a plurality of times, and (I) outputting the order list from (G) as the topological order of the DAG.

In accordance with at least some other aspects of the present disclosure, a system is disclosed. The system includes a memory having computer-readable instructions stored thereon and a processor that executes the computer-readable instructions to receive input data comprising a plurality of observation vectors, each of the plurality of observation vectors comprising variable values of a plurality of variables, wherein a number of the plurality of variables in each of the plurality of observation vectors is n, and wherein each of the plurality of variables is associated with a unique variable index and generate, using machine learning, a topological order of a directed acyclic graph (DAG) by: (A) creating a plurality of residual series vectors, each of the plurality of residual series vectors associated with one variable of the plurality of variables, (B) calculating a normality statistic value for each of the plurality of residual series vectors to obtain a plurality of normality statistic values, (C) calculating a mean squared error value for each of the plurality of residual series vectors, (D) comparing each of the plurality of normality statistic values with a predefined critical value, (E) for each value of the plurality of normality statistic values that is less than or equal to the predefined critical value, adding (a) the variable index of the variable of the plurality of variables associated with the value to an empty temporary order list; and (b) the mean squared error value of the variable of the plurality of variables associated with the value to an empty mean squared error list, (F) counting a number of elements in the temporary order list, (G) responsive to determining that the number of elements in the temporary order list is equal to zero, updating an order list based on the plurality of normality statistic values or responsive to determining that the number of elements in the temporary order list is not equal to zero, updating the order list based on at least one of the temporary order list or the mean squared error list, (H) repeating (A) through (H) a plurality of times, and (I) outputting the order list from (G) as the topological order of the DAG.

In accordance with at least some other aspects of the present disclosure, a method is disclosed. The method includes receiving, by a processor executing computer-readable instructions stored on a memory, input data comprising a plurality of observation vectors, each of the plurality of observation vectors comprising variable values of a plurality of variables, wherein a number of the plurality of variables in each of the plurality of observation vectors is n, and wherein each of the plurality of variables is associated with a unique variable index and generating, by the processor, using machine learning, a topological order of a directed acyclic graph (DAG) by: (A) creating, by the processor, a plurality of residual series vectors, each of the plurality of residual series vectors associated with one variable of the plurality of variables, (B) calculating, by the processor, a normality statistic value for each of the plurality of residual series vectors to obtain a plurality of normality statistic values, (C) calculating, by the processor, a mean squared error value for each of the plurality of residual series vectors, (D) comparing, by the processor, each of the plurality of normality statistic values with a predefined critical value, (E) for each value of the plurality of normality statistic values that is less than or equal to the predefined critical value, adding, by the processor, (a) the variable index of the variable of the plurality of variables associated with the value to an empty temporary order list; and (b) the mean squared error value of the variable of the plurality of variables associated with the value to an empty mean squared error list, (F) counting, by the processor, a number of elements in the temporary order list, (G) responsive to determining that the number of elements in the temporary order list is equal to zero, updating, by the processor, an order list based on the plurality of normality statistic values or responsive to determining that the number of elements in the temporary order list is not equal to zero, updating the order list based on at least one of the temporary order list or the mean squared error list, (H) repeating, by the processor, (A) through (H) a plurality of times, and (I) outputting, by the processor, the order list from (G) as the topological order of the DAG.

The foregoing summary is illustrative only and is not intended to be limiting in any way. In addition to the illustrative aspects, embodiments, and features described above, further aspects, embodiments, and features will become apparent by reference to the following drawings and the detailed description.

The foregoing and other features of the present disclosure will become apparent from the following description and appended claims, taken in conjunction with the accompanying drawings. Understanding that these drawings depict only several embodiments in accordance with the disclosure and are therefore, not to be considered limiting of its scope, the disclosure will be described with additional specificity and detail through use of the accompanying drawings.

DETAILED DESCRIPTION

In the following description, for the purposes of explanation, specific details are set forth in order to provide a thorough understanding of embodiments of the technology. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the example embodiments will provide those skilled in the art with an enabling description for implementing an example embodiment. It should be understood that various changes may be made in the function and arrangement of elements without departing from the spirit and scope of the technology as set forth in the appended claims.

Specific details are given in the following description to provide a thorough understanding of the embodiments. However, it will be understood by one of ordinary skills in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional operations not included in a figure. A process may correspond to a method, a function, a procedure, a subroutine, a subprogram, etc. When a process corresponds to a function, its termination can correspond to a return of the function to the calling function or the main function.

Systems depicted in some of the figures may be provided in various configurations. In some embodiments, the systems may be configured as a distributed system where one or more components of the system are distributed across one or more networks in a cloud computing system.

Figure 1:
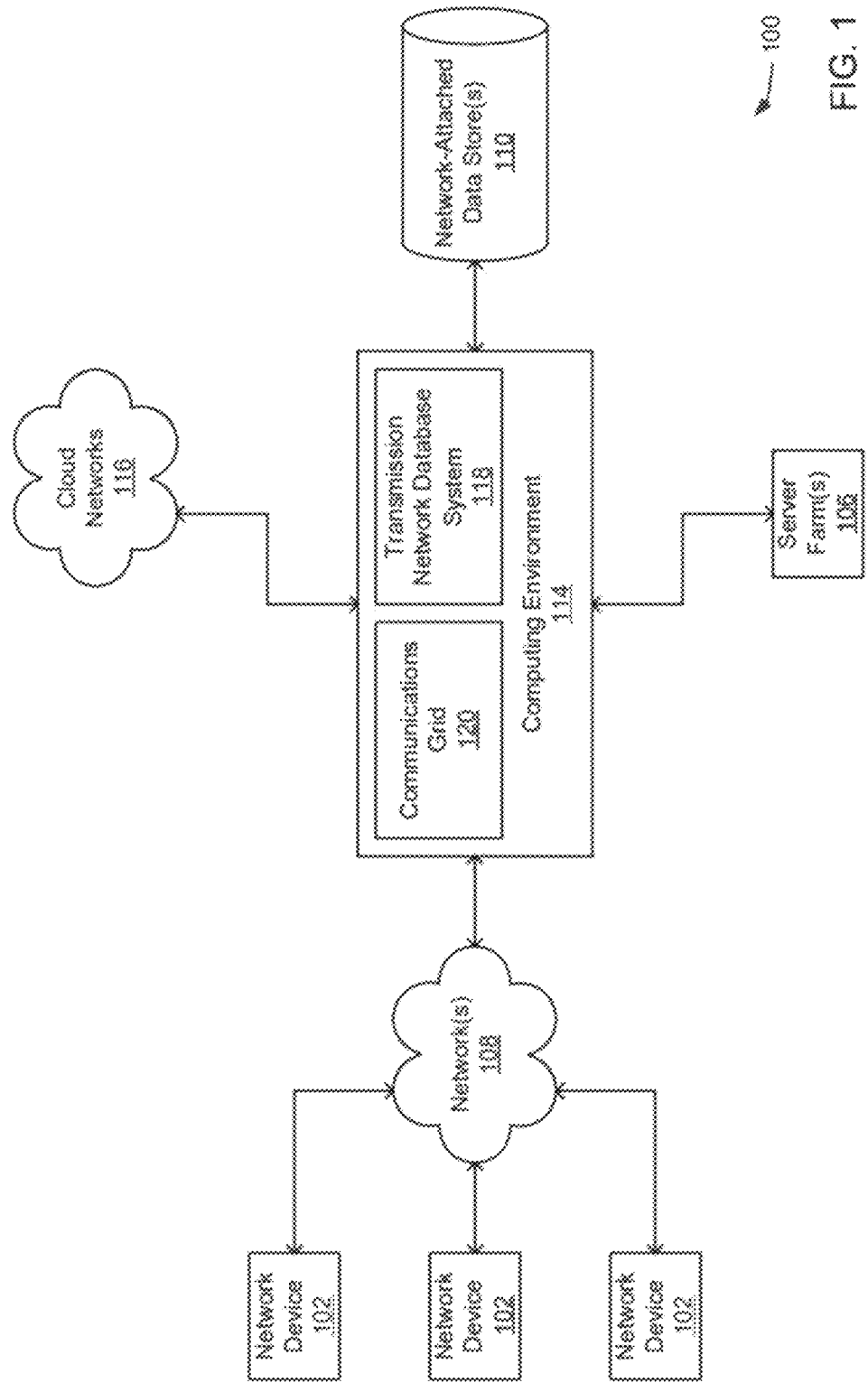
FIG. 1 illustrates a block diagram that provides an illustration of the hardware components of a computing system, according to some embodiments of the present technology.

FIG. 1 is a block diagram that provides an illustration of the hardware components of a data transmission network 100, according to embodiments of the present technology. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. Data transmission network 100 also includes one or more network devices 102. Network devices 102 may include client devices that attempt to communicate with computing environment 114. For example, network devices 102 may send data to the computing environment 114 to be processed, may send signals to the computing environment 114 to control different aspects of the computing environment or the data it is processing, among other reasons. Network devices 102 may interact with the computing environment 114 through a number of ways, such as, for example, over one or more networks 108. As shown in FIG. 1, computing environment 114 may include one or more other systems. For example, computing environment 114 may include a database system 118 and/or a communications grid 120.

Figure 8:
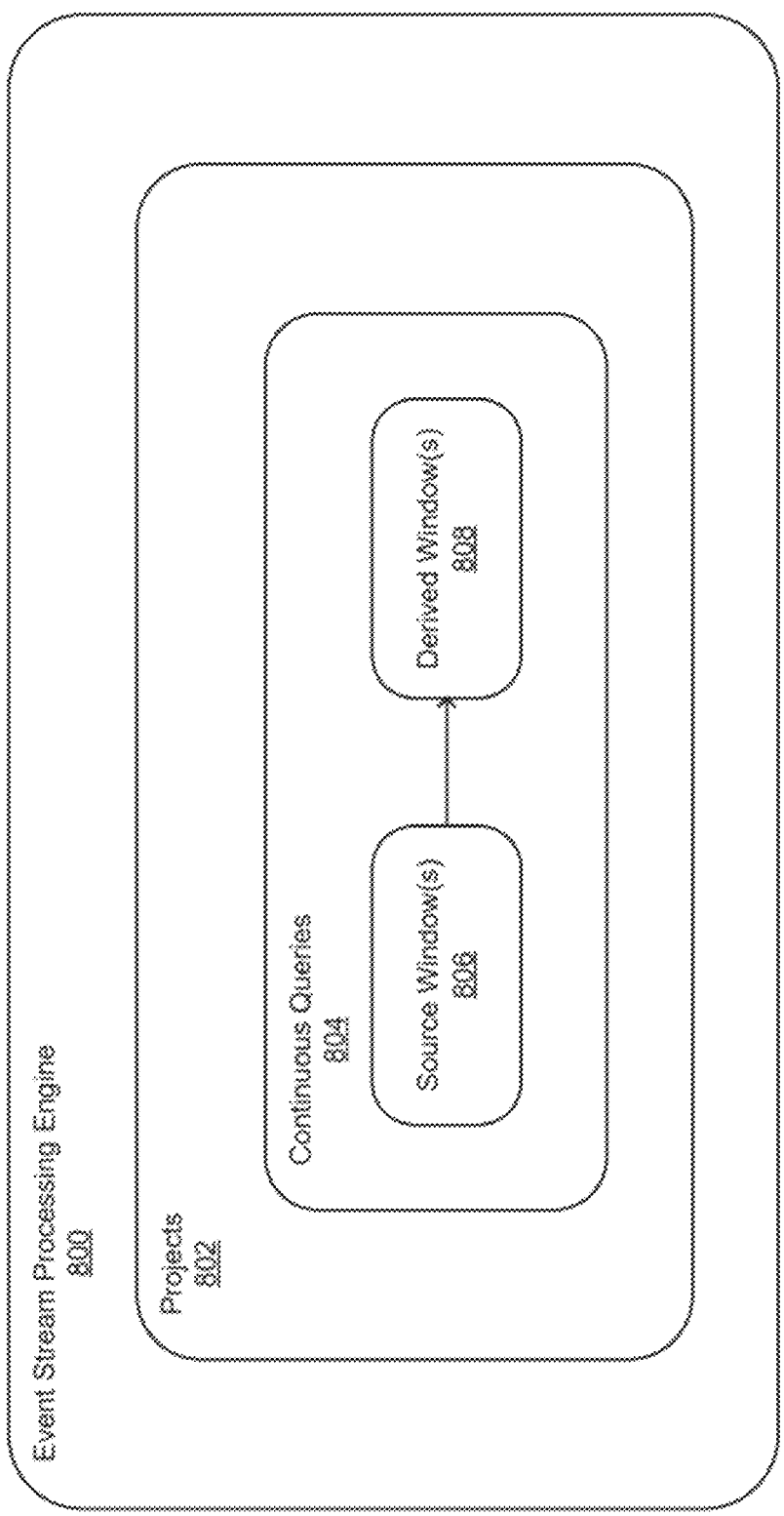
FIG. 8 illustrates a block diagram including components of an Event Stream Processing Engine (ESPE), according to embodiments of the present technology.
Figure 9:
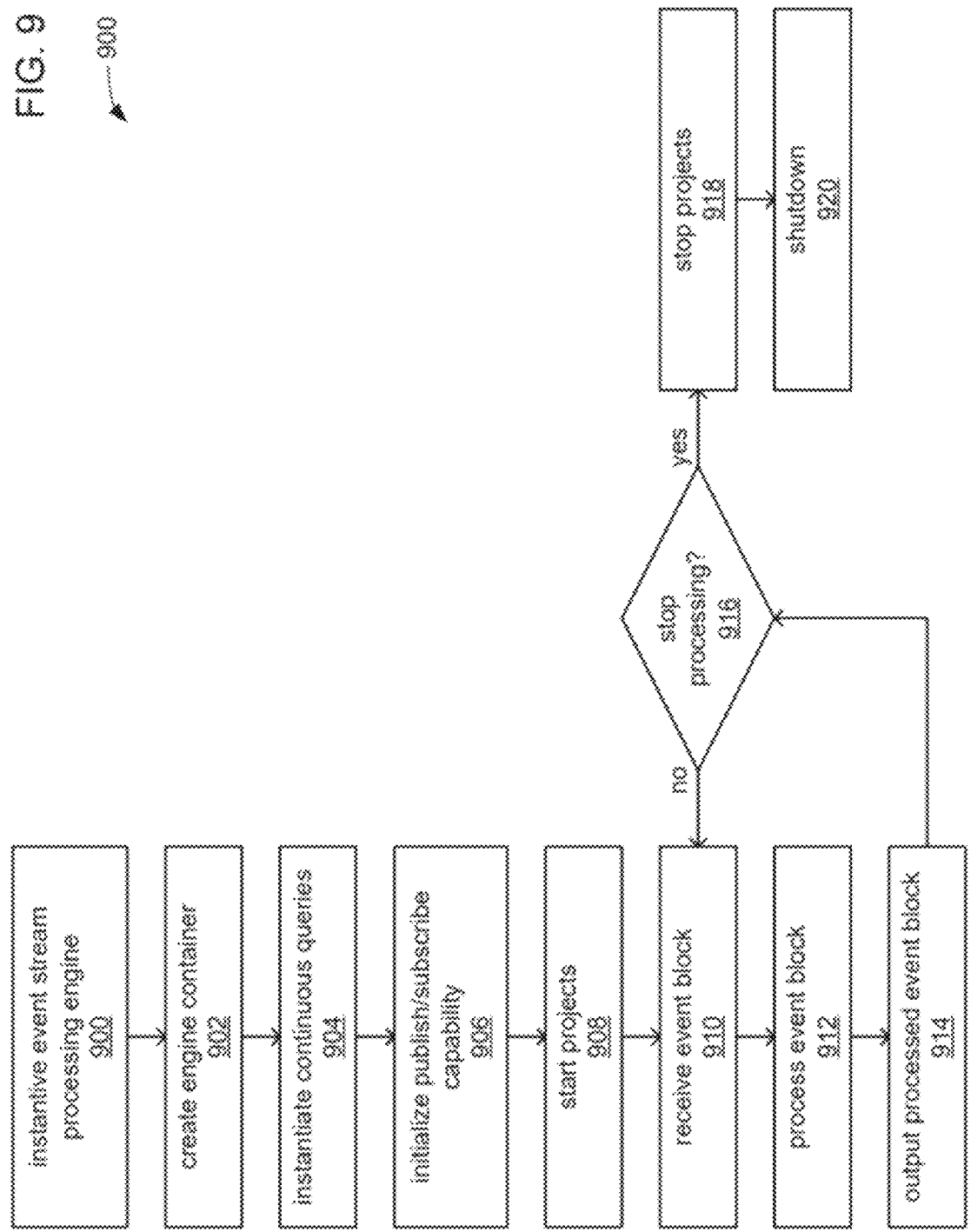
FIG. 9 illustrates a flow chart showing an example process including operations performed by an event stream processing engine, according to some embodiments of the present technology.
Figure 10:
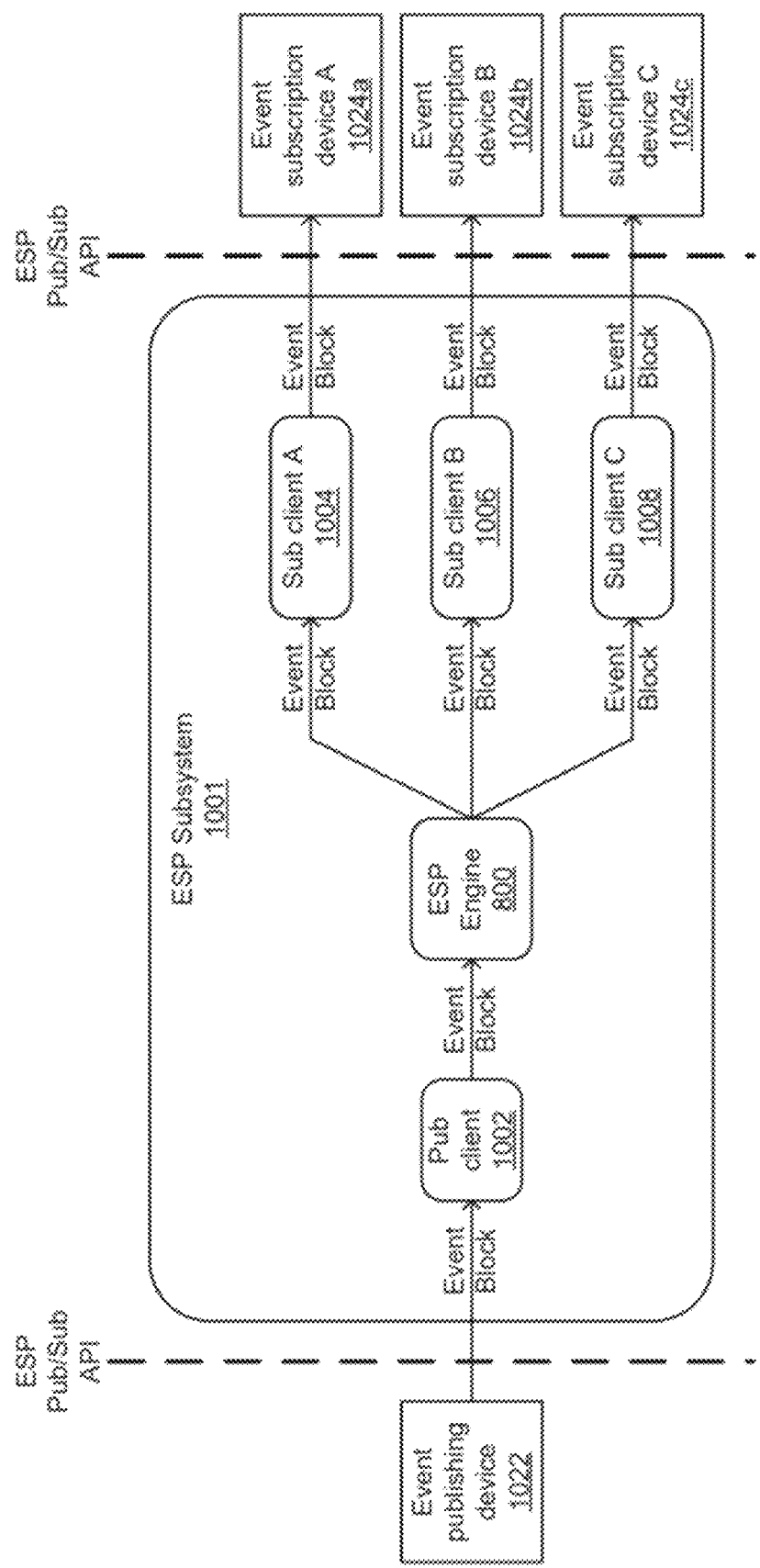
FIG. 10 illustrates an ESP system interfacing between a publishing device and multiple event subscribing devices, according to embodiments of the present technology.

In other embodiments, network devices may provide a large amount of data, either all at once or streaming over a period of time (e.g., using event stream processing (ESP), described further with respect to FIGS. 8-10), to the computing environment 114 via networks 108. For example, network devices 102 may include network computers, sensors, databases, or other devices that may transmit or otherwise provide data to computing environment 114. For example, network devices may include local area network devices, such as routers, hubs, switches, or other computer networking devices. These devices may provide a variety of stored or generated data, such as network data or data specific to the network devices themselves. Network devices may also include sensors that monitor their environment or other devices to collect data regarding that environment or those devices, and such network devices may provide data they collect over time. Network devices may also include devices within the internet of things, such as devices within a home automation network. Some of these devices may be referred to as edge devices and may involve edge computing circuitry. Data may be transmitted by network devices directly to computing environment 114 or to network-attached data stores, such as network-attached data stores 110 for storage so that the data may be retrieved later by the computing environment 114 or other portions of data transmission network 100.

Data transmission network 100 may also include one or more network-attached data stores 110. Network-attached data stores 110 are used to store data to be processed by the computing environment 114 as well as any intermediate or final data generated by the computing system in non-volatile memory. However, in certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores may store a variety of different types of data organized in a variety of different ways and from a variety of different sources. For example, network-attached data storage may include storage other than primary storage located within computing environment 114 that is directly accessible by processors located therein. Network-attached data storage may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data, such as manufacturing data (e.g., a database containing records identifying products being manufactured with parameter data for each product, such as colors and models) or product sales databases (e.g., a database containing individual data records identifying details of individual product sales).

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP OR MOLAP database, or may be stored in another tabular form, such as in a flat-hierarchy form.

Data transmission network 100 may also include one or more server farms 106. Computing environment 114 may route select communications or data to the one or more sever farms 106 or one or more servers within the server farms. Server farms 106 can be configured to provide information in a predetermined manner. For example, server farms 106 may access data to transmit in response to a communication. Server farms 106 may be separately housed from each other device within data transmission network 100, such as computing environment 114, and/or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain embodiments, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network can dynamically scale to meet the needs of its users. The cloud network 116 may include one or more computers, servers, and/or systems. In some embodiments, the computers, servers, and/or systems that make up the cloud network 116 are different from the user's own on-premises computers, servers, and/or systems. For example, the cloud network 116 may host an application, and a user may, via a communication network such as the Internet, on demand, order and use the application.

While each device, server and system in FIG. 1 is shown as a single device, it will be appreciated that multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between servers 106 and computing environment 114 or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a BLUETOOTH® communication channel or a BLUETOOTH® Low Energy communication channel. A wired network may include a wired interface. The wired and/or wireless networks may be implemented using routers, access points, bridges, gateways, or the like, to connect devices in the network 114, as will be further described with respect to FIG. 2. The one or more networks 108 can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS). In addition, data and/or transactional details may be encrypted.

Some aspects may utilize the Internet of Things (IoT), where things (e.g., machines, devices, phones, sensors) can be connected to networks and the data from these things can be collected and processed within the things and/or external to the things. For example, the IoT can include sensors in many different devices, and high value analytics can be applied to identify hidden relationships and drive increased efficiencies. This can apply to both big data analytics and real-time (e.g., ESP) analytics. This will be described further below with respect to FIG. 2.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The compute nodes in the grid-based computing system 120 and the transmission network database system 118 may share the same processor hardware, such as processors that are located within computing environment 114.

Figure 2:
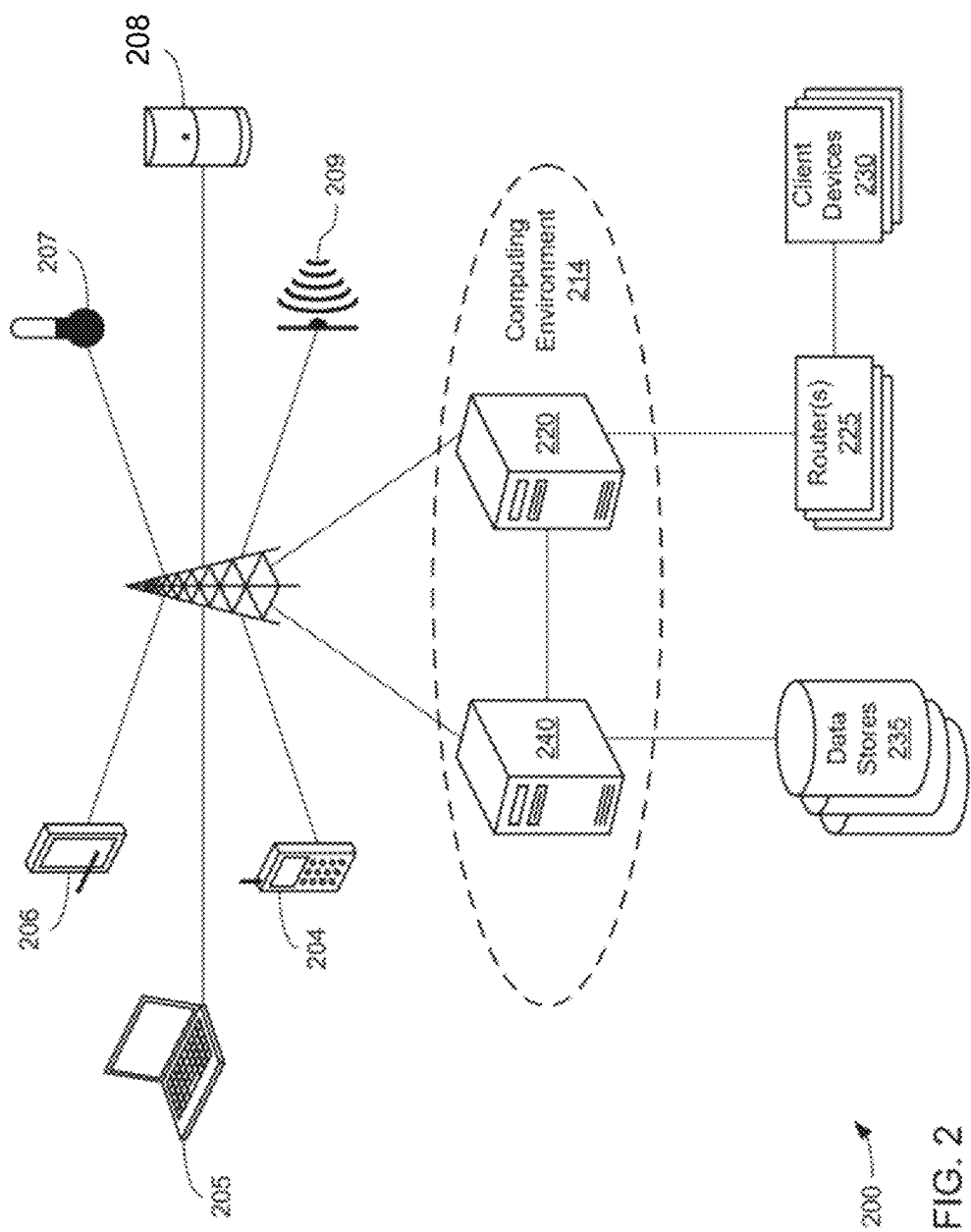
FIG. 2 illustrates an example network including an example set of devices communicating with each other over an exchange system and via a network, according to some embodiments of the present technology.

FIG. 2 illustrates an example network including an example set of devices communicating with each other over an exchange system and via a network, according to embodiments of the present technology. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). The communication can be routed to another network device, such as network devices 205-209, via base station 210. The communication can also be routed to computing environment 214 via base station 210. For example, network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, and electrical current, among others. The sensors may be mounted to various components used as part of a variety of different types of systems (e.g., an oil drilling operation). The network devices may detect and record data related to the environment that it monitors, and transmit that data to computing environment 214.

As noted, one type of system that may include various sensors that collect data to be processed and/or transmitted to a computing environment according to certain embodiments includes an oil drilling system. For example, the one or more drilling operation sensors may include surface sensors that measure a hook load, a fluid rate, a temperature and a density in and out of the wellbore, a standpipe pressure, a surface torque, a rotation speed of a drill pipe, a rate of penetration, a mechanical specific energy, etc. and downhole sensors that measure a rotation speed of a bit, fluid densities, downhole torque, downhole vibration (axial, tangential, lateral), a weight applied at a drill bit, an annular pressure, a differential pressure, an azimuth, an inclination, a dog leg severity, a measured depth, a vertical depth, a downhole temperature, etc. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, of for example, the rate of penetration, mechanical specific energy, hook load, flow in fluid rate, flow out fluid rate, pump pressure, surface torque, rotation speed of the drill pipe, annular pressure, annular friction pressure, annular temperature, equivalent circulating density, etc. may also be stored in the data warehouse.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In another embodiment, a network device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment according to certain embodiments includes a power or energy grid. A variety of different network devices may be included in an energy grid, such as various devices within one or more power plants, energy farms (e.g., wind farm, solar farm, among others) energy storage facilities, factories, homes and businesses of consumers, among others. One or more of such devices may include one or more sensors that detect energy gain or loss, electrical input or output or loss, and a variety of other efficiencies. These sensors may collect data to inform users of how the energy grid, and individual devices within the grid, may be functioning and how they may be made more efficient.

Network device sensors may also perform processing on data it collects before transmitting the data to the computing environment 114, or before deciding whether to transmit data to the computing environment 114. For example, network devices may determine whether data collected meets certain rules, for example by comparing data or values calculated from the data and comparing that data to one or more thresholds. The network device may use this data and/or comparisons to determine if the data should be transmitted to the computing environment 214 for further use or processing.

Computing environment 214 may include machines 220 and 240. Although computing environment 214 is shown in FIG. 2 as having two machines, 220 and 240, computing environment 214 may have only one machine or may have more than two machines. The machines that make up computing environment 214 may include specialized computers, servers, or other machines that are configured to individually and/or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other inter-network or intra-network connection components. For example, computing environment 214 may communicate with devices 230 via one or more routers 225. Computing environment 214 may collect, analyze and/or store data from or pertaining to communications, client device operations, client rules, and/or user-associated actions stored at one or more data stores 235. Such data may influence communication routing to the devices within computing environment 214, how data is stored or processed within computing environment 214, among other actions.

Notably, various other devices can further be used to influence communication routing and/or processing between devices within computing environment 214 and with devices outside of computing environment 214. For example, as shown in FIG. 2, computing environment 214 may include a web server 240. Thus, computing environment 214 can retrieve data of interest, such as client information (e.g., product information, client rules, etc.), technical product details, news, current or predicted weather, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from network device sensors as the sensors continuously sense, monitor and track changes in their environments. Devices within computing environment 214 may also perform pre-analysis on data it receives to determine if the data received should be processed as part of an ongoing project. The data received and collected by computing environment 214, no matter what the source or method or timing of receipt, may be processed over a period of time for a client to determine results data based on the client's needs and rules.

Figure 3:
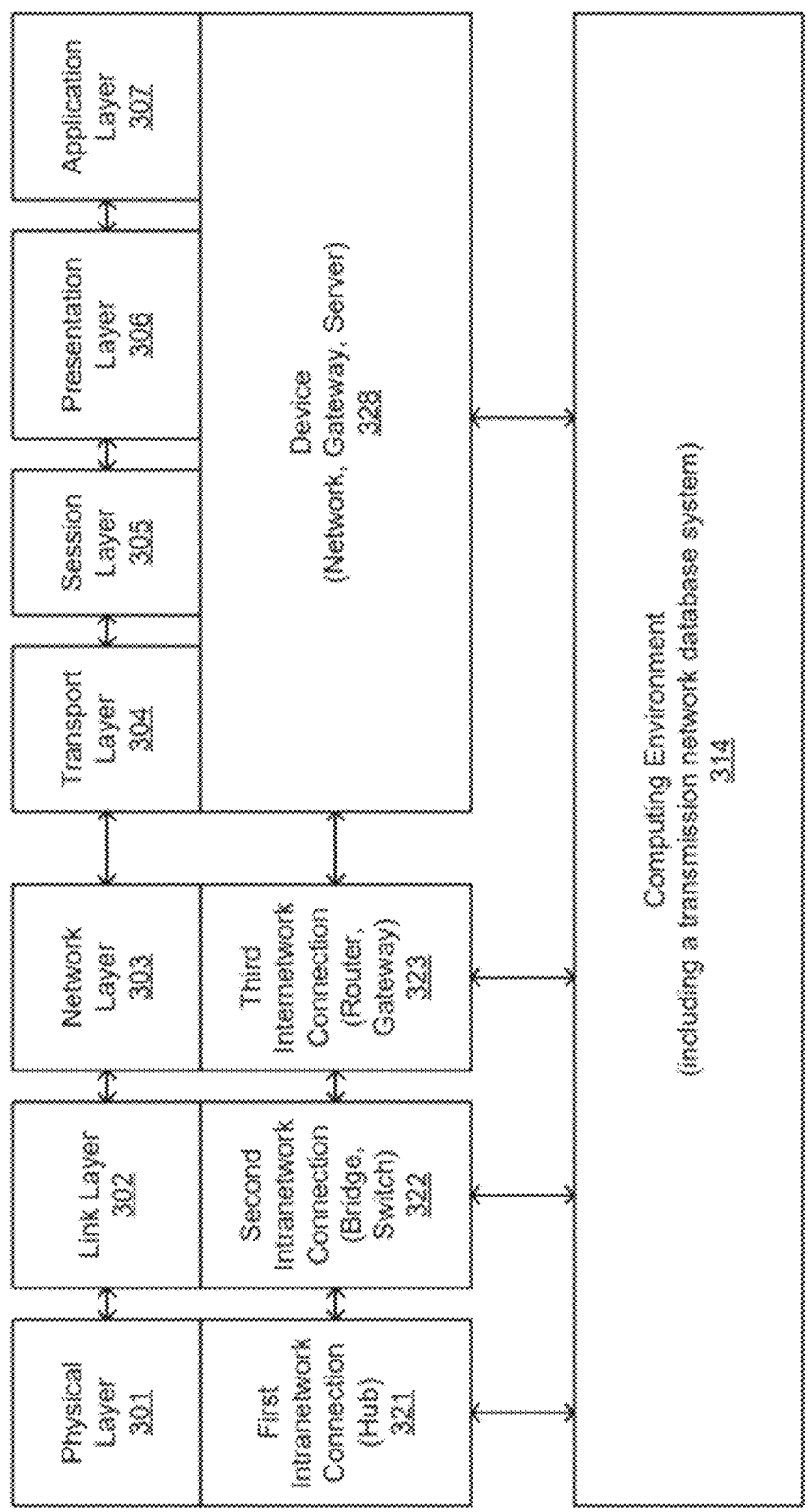
FIG. 3 illustrates a representation of a conceptual model of a communications protocol system, according to some embodiments of the present technology.

FIG. 3 illustrates a representation of a conceptual model of a communications protocol system, according to embodiments of the present technology. More specifically, FIG. 3 identifies operation of a computing environment in an Open Systems Interaction model that corresponds to various connection components. The model 300 shows, for example, how a computing environment, such as computing environment 314 (or computing environment 214 in FIG. 2) may communicate with other devices in its network, and control how communications between the computing environment and other devices are executed and under what conditions.

The model can include layers 301-307. The layers are arranged in a stack. Each layer in the stack serves the layer one level higher than it (except for the application layer, which is the highest layer), and is served by the layer one level below it (except for the physical layer, which is the lowest layer). The physical layer is the lowest layer because it receives and transmits raw bites of data, and is the farthest layer from the user in a communications system. On the other hand, the application layer is the highest layer because it interacts directly with a software application.

As noted, the model includes a physical layer 301. Physical layer 301 represents physical communication, and can define parameters of that physical communication. For example, such physical communication may come in the form of electrical, optical, or electromagnetic signals. Physical layer 301 also defines protocols that may control communications within a data transmission network.

Link layer 302 defines links and mechanisms used to transmit (i.e., move) data across a network. The link layer 302 manages node-to-node communications, such as within a grid computing environment. Link layer 302 can detect and correct errors (e.g., transmission errors in the physical layer 301). Link layer 302 can also include a media access control (MAC) layer and logical link control (LLC) layer.

Network layer 303 defines the protocol for routing within a network. In other words, the network layer coordinates transferring data across nodes in a same network (e.g., such as a grid computing environment). Network layer 303 can also define the processes used to structure local addressing within the network.

Transport layer 304 can manage the transmission of data and the quality of the transmission and/or receipt of that data. Transport layer 304 can provide a protocol for transferring data, such as, for example, a Transmission Control Protocol (TCP). Transport layer 304 can assemble and disassemble data frames for transmission. The transport layer can also detect transmission errors occurring in the layers below it.

Session layer 305 can establish, maintain, and manage communication connections between devices on a network. In other words, the session layer controls the dialogues or nature of communications between network devices on the network. The session layer may also establish checkpointing, adjournment, termination, and restart procedures.

Presentation layer 306 can provide translation for communications between the application and network layers. In other words, this layer may encrypt, decrypt and/or format data based on data types and/or encodings known to be accepted by an application or network layer.

Application layer 307 interacts directly with software applications and end users, and manages communications between them. Application layer 307 can identify destinations, local resource states or availability and/or communication content or formatting using the applications.

Intra-network connection components 321 and 322 are shown to operate in lower levels, such as physical layer 301 and link layer 302, respectively. For example, a hub can operate in the physical layer, a switch can operate in the link layer, and a router can operate in the network layer. Inter-network connection components 323 and 328 are shown to operate on higher levels, such as layers 303-307. For example, routers can operate in the network layer and network devices can operate in the transport, session, presentation, and application layers.

As noted, a computing environment 314 can interact with and/or operate on, in various embodiments, one, more, all or any of the various layers. For example, computing environment 314 can interact with a hub (e.g., via the link layer) so as to adjust which devices the hub communicates with. The physical layer may be served by the link layer, so it may implement such data from the link layer. For example, the computing environment 314 may control which devices it will receive data from. For example, if the computing environment 314 knows that a certain network device has turned off, broken, or otherwise become unavailable or unreliable, the computing environment 314 may instruct the hub to prevent any data from being transmitted to the computing environment 314 from that network device. Such a process may be beneficial to avoid receiving data that is inaccurate or that has been influenced by an uncontrolled environment. As another example, computing environment 314 can communicate with a bridge, switch, router or gateway and influence which device within the system (e.g., system 200) the component selects as a destination. In some embodiments, computing environment 314 can interact with various layers by exchanging communications with equipment operating on a particular layer by routing or modifying existing communications. In another embodiment, such as in a grid computing environment, a node may determine how data within the environment should be routed (e.g., which node should receive certain data) based on certain parameters or information provided by other layers within the model.

As noted, the computing environment 314 may be a part of a communications grid environment, the communications of which may be implemented as shown in the protocol of FIG. 3. For example, referring back to FIG. 2, one or more of machines 220 and 240 may be part of a communications grid computing environment. A gridded computing environment may be employed in a distributed system with non-interactive workloads where data resides in memory on the machines, or compute nodes. In such an environment, analytic code, instead of a database management system, controls the processing performed by the nodes. Data is co-located by pre-distributing it to the grid nodes, and the analytic code on each node loads the local data into memory. Each node may be assigned a particular task such as a portion of a processing project, or to organize or control other nodes within the grid.

Figure 4:
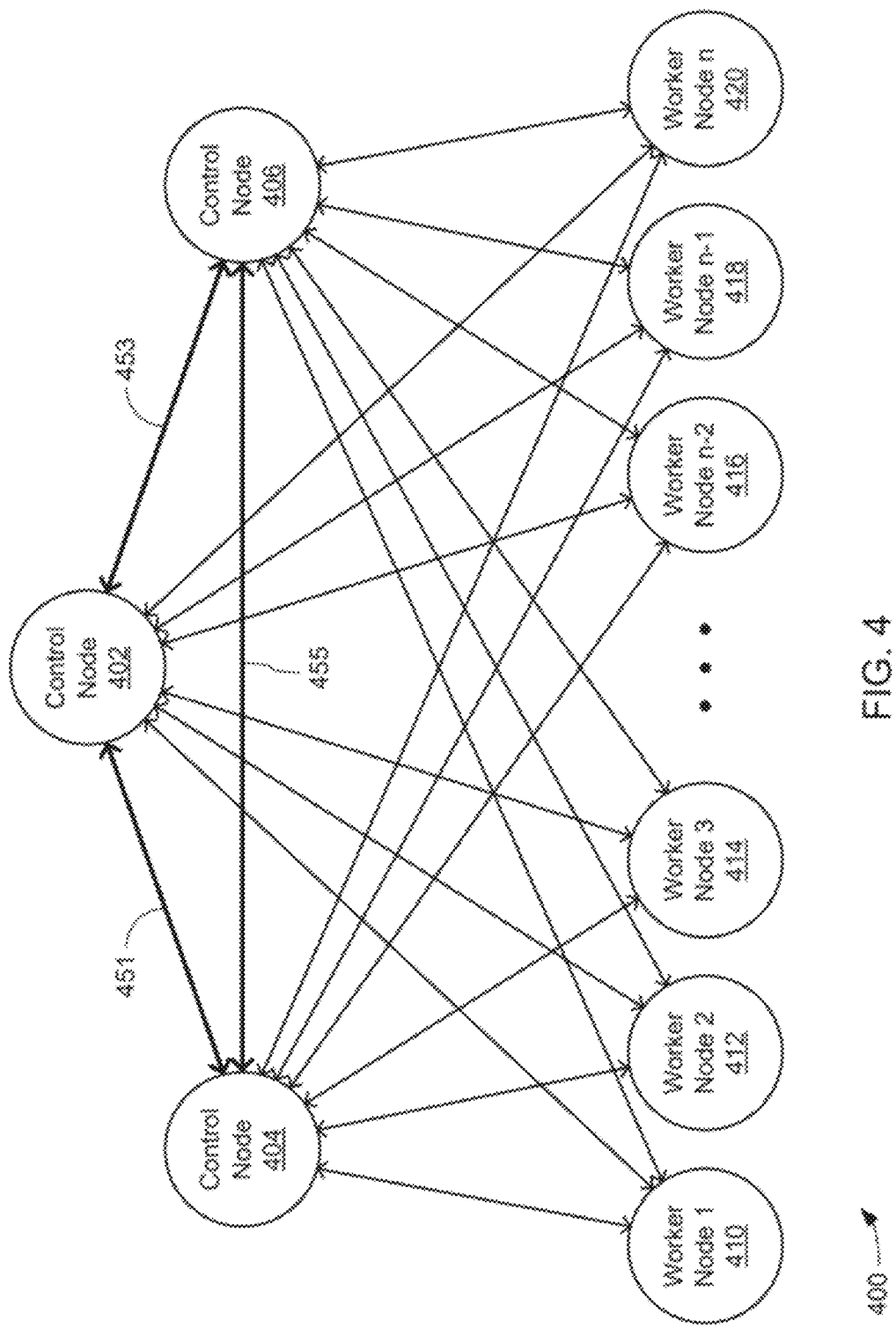
FIG. 4 illustrates a communications grid computing system including a variety of control and worker nodes, according to some embodiments of the present technology.

FIG. 4 illustrates a communications grid computing system 400 including a variety of control and worker nodes, according to embodiments of the present technology. Communications grid computing system 400 includes three control nodes and one or more worker nodes. Communications grid computing system 400 includes control nodes 402, 404, and 406. The control nodes are communicatively connected via communication paths 451, 453, and 455. Therefore, the control nodes may transmit information (e.g., related to the communications grid or notifications), to and receive information from each other. Although communications grid computing system 400 is shown in FIG. 4 as including three control nodes, the communications grid may include more or less than three control nodes.

Communications grid computing system (or just "communications grid") 400 also includes one or more worker nodes. Shown in FIG. 4 are six worker nodes 410-420. Although FIG. 4 shows six worker nodes, a communications grid according to embodiments of the present technology may include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid 400 may be connected (wired or wirelessly, and directly or indirectly) to control nodes 402-406. Therefore, each worker node may receive information from the control nodes (e.g., an instruction to perform work on a project) and may transmit information to the control nodes (e.g., a result from work performed on a project). Furthermore, worker nodes may communicate with each other (either directly or indirectly). For example, worker nodes may transmit data between each other related to a job being performed or an individual task within a job being performed by that worker node. However, in certain embodiments, worker nodes may not, for example, be connected (communicatively or otherwise) to certain other worker nodes. In an embodiment, worker nodes may only be able to communicate with the control node that controls it, and may not be able to communicate with other worker nodes in the communications grid, whether they are other worker nodes controlled by the control node that controls the worker node, or worker nodes that are controlled by other control nodes in the communications grid.

A control node may connect with an external device with which the control node may communicate (e.g., a grid user, such as a server or computer, may connect to a controller of the grid). For example, a server or computer may connect to control nodes and may transmit a project or job to the node. The project may include a data set. The data set may be of any size. Once the control node receives such a project including a large data set, the control node may distribute the data set or projects related to the data set to be performed by worker nodes. Alternatively, for a project including a large data set, the data set may be received or stored by a machine other than a control node (e.g., a HADOOP® standard-compliant data node employing the HADOOP® Distributed File System, or HDFS).

Control nodes may maintain knowledge of the status of the nodes in the grid (i.e., grid status information), accept work requests from clients, subdivide the work across worker nodes, and coordinate the worker nodes, among other responsibilities. Worker nodes may accept work requests from a control node and provide the control node with results of the work performed by the worker node. A grid may be started from a single node (e.g., a machine, computer, server, etc.). This first node may be assigned or may start as the primary control node that will control any additional nodes that enter the grid.

When a project is submitted for execution (e.g., by a client or a controller of the grid) it may be assigned to a set of nodes. After the nodes are assigned to a project, a data structure (i.e., a communicator) may be created. The communicator may be used by the project for information to be shared between the project codes running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node receives a project, the primary control node may distribute portions of the project to its worker nodes for execution. For example, when a project is initiated on communications grid 400, primary control node 402 controls the work to be performed for the project in order to complete the project as requested or instructed. The primary control node may distribute work to the worker nodes based on various factors, such as which subsets or portions of projects may be completed most efficiently and in the correct amount of time. For example, a worker node may perform analysis on a portion of data that is already local (e.g., stored on) the worker node. The primary control node also coordinates and processes the results of the work performed by each worker node after each worker node executes and completes its job. For example, the primary control node may receive a result from one or more worker nodes, and the control node may organize (e.g., collect and assemble) the results received and compile them to produce a complete result for the project received from the end user.

Any remaining control nodes, such as control nodes 404 and 406, may be assigned as backup control nodes for the project. In an embodiment, backup control nodes may not control any portion of the project. Instead, backup control nodes may serve as a backup for the primary control node and take over as primary control node if the primary control node were to fail. If a communications grid were to include only a single control node, and the control node were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes, including a backup control node, may be beneficial.

To add another node or machine to the grid, the primary control node may open a pair of listening sockets, for example. A socket may be used to accept work requests from clients, and the second socket may be used to accept connections from other grid nodes. The primary control node may be provided with a list of other nodes (e.g., other machines, computers, servers) that will participate in the grid, and the role that each node will fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it will check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. However, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404 and 406 (and, for example, to other control or worker nodes within the communications grid). Such communications may be sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes in the grid, unique identifiers of the nodes, or their relationships with the primary control node) and the status of a project (including, for example, the status of each worker node's portion of the project). The snapshot may also include analysis or results received from worker nodes in the communications grid. The backup control nodes may receive and store the backup data received from the primary control node. The backup control nodes may transmit a request for such a snapshot (or other information) from the primary control node, or the primary control node may send such information periodically to the backup control nodes.

As noted, the backup data may allow the backup control node to take over as primary control node if the primary control node fails without requiring the grid to start the project over from scratch. If the primary control node fails, the backup control node that will take over as primary control node may retrieve the most recent version of the snapshot received from the primary control node and use the snapshot to continue the project from the stage of the project indicated by the backup data. This may prevent failure of the project as a whole.

A backup control node may use various methods to determine that the primary control node has failed. In one example of such a method, the primary control node may transmit (e.g., periodically) a communication to the backup control node that indicates that the primary control node is working and has not failed, such as a heartbeat communication. The backup control node may determine that the primary control node has failed if the backup control node has not received a heartbeat communication for a certain predetermined period of time. Alternatively, a backup control node may also receive a communication from the primary control node itself (before it failed) or from a worker node that the primary control node has failed, for example because the primary control node has failed to communicate with the worker node.

Different methods may be performed to determine which backup control node of a set of backup control nodes (e.g., backup control nodes 404 and 406) will take over for failed primary control node 402 and become the new primary control node. For example, the new primary control node may be chosen based on a ranking or "hierarchy" of backup control nodes based on their unique identifiers. In an alternative embodiment, a backup control node may be assigned to be the new primary control node by another device in the communications grid or from an external device (e.g., a system infrastructure or an end user, such as a server or computer, controlling the communications grid). In another alternative embodiment, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative embodiment, the primary control node may transmit a communication to each of the operable worker nodes still on the communications grid that each of the worker nodes should purposefully fail also. After each of the worker nodes fail, they may each retrieve their most recent saved checkpoint of their status and restart the project from that checkpoint to minimize lost progress on the project being executed.

Figure 5:
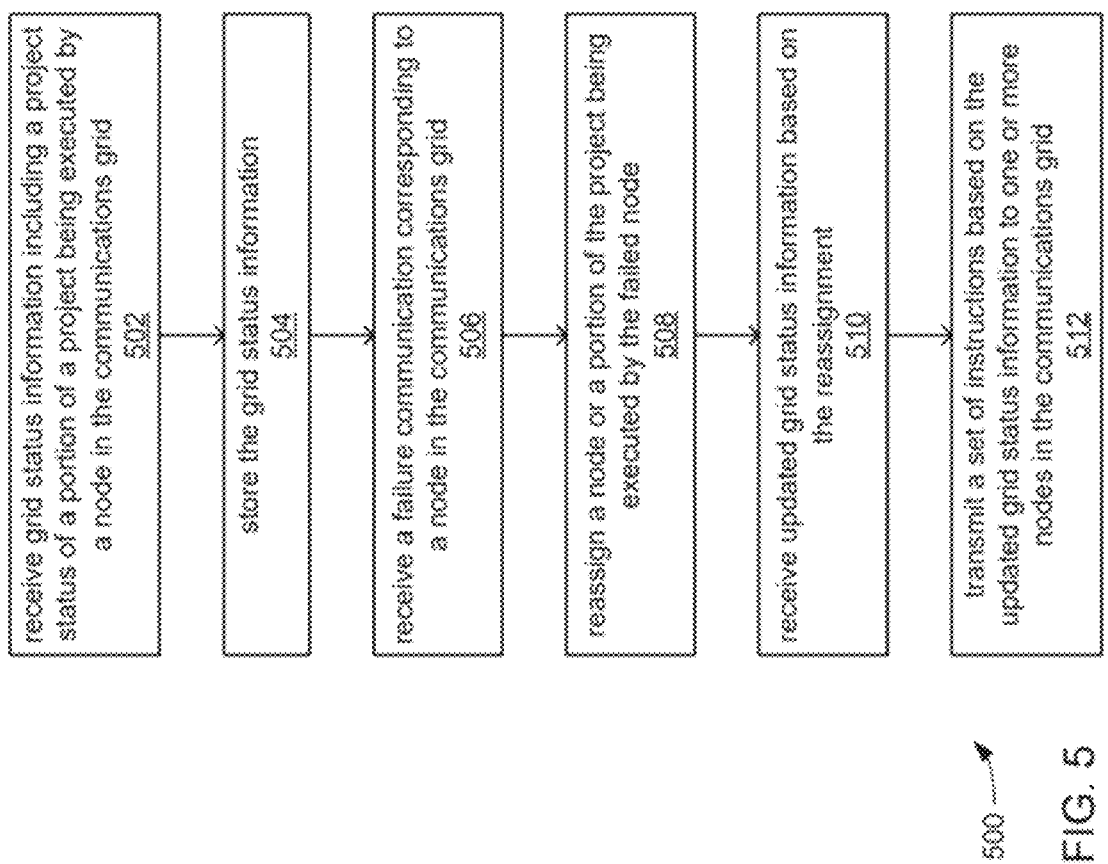
FIG. 5 illustrates a flow chart showing an example process for adjusting a communications grid or a work project in a communications grid after a failure of a node, according to some embodiments of the present technology.

FIG. 5 illustrates a flow chart showing an example process 500 for adjusting a communications grid or a work project in a communications grid after a failure of a node, according to embodiments of the present technology. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
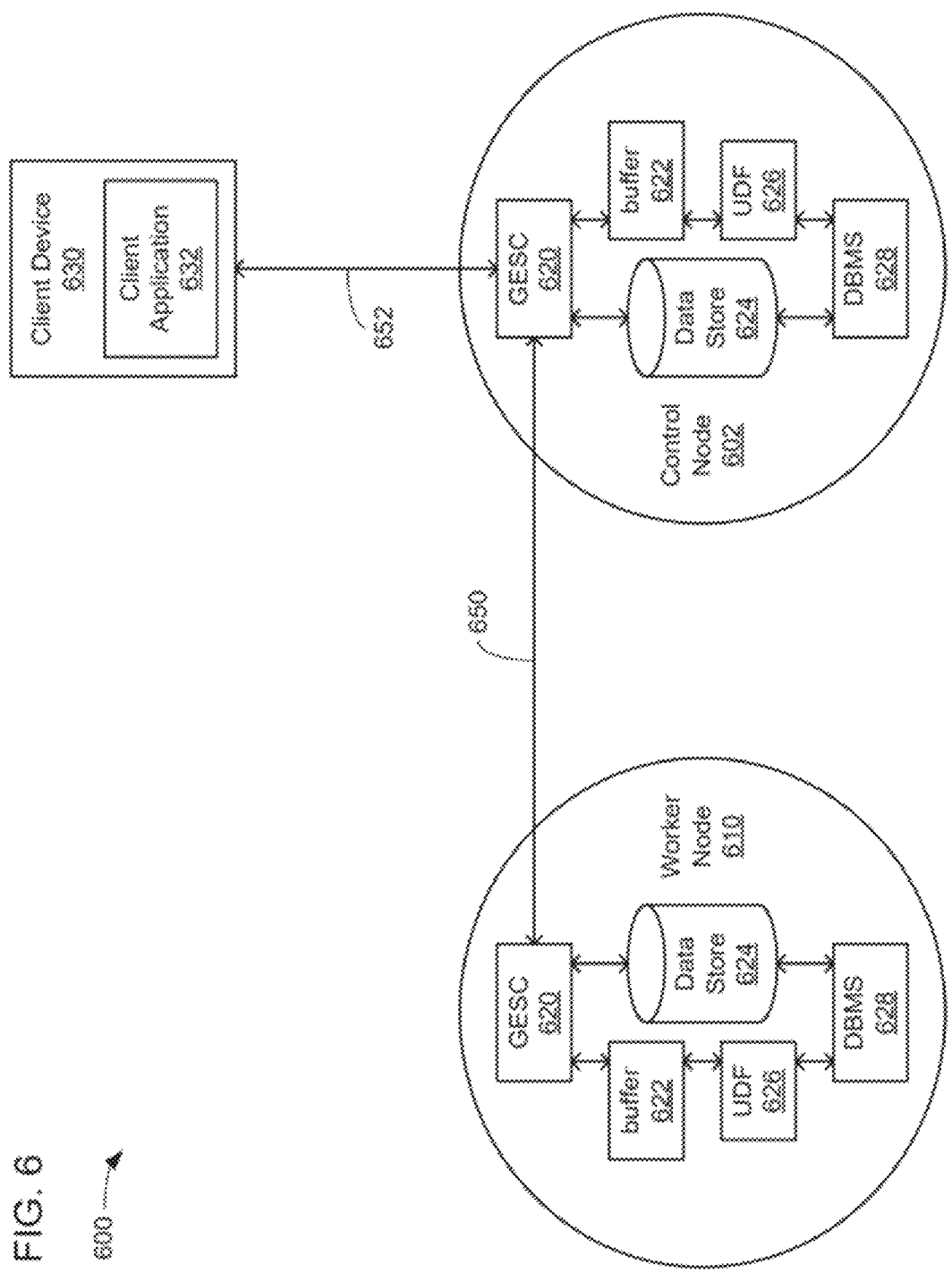
FIG. 6 illustrates a portion of a communications grid computing system including a control node and a worker node, according to some embodiments of the present technology.

FIG. 6 illustrates a portion of a communications grid computing system 600 including a control node and a worker node, according to embodiments of the present technology. Communications grid 600 computing system includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via path 650.

Similar to in FIG. 4, communications grid computing system (or just "communications grid") 600 includes data processing nodes (control node 602 and worker node 610). Nodes 602 and 610 include multi-core data processors. Each node 602 and 610 includes a grid-enabled software component (GESC) 620 that executes on the data processor associated with that node and interfaces with buffer memory 622 also associated with that node. Each node 602 and 610 includes database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However in certain embodiments, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DBMS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 620 may be connected via a network, such as network 108 shown in FIG. 1. Therefore, nodes 602 and 620 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client device 630. More specifically, control node 602 may communicate with client application 632 hosted by the client device 630 to receive queries and to respond to those queries after processing large amounts of data.

DBMS 628 may control the creation, maintenance, and use of database or data structure (not shown) within a node 602 or 610. The database may organize data stored in data stores 624. The DBMS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
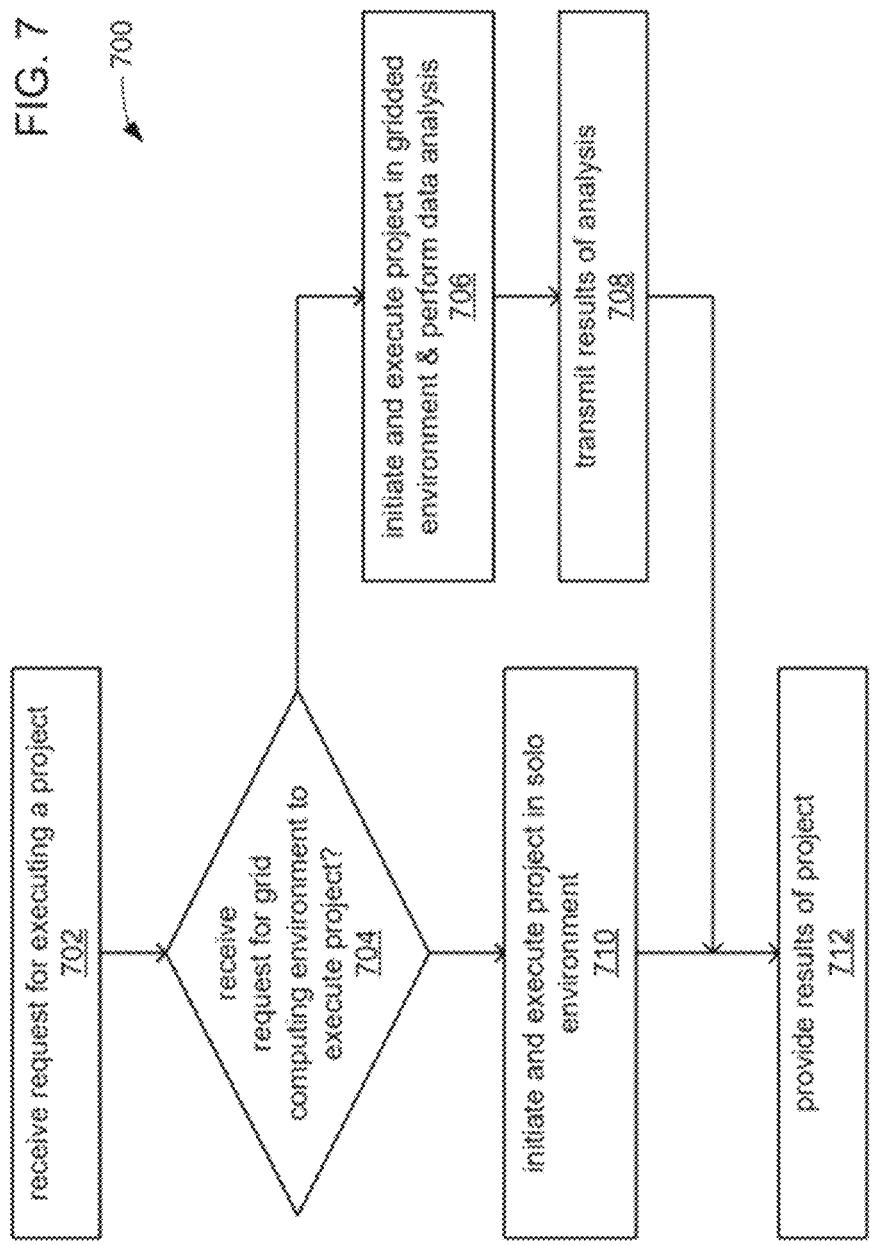
FIG. 7 illustrates a flow chart showing an example process for executing a data analysis or processing project, according to some embodiments of the present technology.

FIG. 7 illustrates a flow chart showing an example method 700 for executing a project within a grid computing system, according to embodiments of the present technology. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project, as described in operation 712.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024a-c, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

FIG. 8 illustrates a block diagram including components of an Event Stream Processing Engine (ESPE), according to embodiments of the present technology. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative embodiment, for example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

FIG. 9 illustrates a flow chart showing an example process including operations performed by an event stream processing engine, according to some embodiments of the present technology. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. As further understood by a person of skill in the art, various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

FIG. 10 illustrates an ESP system 1000 interfacing between publishing device 1022 and event subscribing devices 1024a-c, according to embodiments of the present technology. ESP system 1000 may include ESP device or subsystem 851, event publishing device 1022, an event subscribing device A 1024a, an event subscribing device B 1024b, and an event subscribing device C 1024c. Input event streams are output to ESP device 851 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 1024a, event subscribing device B 1024b, and event subscribing device C 1024c. ESP system 1000 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscribing device A 1024a, event subscribing device B 1024b, and event subscribing device C 1024c, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscribing device A 1024a, event subscribing device B 1024b, and event subscribing device C 1024c.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the event publishing device 1022.

ESP subsystem 800 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscribing device A 1024a using the publish/subscribe API. Subscribing client B 1006 may be started by an event subscription application B executing at event subscribing device B 1024b using the publish/subscribe API. Subscribing client C 1008 may be started by an event subscription application C executing at event subscribing device C 1024c using the publish/subscribe API.

An event block object containing one or more event objects is injected into a source window of the one or more source windows 806 from an instance of an event publishing application on event publishing device 1022. The event block object may be generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 1006, and subscribing client C 1008 and to event subscription device A 1024a, event subscription device B 1024b, and event subscription device C 1024c. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscribing devices 1024a-c. For example, subscribing client A 1004, subscribing client B 1006, and subscribing client C 1008 may send the received event block object to event subscription device A 1024a, event subscription device B 1024b, and event subscription device C 1024c, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some embodiments, big data is processed for an analytics project after the data is received and stored. In other embodiments, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the current disclosure provide technical solutions to technical problems, such as computing problems that arise when an ESP device fails which results in a complete service interruption and potentially significant data loss. The data loss can be catastrophic when the streamed data is supporting mission critical operations such as those in support of an ongoing manufacturing or drilling operation. An embodiment of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, a processor and a computer-readable medium operably coupled to the processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11:
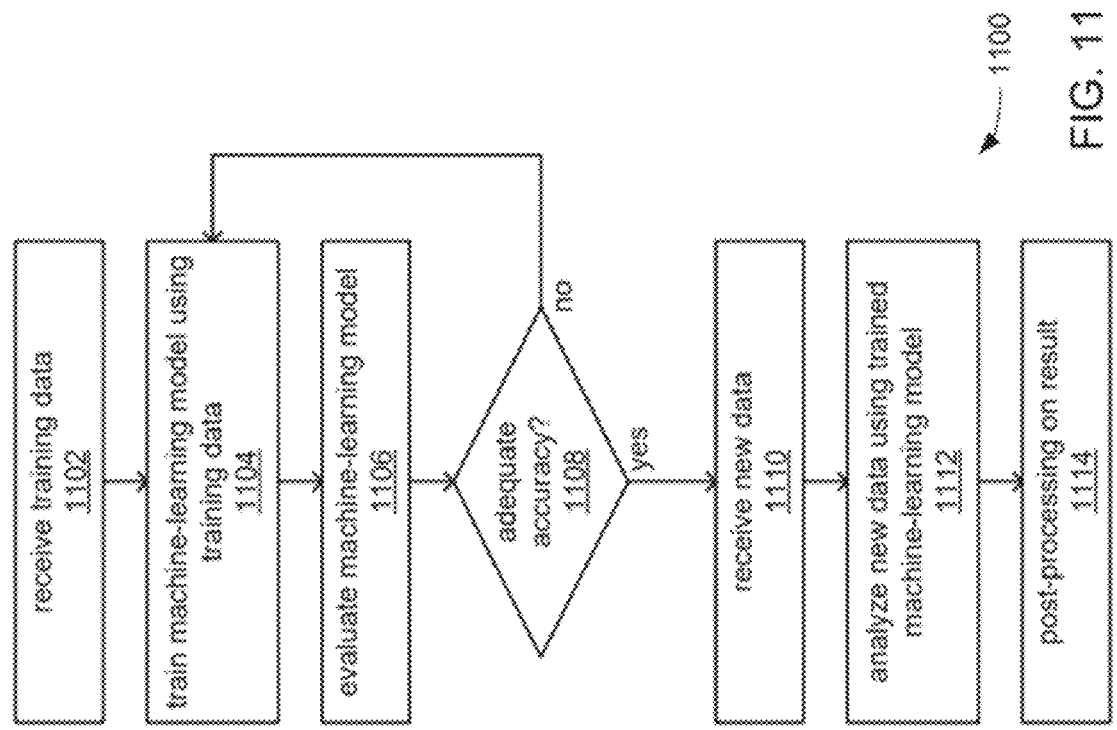
FIG. 11 illustrates a flow chart of an example of a process for generating and using a machine-learning model according to some aspects, according to embodiments of the present technology.

FIG. 11 is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these. Other networks may include transformers, large language models (LLMs), and agents for LLMs.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and managing machine-learning models can include SAS® Enterprise Miner, SAS® Rapid Predictive Modeler, and SAS® Model Manager, SAS Cloud Analytic Services (CAS)®, SAS Viya® of all which are by SAS Institute Inc. of Cary, North Carolina.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 11.

In block 1102, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 1104, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 1106, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if, at 1108, the machine-learning model has an inadequate degree of accuracy for a particular task, the process can return to block 1104, where the machine-learning model can be further trained using additional training data or otherwise modified to improve accuracy. However, if, at 1108, the machine-learning model has an adequate degree of accuracy for the particular task, the process can continue to block 1110.

In block 1110, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 1112, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 1114, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 12:
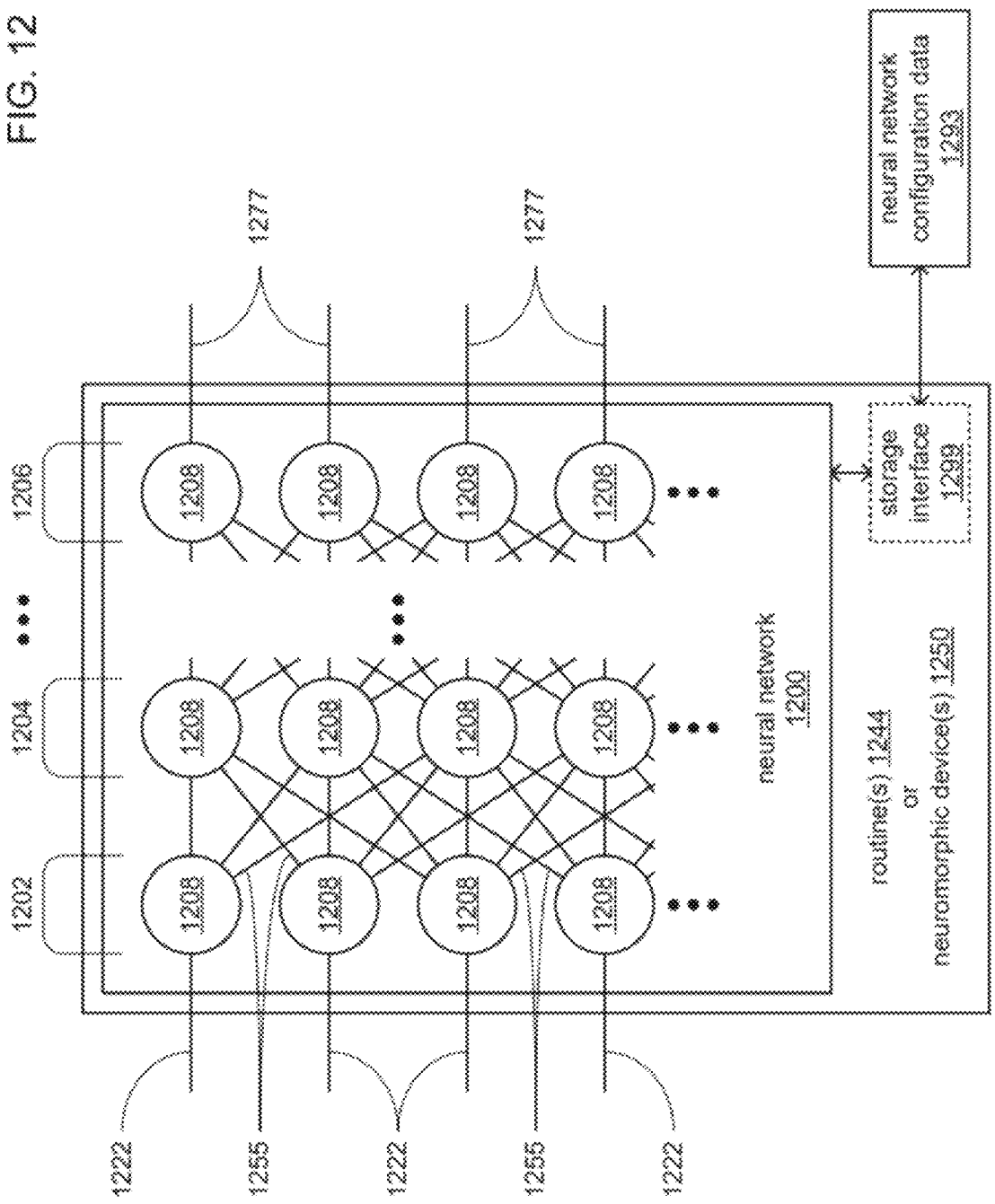
FIG. 12 illustrates an example of a machine-learning model as a neural network, according to embodiments of the present technology.

A more specific example of a machine-learning model is the neural network 1200 shown in FIG. 12. The neural network 1200 is represented as multiple layers of neurons 1208 that can exchange data between one another via connections 1255 that may be selectively instantiated thereamong. The layers include an input layer 1202 for receiving input data provided at inputs 1222, one or more hidden layers 1204, and an output layer 1206 for providing a result at outputs 1277. The hidden layer(s) 1204 are referred to as hidden because they may not be directly observable or have their inputs or outputs directly accessible during the normal functioning of the neural network 1200. Although the neural network 1200 is shown as having a specific number of layers and neurons for exemplary purposes, the neural network 1200 can have any number and combination of layers, and each layer can have any number and combination of neurons.

The neurons 1208 and connections 1255 thereamong may have numeric weights, which can be tuned during training of the neural network 1200. For example, training data can be provided to at least the inputs 1222 to the input layer 1202 of the neural network 1200, and the neural network 1200 can use the training data to tune one or more numeric weights of the neural network 1200. In some examples, the neural network 1200 can be trained using backpropagation. Backpropagation can include determining a gradient of a particular numeric weight based on a difference between an actual output of the neural network 1200 at the outputs 1277 and a desired output of the neural network 1200. Based on the gradient, one or more numeric weights of the neural network 1200 can be updated to reduce the difference therebetween, thereby increasing the accuracy of the neural network 1200. This process can be repeated multiple times to train the neural network 1200. For example, this process can be repeated hundreds or thousands of times to train the neural network 1200.

In some examples, the neural network 1200 is a feed-forward neural network. In a feed-forward neural network, the connections 1255 are instantiated and/or weighted so that every neuron 1208 only propagates an output value to a subsequent layer of the neural network 1200. For example, data may only move one direction (forward) from one neuron 1208 to the next neuron 1208 in a feed-forward neural network. Such a "forward" direction may be defined as proceeding from the input layer 1202 through the one or more hidden layers 1204, and toward the output layer 1206.

In other examples, the neural network 1200 may be a recurrent neural network. A recurrent neural network can include one or more feedback loops among the connections 1255, thereby allowing data to propagate in both forward and backward through the neural network 1200. Such a "backward" direction may be defined as proceeding in the opposite direction of forward, such as from the output layer 1206 through the one or more hidden layers 1204, and toward the input layer 1202. This can allow for information to persist within the recurrent neural network. For example, a recurrent neural network can determine an output based at least partially on information that the recurrent neural network has seen before, giving the recurrent neural network the ability to use previous input to inform the output.

In some examples, the neural network 1200 operates by receiving a vector of numbers from one layer; transforming the vector of numbers into a new vector of numbers using a matrix of numeric weights, a nonlinearity, or both; and providing the new vector of numbers to a subsequent layer ("subsequent" in the sense of moving "forward") of the neural network 1200. Each subsequent layer of the neural network 1200 can repeat this process until the neural network 1200 outputs a final result at the outputs 1277 of the output layer 1206. For example, the neural network 1200 can receive a vector of numbers at the inputs 1222 of the input layer 1202. The neural network 1200 can multiply the vector of numbers by a matrix of numeric weights to determine a weighted vector. The matrix of numeric weights can be tuned during the training of the neural network 1200. The neural network 1200 can transform the weighted vector using a nonlinearity, such as a sigmoid tangent or the hyperbolic tangent. In some examples, the nonlinearity can include a rectified linear unit, which can be expressed using the equation $y=\max(x, 0)$ where y is the output and x is an input value from the weighted vector. The transformed output can be supplied to a subsequent layer (e.g., a hidden layer 1204) of the neural network 1200. The subsequent layer of the neural network 1200 can receive the transformed output, multiply the transformed output by a matrix of numeric weights and a nonlinearity, and provide the result to yet another layer of the neural network 1200 (e.g., another, subsequent, hidden layer 1204). This process continues until the neural network 1200 outputs a final result at the outputs 1277 of the output layer 1206.

As also depicted in FIG. 12, the neural network 1200 may be implemented either through the execution of the instructions of one or more routines 1244 by central processing units (CPUs), or through the use of one or more neuromorphic devices 1250 that incorporate a set of memristors (or other similar components) that each function to implement one of the neurons 1208 in hardware. Where multiple neuromorphic devices 1250 are used, they may be interconnected in a depth-wise manner to enable implementing neural networks with greater quantities of layers, and/or in a width-wise manner to enable implementing neural networks having greater quantities of neurons 1208 per layer.

The neuromorphic device 1250 may incorporate a storage interface 1299 by which neural network configuration data 1293 that is descriptive of various parameters and hyper parameters of the neural network 1200 may be stored and/or retrieved. More specifically, the neural network configuration data 1293 may include such parameters as weighting and/or biasing values derived through the training of the neural network 1200, as has been described. Alternatively or additionally, the neural network configuration data 1293 may include such hyperparameters as the manner in which the neurons 1208 are to be interconnected (e.g., feedforward or recurrent), the trigger function to be implemented within the neurons 1208, the quantity of layers and/or the overall quantity of the neurons 1208. The neural network configuration data 1293 may provide such information for more than one neuromorphic device 1250 where multiple ones have been interconnected to support larger neural networks.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the communications grid computing system 400 discussed above.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network and/or a transformer model to analyze the data using fewer processing cycles and less memory than other approaches, while obtaining a similar or greater level of accuracy.

Some machine-learning approaches may be more efficiently and speedily executed and processed with machine-learning specific processors (e.g., not a generic CPU). Such processors may also provide energy savings when compared to generic CPUs. For example, some of these processors can include a graphical processing unit (GPU), an application-specific integrated circuit (ASIC), a field-programmable gate array (FPGA), an artificial intelligence (AI) accelerator, a neural computing core, a neural computing engine, a neural processing unit, a purpose-built chip architecture for deep learning, and/or some other machine-learning specific processor that implements a machine learning approach or one or more neural networks using semiconductor (e.g., silicon (Si), gallium arsenide(GaAs)) devices. These processors may also be employed in heterogeneous computing architectures with a number of and/or a variety of different types of cores, engines, nodes, and/or layers to achieve various energy efficiencies, processing speed improvements, data communication speed improvements, and/or data efficiency targets and improvements throughout various parts of the system when compared to a homogeneous computing architecture that employs CPUs for general purpose computing.

Figure 13:
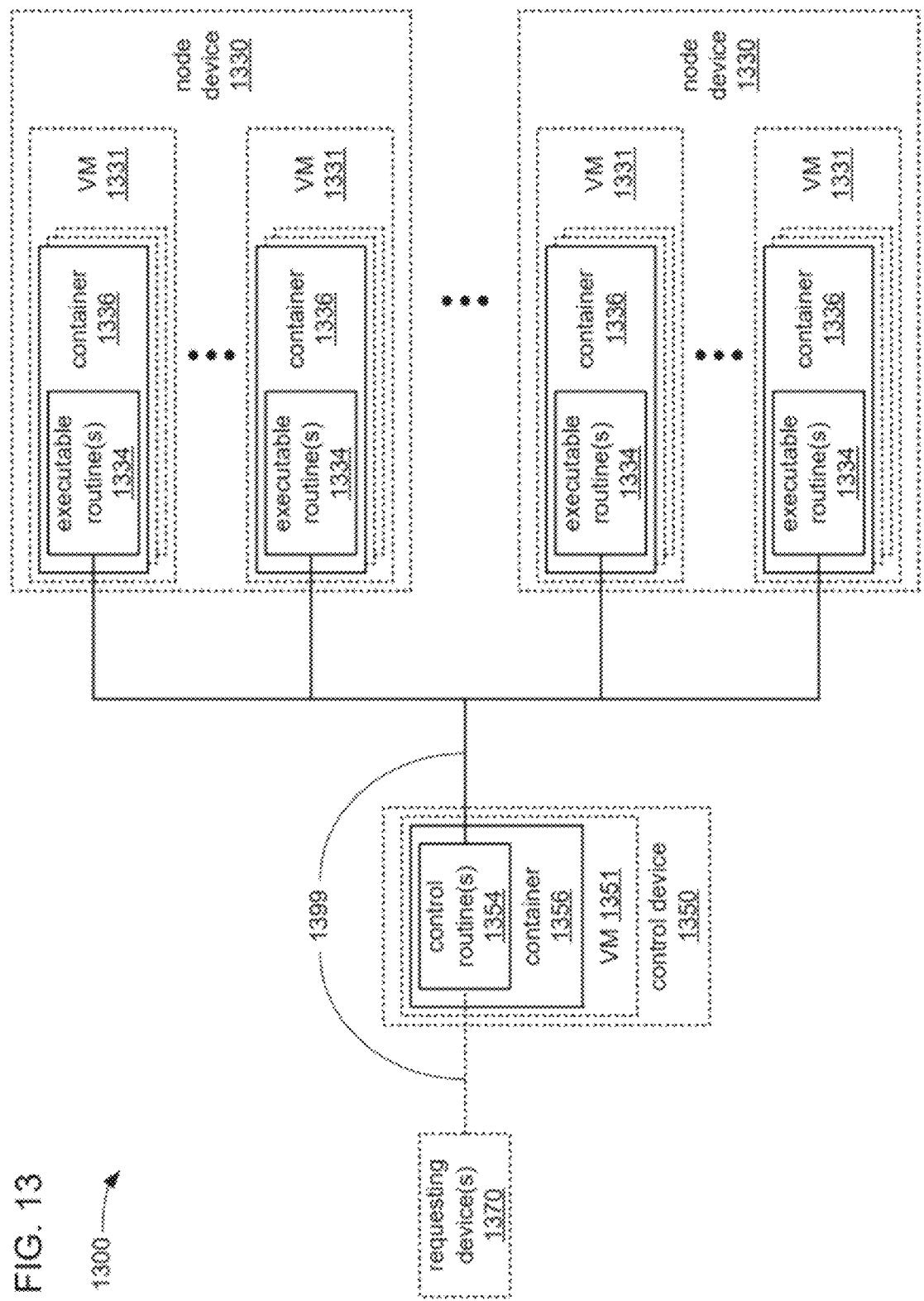
FIG. 13 illustrates various aspects of the use of containers as a mechanism to allocate processing, storage and/or other resources of a processing system to the performance of various analyses, according to embodiments of the present technology.

FIG. 13 illustrates various aspects of the use of containers 1336 as a mechanism to allocate processing, storage and/or other resources of a processing system 1300 to the performance of various analyses. More specifically, in a processing system 1300 that includes one or more node devices 1330 (e.g., the aforedescribed grid system 400), the processing, storage and/or other resources of each node device 1330 may be allocated through the instantiation and/or maintenance of multiple containers 1336 within the node devices 1330 to support the performance(s) of one or more analyses. As each container 1336 is instantiated, predetermined amounts of processing, storage and/or other resources may be allocated thereto as part of creating an execution environment therein in which one or more executable routines 1334 may be executed to cause the performance of part or all of each analysis that is requested to be performed.

It may be that at least a subset of the containers 1336 are each allocated a similar combination and amounts of resources so that each is of a similar configuration with a similar range of capabilities, and therefore, are interchangeable. This may be done in embodiments in which it is desired to have at least such a subset of the containers 1336 already instantiated prior to the receipt of requests to perform analyses, and thus, prior to the specific resource requirements of each of those analyses being known.

Alternatively or additionally, it may be that at least a subset of the containers 1336 are not instantiated until after the processing system 1300 receives requests to perform analyses where each request may include indications of the resources required for one of those analyses. Such information concerning resource requirements may then be used to guide the selection of resources and/or the amount of each resource allocated to each such container 1336. As a result, it may be that one or more of the containers 1336 are caused to have somewhat specialized configurations such that there may be differing types of containers to support the performance of different analyses and/or different portions of analyses.

It may be that the entirety of the logic of a requested analysis is implemented within a single executable routine 1334. In such embodiments, it may be that the entirety of that analysis is performed within a single container 1336 as that single executable routine 1334 is executed therein. However, it may be that such a single executable routine 1334, when executed, is at least intended to cause the instantiation of multiple instances of itself that are intended to be executed at least partially in parallel. This may result in the execution of multiple instances of such an executable routine 1334 within a single container 1336 and/or across multiple containers 1336.

Alternatively or additionally, it may be that the logic of a requested analysis is implemented with multiple differing executable routines 1334. In such embodiments, it may be that at least a subset of such differing executable routines 1334 are executed within a single container 1336. However, it may be that the execution of at least a subset of such differing executable routines 1334 is distributed across multiple containers 1336.

Where an executable routine 1334 of an analysis is under development, and/or is under scrutiny to confirm its functionality, it may be that the container 1336 within which that executable routine 1334 is to be executed is additionally configured assist in limiting and/or monitoring aspects of the functionality of that executable routine 1334. More specifically, the execution environment provided by such a container 1336 may be configured to enforce limitations on accesses that are allowed to be made to memory and/or I/O addresses to control what storage locations and/or I/O devices may be accessible to that executable routine 1334. Such limitations may be derived based on comments within the programming code of the executable routine 1334 and/or other information that describes what functionality the executable routine 1334 is expected to have, including what memory and/or I/O accesses are expected to be made when the executable routine 1334 is executed. Then, when the executable routine 1334 is executed within such a container 1336, the accesses that are attempted to be made by the executable routine 1334 may be monitored to identify any behavior that deviates from what is expected.

Where the possibility exists that different executable routines 1334 may be written in different programming languages, it may be that different subsets of containers 1336 are configured to support different programming languages. In such embodiments, it may be that each executable routine 1334 is analyzed to identify what programming language it is written in, and then what container 1336 is assigned to support the execution of that executable routine 1334 may be at least partially based on the identified programming language. Where the possibility exists that a single requested analysis may be based on the execution of multiple executable routines 1334 that may each be written in a different programming language, it may be that at least a subset of the containers 1336 are configured to support the performance of various data structure and/or data format conversion operations to enable a data object output by one executable routine 1334 written in one programming language to be accepted as an input to another executable routine 1334 written in another programming language.

As depicted, at least a subset of the containers 1336 may be instantiated within one or more VMs 1331 that may be instantiated within one or more node devices 1330. Thus, in some embodiments, it may be that the processing, storage and/or other resources of at least one node device 1330 may be partially allocated through the instantiation of one or more VMs 1331, and then in turn, may be further allocated within at least one VM 1331 through the instantiation of one or more containers 1336.

In some embodiments, it may be that such a nested allocation of resources may be carried out to affect an allocation of resources based on two differing criteria. By way of example, it may be that the instantiation of VMs 1331 is used to allocate the resources of a node device 1330 to multiple users or groups of users in accordance with any of a variety of service agreements by which amounts of processing, storage and/or other resources are paid for each such user or group of users. Then, within each VM 1331 or set of VMs 1331 that is allocated to a particular user or group of users, containers 1336 may be allocated to distribute the resources allocated to each VM 1331 among various analyses that are requested to be performed by that particular user or group of users.

As depicted, where the processing system 1300 includes more than one node device 1330, the processing system 1300 may also include at least one control device 1350 within which one or more control routines 1354 may be executed to control various aspects of the use of the node device(s) 1330 to perform requested analyses. By way of example, it may be that at least one control routine 1354 implements logic to control the allocation of the processing, storage and/or other resources of each node device 1300 to each VM 1331 and/or container 1336 that is instantiated therein. Thus, it may be the control device(s) 1350 that effects a nested allocation of resources, such as the aforedescribed example allocation of resources based on two differing criteria.

As also depicted, the processing system 1300 may also include one or more distinct requesting devices 1370 from which requests to perform analyses may be received by the control device(s) 1350. Thus, and by way of example, it may be that at least one control routine 1354 implements logic to monitor for the receipt of requests from authorized users and/or groups of users for various analyses to be performed using the processing, storage and/or other resources of the node device(s) 1330 of the processing system 1300. The control device(s) 1350 may receive indications of the availability of resources, the status of the performances of analyses that are already underway, and/or still other status information from the node device(s) 1330 in response to polling, at a recurring interval of time, and/or in response to the occurrence of various preselected events. More specifically, the control device(s) 1350 may receive indications of status for each container 1336, each VM 1331 and/or each node device 1330. At least one control routine 1354 may implement logic that may use such information to select container(s) 1336, VM(s) 1331 and/or node device(s) 1330 that are to be used in the execution of the executable routine(s) 1334 associated with each requested analysis.

As further depicted, in some embodiments, the one or more control routines 1354 may be executed within one or more containers 1356 and/or within one or more VMs 1351 that may be instantiated within the one or more control devices 1350. It may be that multiple instances of one or more varieties of control routine 1354 may be executed within separate containers 1356, within separate VMs 1351 and/or within separate control devices 1350 to better enable parallelized control over parallel performances of requested analyses, to provide improved redundancy against failures for such control functions, and/or to separate differing ones of the control routines 1354 that perform different functions. By way of example, it may be that multiple instances of a first variety of control routine 1354 that communicate with the requesting device(s) 1370 are executed in a first set of containers 1356 instantiated within a first VM 1351, while multiple instances of a second variety of control routine 1354 that control the allocation of resources of the node device(s) 1330 are executed in a second set of containers 1356 instantiated within a second VM 1351. It may be that the control of the allocation of resources for performing requested analyses may include deriving an order of performance of portions of each requested analysis based on such factors as data dependencies thereamong, as well as allocating the use of containers 1336 in a manner that effectuates such a derived order of performance.

Where multiple instances of control routine 1354 are used to control the allocation of resources for performing requested analyses, such as the assignment of individual ones of the containers 1336 to be used in executing executable routines 1334 of each of multiple requested analyses, it may be that each requested analysis is assigned to be controlled by just one of the instances of control routine 1354. This may be done as part of treating each requested analysis as one or more "ACID transactions" that each have the four properties of atomicity, consistency, isolation and durability such that a single instance of control routine 1354 is given full control over the entirety of each such transaction to better ensure that either all of each such transaction is either entirely performed or is entirely not performed. As will be familiar to those skilled in the art, allowing partial performances to occur may cause cache incoherencies and/or data corruption issues.

As additionally depicted, the control device(s) 1350 may communicate with the requesting device(s) 1370 and with the node device(s) 1330 through portions of a network 1399 extending thereamong. Again, such a network as the depicted network 1399 may be based on any of a variety of wired and/or wireless technologies, and may employ any of a variety of protocols by which commands, status, data and/or still other varieties of information may be exchanged. It may be that one or more instances of a control routine 1354 cause the instantiation and maintenance of a web portal or other variety of portal that is based on any of a variety of communication protocols, etc. (e.g., a restful API). Through such a portal, requests for the performance of various analyses may be received from requesting device(s) 1370, and/or the results of such requested analyses may be provided thereto. Alternatively or additionally, it may be that one or more instances of a control routine 1354 cause the instantiation of and maintenance of a message passing interface and/or message queues. Through such an interface and/or queues, individual containers 1336 may each be assigned to execute at least one executable routine 1334 associated with a requested analysis to cause the performance of at least a portion of that analysis.

Although not specifically depicted, it may be that at least one control routine 1354 may include logic to implement a form of management of the containers 1336 based on the Kubernetes container management platform promulgated by Could Native Computing Foundation of San Francisco, CA, USA. In such embodiments, containers 1336 in which executable routines 1334 of requested analyses may be instantiated within "pods" (not specifically shown) in which other containers may also be instantiated for the execution of other supporting routines. Such supporting routines may cooperate with control routine(s) 1354 to implement a communications protocol with the control device(s) 1350 via the network 1399 (e.g., a message passing interface, one or more message queues, etc.). Alternatively or additionally, such supporting routines may serve to provide access to one or more storage repositories (not specifically shown) in which at least data objects may be stored for use in performing the requested analyses.

The present disclosure is directed to DAGs, and more particularly to learning a DAG. Learning a DAG may include determining a topological order of a DAG. Learning a DAG may also include determining a correct set of edges between nodes or vertices of the DAG. Each node of a DAG may correspond to one variable among a set of variables. Variables may represent tasks, data, entities, etc. Each edge between two variables may correspond to a relationship or dependency between the two connected variables. A DAG is, therefore, a versatile structure that allows efficient representation and analysis of dependencies between variables. DAGs may be useful in describing complex processes and have wide-reaching applications, such as in machine learning (e.g., for deep learning), cryptocurrency and blockchain, communication networks, utilities, retail and marketing, forensics, biology and life sciences, data processing, versioning, scheduling, etc.

Depending on the number of variables and the complexity of the dependencies between those variables, learning a DAG may be quite challenging. For example, basic DAGs with a small number of variables having straightforward dependencies may be created manually by industry experts. However, as the number of variables increases and/or the dependencies between variables become more complex, as in most real-world applications, manually creating DAGs becomes infeasible. For example, determining the correct topological order of a DAG is a known combinatorial NP-hard problem that scales super-exponentially with the number of variables in the DAG. In other words, for a number of variables, n, the number of possible topological orders for a DAG may be n!:

TABLE 1

| n | n! |
|---|---|
| 5 | 120 |
| 6 | 720 |
| 7 | 5040 |
| 8 | 40320 |
| 9 | 362880 |
| 10 | 3628800 |
| 11 | 39916800 |
| 12 | 4.79E+08 |
| 13 | 6.23E+09 |
| 14 | 8.72E+10 |
| 15 | 1.31E+12 |
| 16 | 2.09E+13 |
| 17 | 3.56E+14 |
| 18 | 6.4E+15 |
| 19 | 1.22E+17 |
| 20 | 2.43E+18 |

As seen from Table 1 above, even for 20 variables, the number of possible topological orders for a DAG may be more than 2 quintillion ($10^{18}$), which may take weeks or months to create manually by industry experts. Real-world applications often have hundreds or thousands or millions of variables having an astronomical number of possible topological orders. Given the constraints associated with manually determining the topological order of a DAG, for real-world applications, manually determining the topological order is not practical and potentially impossible.

Therefore, given the large set of possibilities for the topological order, learning a DAG manually by an industry expert is infeasible and undesirable. While software tools, libraries, and algorithms have now become available to assist with learning a DAG, such tools, libraries, and algorithms are often insufficient and suffer from deficiencies. For example, DAGs learned by these mechanisms may be inaccurate, consume inordinate amounts of computing resources, and/or be too slow.

Because DAGs are used to represent dependencies and relationships between variables, accuracy of a DAG is critical in making accurate inferences from the DAG. For example, when a DAG is used for data processing or task scheduling, accuracy of a DAG may impact the execution of the data processing tasks or task scheduling. As an example, if dependencies are not accurately represented in DAG, tasks may be executed in the wrong order, with wrong inputs, may cause system breakdown, computability issues, errors, etc., and may lead to incorrect results. By accurately representing DAGs, unnecessary delays, redundant computations, or downstream corrections may be avoided. In certain applications where DAGs are used for modeling and analysis, the accuracy of a DAG is critical in making informed, correct, and predictable decisions using the DAG. The accuracy of a DAG may directly impact the reliability, efficiency, predictability, and otherwise successful implementation of applications that rely on DAGs.

In addition to accuracy, the speed of learning a DAG may be important consideration when learning a DAG. Given the large number of possibilities of topological orders and the correct set of edges, large amounts of computing resources are needed to learn a DAG. The speed at which a DAG is accurately learned may also be critical, particularly in applications with frequently changing variables and/or dependencies. Existing techniques for determining the topological order are either accurate but slow or less accurate but fast. Thus, existing techniques compromise on either accuracy or speed.

The present disclosure provides technical solutions for learning a DAG that are at least as accurate as and at least as fast as existing solutions. In particular, inventors have conducted experiments comparing the proposed approach with conventional approaches and found that the proposed approach is at least as accurate (and more accurate as the number of variables increases) as the more accurate conventional approach, while being at least as fast as the faster conventional approach. In other words, the proposed approach is able to determine the topological order of a DAG accurately and relatively quickly. The greater the number of variables, the greater is the amount of relative speedup with the proposed approach. In addition, this speedup in the proposed approach is achieved using a single Central Processing Unit (CPU) running in a Symmetric Multi-Processor (SMP) mode compared to multiple (e.g., 2000) CPUs running in a Massive Parallel Processor (MPP) mode that are needed in the conventional approach. Additional speedup may be obtained by using the MPP or distributed and parallel approach. Thus, the proposed approach provides technical improvements that learn a DAG much faster than the conventional approaches, while providing the same or greater accuracy as the conventional approaches. Additional details of the experiments are provided below.

Figure 14:
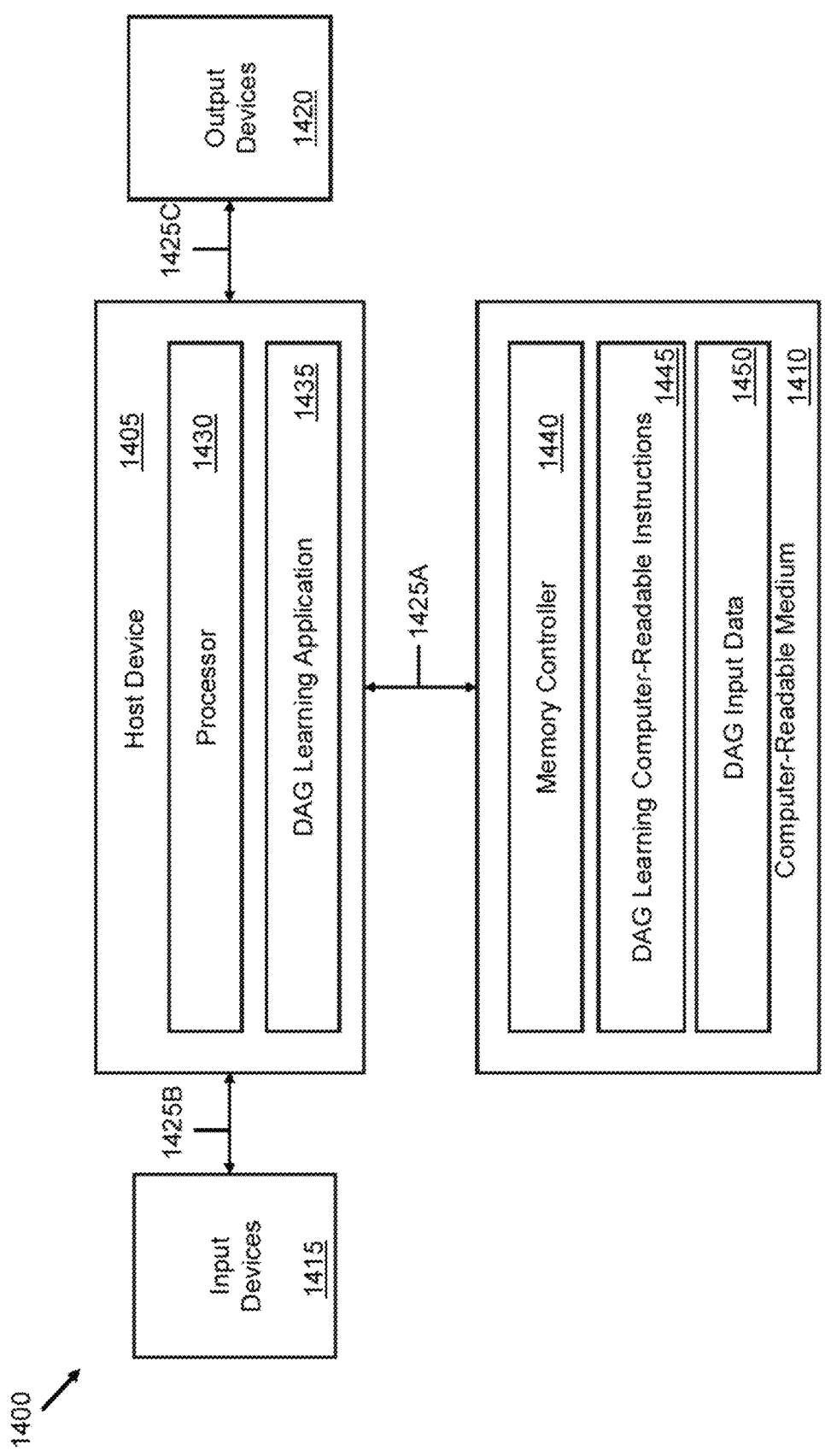
FIG. 14 illustrates a block diagram of an example DAG learning system, according to embodiments of the present technology.

Turning now to FIG. 14, a block diagram of an example DAG learning system 1400 is shown, in accordance with some embodiments of the present disclosure. The DAG learning system 1400 may be part of, or otherwise associated with, the computing environment 114. The DAG learning system 1400 includes a host device 1405 associated with a computer-readable medium 1410. The host device 1405 may be configured to receive input from one or more input devices 1415 and provide output to one or more output devices 1420. The host device 1405 may be configured to communicate with the computer-readable medium 1410, the input devices 1415, and the output devices 1420 via appropriate communication interfaces, buses, or channels 1425A, 1425B, and 1425C, respectively. The DAG learning system 1400 may be implemented in a variety of computing devices such as computers (e.g., desktop, laptop, etc.), servers, tablets, personal digital assistants, mobile devices, wearable computing devices such as smart watches, other handheld or portable devices, or any other computing units suitable for performing operations described herein using the host device 1405.

Further, some or all of the features described in the present disclosure may be implemented on a client device, an on-premise server device, a cloud/distributed computing environment, or a combination thereof. Additionally, unless otherwise indicated, functions described herein as being performed by a computing device (e.g., the DAG learning system 1400) may be implemented by multiple computing devices in a distributed environment, and vice versa.

The input devices 1415 may include any of a variety of input technologies such as a keyboard, stylus, touch screen, mouse, track ball, keypad, microphone, voice recognition, motion recognition, remote controllers, input ports, one or more buttons, dials, joysticks, point of sale/service devices, card readers, chip readers, and any other input peripheral that is associated with the host device 1405 and that allows an external source, such as a user, to enter information (e.g., data) into the host device and send instructions to the host device 1405. Similarly, the output devices 1420 may include a variety of output technologies such as external memories, printers, speakers, displays, microphones, light emitting diodes, headphones, plotters, speech generating devices, video devices, and any other output peripherals that are configured to receive information (e.g., data) from the host device 1405. The "data" that is either input into the host device 1405 and/or output from the host device may include any of a variety of textual data, numerical data, alphanumerical data, graphical data, video data, sound data, position data, combinations thereof, or other types of analog and/or digital data that is suitable for processing using the DAG learning system 1400.

The host device 1405 may include a processor 1430 that may be configured to execute instructions for running one or more applications associated with the host device 1405. In some embodiments, the instructions and data needed to run the one or more applications may be stored within the computer-readable medium 1410. The host device 1405 may also be configured to store the results of running the one or more applications within the computer-readable medium 1410. One such application on the host device 1405 may be a DAG learning application 1435. The DAG learning application 1435 may be used to learn or otherwise automatically generate a topological order for a DAG based on a plurality of datasets. The DAG learning application 1435 may also be used to perform causal discovery and/or causal estimation or be associated with systems that perform causal discovery and/or causal estimation.

The DAG learning application 1435 may be executed by the processor 1430. The instructions to execute the DAG learning application 1435 may be stored within the computer-readable medium 1410. To facilitate communication between the host device 1405 and the computer-readable medium 1410, the computer-readable medium may include or be associated with a memory controller 1440. Although the memory controller 1440 is shown as being part of the computer-readable medium 1410, in some embodiments, the memory controller may instead be part of the host device 1405 or another element of the DAG learning system 1400 and operatively associated with the computer-readable medium 1410. The memory controller 1440 may be configured as a logical block or circuitry that receives instructions from the host device 1405 and performs operations in accordance with those instructions. For example, to execute the DAG learning application 1435, the host device 1405 may send a request to the memory controller 1440. The memory controller 1440 may read the instructions associated with the DAG learning application 1435. For example, the memory controller 1440 may read DAG learning computer-readable instructions 1445 stored within the computer-readable medium 1410 and send those instructions back to the host device 1405. In some embodiments, those instructions may be temporarily stored within a memory on the host device 1405. The processor 1430 may then execute those instructions by performing one or more operations called for by those instructions.

The computer-readable medium 1410 may include one or more memory circuits. The memory circuits may be any of a variety of memory types, including a variety of volatile memories, non-volatile memories, or a combination thereof. For example, in some embodiments, one or more of the memory circuits or portions thereof may include NAND flash memory cores. In other embodiments, one or more of the memory circuits or portions thereof may include NOR flash memory cores, Static Random Access Memory (SRAM) cores, Dynamic Random Access Memory (DRAM) cores, Magnetoresistive Random Access Memory (MRAM) cores, Phase Change Memory (PCM) cores, Resistive Random Access Memory (ReRAM) cores, 3D XPoint memory cores, ferroelectric random-access memory (FeRAM) cores, and other types of memory cores that are suitable for use within the computer-readable medium 1410. In some embodiments, one or more of the memory circuits or portions thereof may be configured as other types of storage class memory ("SCM"). Generally speaking, the memory circuits may include any of a variety of Random Access Memory (RAM), Read-Only Memory (ROM), Programmable ROM (PROM), Erasable PROM (EPROM), Electrically EPROM (EEPROM), hard disk drives, flash drives, memory tapes, cloud memory, or any combination of primary and/or secondary memory that is suitable for performing the operations described herein.

The computer-readable medium 1410 may also be configured to store DAG input data 1450. The DAG input data 1450 may include, and/or be used to generate, observation vectors for use by the DAG learning application 1435.

It is to be understood that only some components of the DAG learning system 1400 are shown and described in FIG. 14. However, the DAG learning system 1400 may include other components such as various batteries and power sources, networking interfaces, routers, switches, external memory systems, controllers, etc. Generally speaking, the DAG learning system 1400 may include any of a variety of hardware, software, and/or firmware components that are needed or considered desirable in performing the functions described herein. Similarly, the host device 1405, the input devices 1415, the output devices 1420, and the computer-readable medium 1410, including the memory controller 1440, may include hardware, software, and/or firmware components that are considered necessary or desirable in performing the functions described herein.

Figure 15:
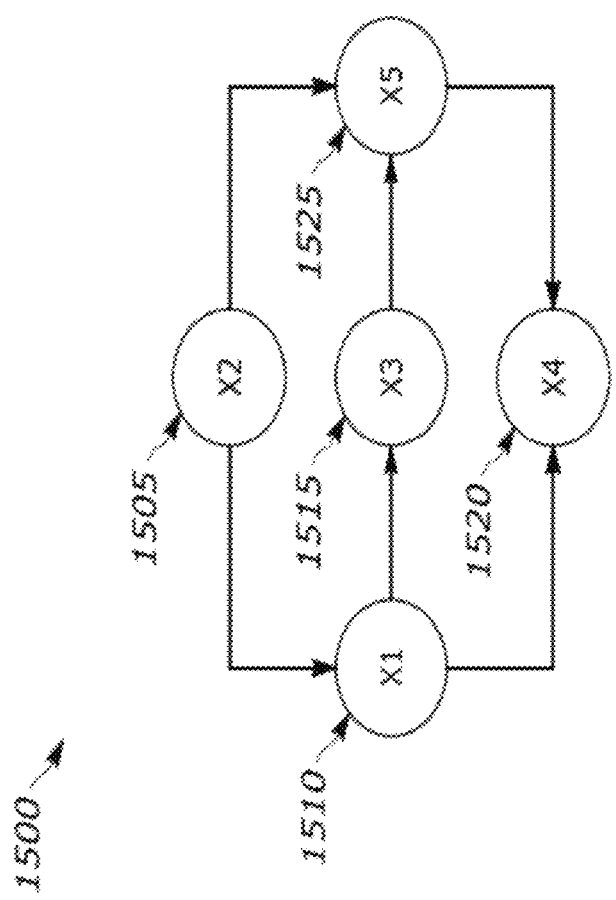
FIG. 15 illustrates an example DAG, according to embodiments of the present technology.

Turning to FIG. 15, an example of a DAG 1500 is shown, in accordance with some embodiments of the present disclosure. The DAG 1500 includes a plurality of vertices, also referred to as nodes. For example, the DAG 1500 includes a first node 1505, a second node 1510, a third node 1515, a fourth node 1520, and a fifth node 1525. Although the DAG 1500 includes five nodes, the DAG may include any number of nodes. Generally speaking, in real world applications, the DAG 1500 may include hundreds or thousands of nodes. Each node in the DAG 1500 may be representative of a variable in a dataset. For example, the first node 1505 is associated with a variable X2, the second node 1510 is associated with a variable X1, the third node 1515 is associated with a variable X3, the fourth node 1520 is associated with a variable X4, and the fifth node 1525 is associated with a variable X5.

Relationships between two variables of the DAG 1500 may be represented by one or more directed edges. A directed edge is an edge that is directed (e.g., has a direction) from one node to another. The DAG 1500 does not include any directed loops. A directed loop or closed loop occurs when starting from one node and traveling along the directed edges, a starting node may be reached. When there is a directed edge from a node x to a node y, node x is a parent of node y, or equivalently, node y is a child of node x. For example, based on the directed edges shown in the DAG 1500, the first node 1505 is a parent of the second node 1510 and of the fifth node 1525; the second node 1510 is a parent of the third node 1515 and of the fourth node 1520; the third node 1515 is a parent of the fifth node 1525; and the fifth node 1525 is a parent of the fourth node 1520. Because there does not exist a directed edge going into the first node 1505, the first node has no parent. Also, because the fourth node 1520 has no directed edge going out therefrom, the fourth node has no children.

In other words, the variable X2 is a parent of the variable X1 and of variable X5; the variable X1 is a parent of the variable X3 and of the variable X4; the variable X3 is a parent of the variable X5; the variable X5 is a parent of the variable X4; and the variable X4 has no children. All parents of a node construct a parent set of that node. For example, Table 3 below summarizes the parent set for each variable included in the DAG 1500.

TABLE 3

| Variable | Parent Set |
|---|---|
| X1 | {X2} |
| X2 | { } |
| X3 | {X1} |
| X4 | {X1, X5} |
| X5 | {X2, X3} |

The DAG 1500 has a topological order. A topological order may define the order in which the nodes of a DAG are to be traversed such that a node x is visited only after all the dependencies (e.g., parents) of that node x have been visited. In other words, if there is a directed edge from a node x to a node y, the node x is traversed before the node y. The topological order of a DAG may be considered a linear ordering of the nodes and may be represented by a vector, r.

For example, in the DAG 1500, the second node 1510 may be traversed only after the first node 1505 has been traversed. Thus, the second node 1510 may come after the first node 1505 in the topological order of the DAG 1500. Similarly, the third node 1515 may be traversed only after the second node 1510 has been traversed, the fourth node 1520 may be traversed only after both the second node and the fifth node 1525 have been traversed, while the fifth node may be traversed only after both the third node and the first node have been traversed. Thus, the order in which the variables of the DAG 1500 may be traversed may be represented as {X2, X1, X3, X5, X4}, which may correspond to a topological vector, r={2, 1, 3, 5, 4}. Because a DAG captures relationships between its variables by way of the directed edges, the correct topological order needs to be known to make correct relationship estimation.

Figure 16B:
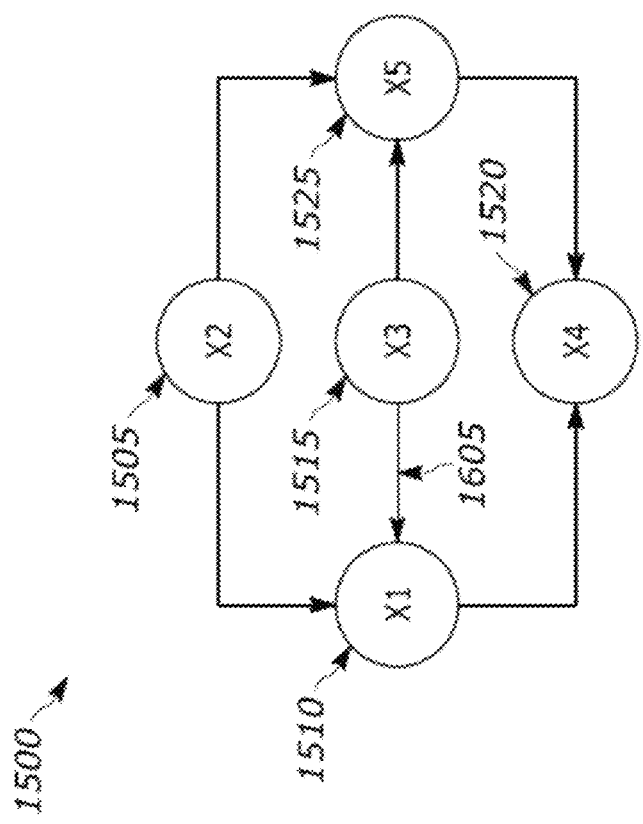
FIG. 16B illustrates an example of a reverse edge error in the DAG of FIG. 15, according to embodiments of the present technology.
Figure 16A:
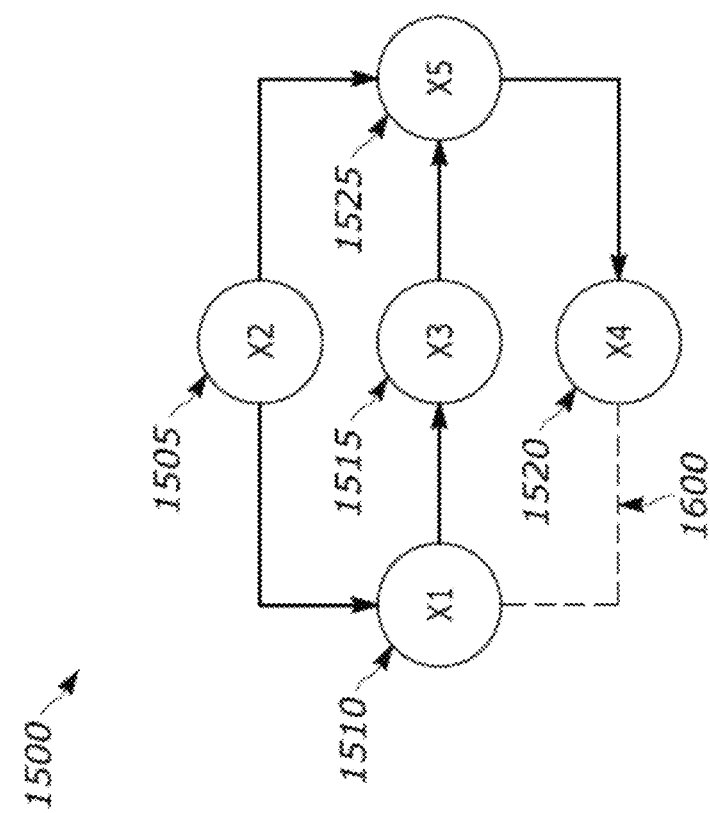
FIG. 16A illustrates an example of a missing edge error in the DAG of FIG. 15, according to embodiments of the present technology.
Figure 16C:
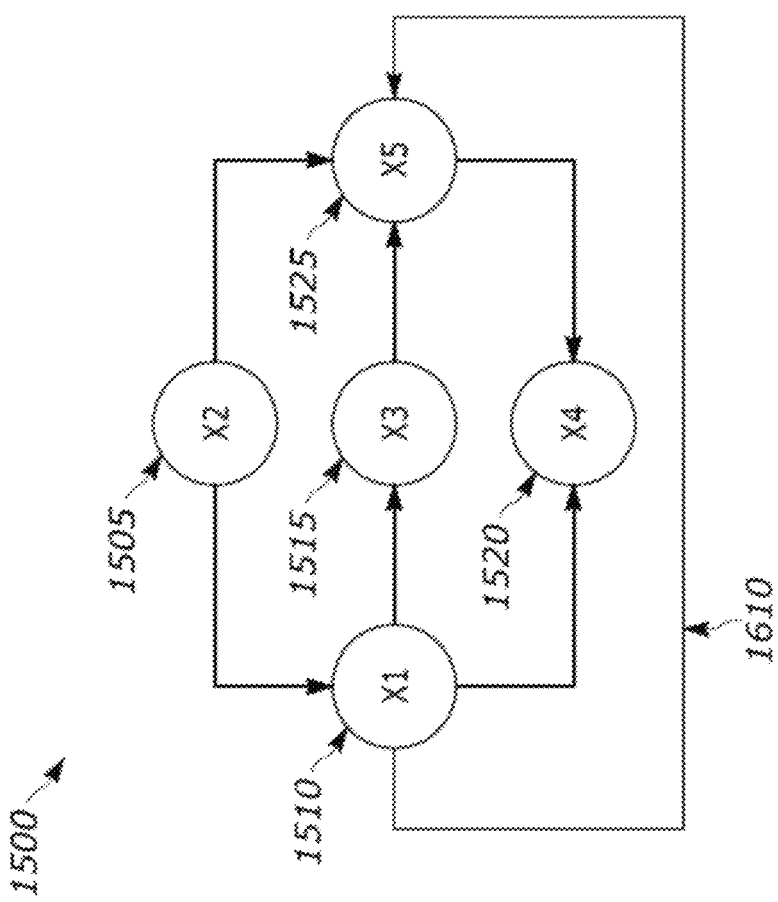
FIG. 16C illustrates an example of an extra edge error in the DAG of FIG. 15, according to embodiments of the present technology.

In some embodiments, errors in the directed edges of a DAG may result during the DAG learning process. For example, FIGS. 16A-16C show example errors that may occur while learning the DAG 1500. FIG. 16A shows a missing edge error in which a directed edge 1600 between the second node 1510 and the fourth node 1520 may be missing in the DAG 1500. FIG. 16B shows a reverse edge error in which a directed edge 1605 between the second node 1510 and the third node 1515 may be pointing in the wrong direction in the DAG 1500. FIG. 16C shows an extra edge error in which an extra directed edge 1610 may exist between the second node 1510 and the fifth node 1525 in the DAG 1500. Such errors may lead to incorrect causal inferences. In some embodiments, the total errors in a DAG (e.g., the DAG 1500) may be represented by a Structural Hamming Distance (SHD). In some embodiments, SHD may be a sum of a number of missing edges (e.g., the edge 1600), number of reverse edges (e.g., the edge 1605), and a number of extra edges (e.g., the edge 1610):

$$SHD = \#Missing\ edges + \#Reverse\ edges + \#Extra\ edges \quad \text{Equation 1}$$

The accuracy of a DAG may be determined based on the SHD. A lower value of the SHD may be desired during the DAG learning process. In general, lower the value of SHD, higher the accuracy of the topological order. For example, an SHD of zero may indicate that there are no edge related errors in a DAG (e.g., the DAG 1500).

Figure 17:
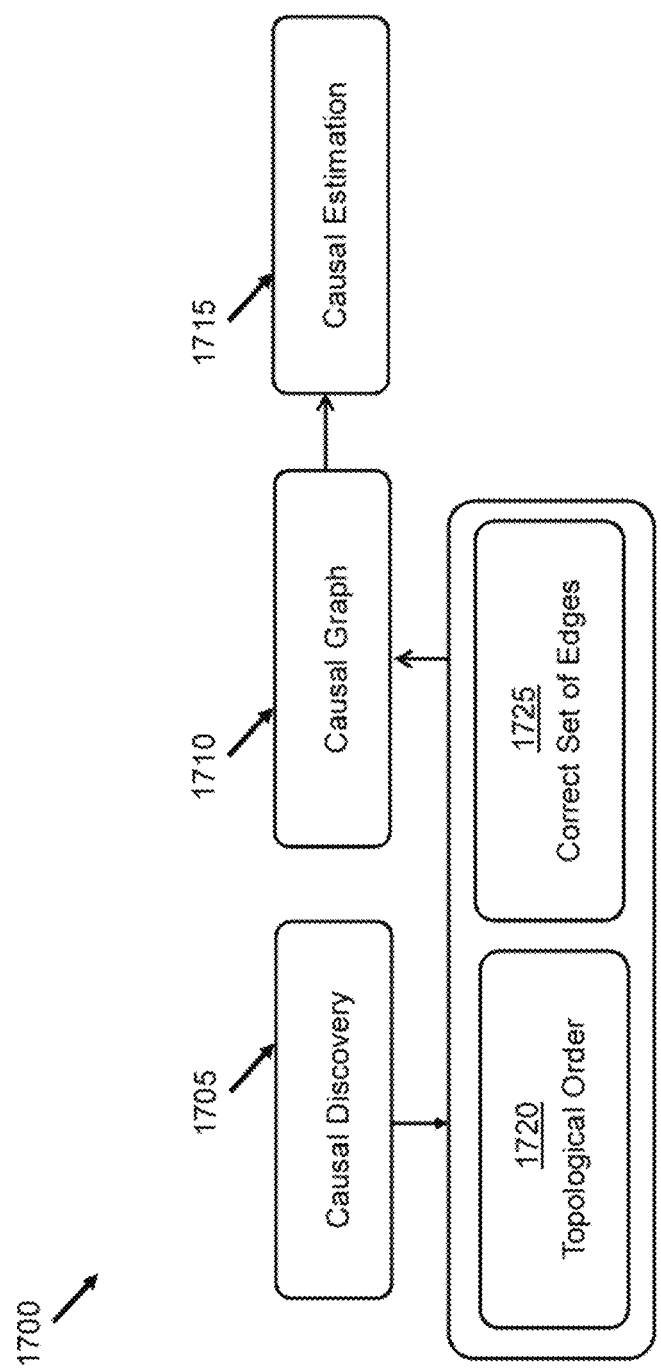
FIG. 17 illustrates a flowchart showing an example process for making causal inferences using causal graphs, according to embodiments of the present technology.

Turning now to FIG. 17, a high-level block diagram of a causal inference process 1700 is shown, in accordance with some embodiments of the present disclosure. Causal inference is the analysis of data for uncovering causal relationships between variables. In other words, the causal inference process 1700 may provide answers to questions that something is, or is likely to be, the cause of something else. For example, in some embodiments, the causal inference process 1700 may provide answers to "why" or "what if" type questions. In other embodiments, the causal inference process 1700 may be used to provide answers to other or additional types of questions. The causal inference process 1700 may have wide reaching applications. For example, in the context of epidemiology, causal inference may study patterns of health and disease based on certain aspects of a particular population. As another example, causal inference may be used to investigate how supply and demand depend on pricing or governmental policies. It is to be understood that any examples used herein are only for explanation purposes, and not intended to be limiting the disclosure in any way. The causal inference process 1700 may leverage machine learning and artificial intelligence to analyze data. In some embodiments, the causal inference process 1700 may be performed based on observation of the data. In some embodiments, the observed data may be transformed into a causal graph.

Thus, in some embodiments, the causal inference process 1700 may include causal discovery 1705, analysis by causal graph 1710, and causal estimation 1715. In particular, the causal discovery 1705 may learn the causal graph 1710, and the analysis of the causal graph 1710 determines which variables to use and which variables to discard when performing the causal estimation 1715. A variable may identify a property, element, or feature, factor, or otherwise characteristic of something. The variables may be dependent on the specific application. For example, if the application involves operation of a vehicle, the variables may include a type of vehicle, an oil pressure, a speed, a gear indicator, a gas tank level, a tire pressure for each tire, an engine temperature, a radiator level, etc. One or more variables in some embodiments may include time and/or date, or other measurable parameters.

In addition to identifying the variables, the causal discovery 1705 may involve gathering data values for each of the identified variables. In some embodiments, the data values may be provided by a field expert. In other embodiments, the data values may be gathered in other ways. In some embodiments, the variables and their associated data values may be considered the DAG input data 1450. In some embodiments, the DAG input data 1430 may include data captured as a function of time. For example, in some embodiments, the DAG input data 1430 may be captured at different time points, periodically, intermittently, when an event occurs, etc. In some embodiments, the DAG input data 1430 may include data captured at a high data rate such as 200 or more observation vectors per second or other suitable rates. In some embodiments, the DAG input data 1430 may include data captured under normal and abnormal operating conditions.

Further, in some embodiments, the DAG input data 1430 may be received directly or indirectly from the source and may or may not be pre-processed in some manner. For example, in some embodiments, the DAG input data 1430 may be pre-processed using an event stream processor such as the SAS® Event Stream Processing Engine (ESPE), developed and provided by SAS Institute Inc. of Cary, N.C., USA. For example, in some embodiments, the DAG input data 1430 may be generated as part of the Internet of Things (IoT), where things (e.g., machines, devices, phones, sensors) may be connected to networks and the data from these things collected and processed within the things and/or external to the things before being stored in the DAG input data. In some embodiments, the DAG input data 1430 may reside in the cloud or in an edge device.

In some embodiments, the DAG input data 1430 may include any type of content represented in any computer-readable format such as binary, alphanumeric, numeric, string, markup language, etc. The content may include textual information, numeric information, etc. that further may be encoded using various encoding techniques as understood by a person of skill in the art. The DAG input data 1430 may be stored in various compressed formats such as a coordinate format, a compressed sparse column format, a compressed sparse row format, etc. The DAG input data 1430 may be organized using delimited fields, such as comma or space separated fields, fixed width fields, using a SAS® dataset, etc. The SAS dataset may be a SAS® file stored in a SAS® library that a SAS® software tool creates and processes. The SAS dataset contains data values that are organized as a table of observation vectors (rows) and variables (columns) that can be processed by one or more SAS software tools. In some embodiments, the DAG input data 1430 may be stored using various data structures including one or more files of a file system, a relational database, one or more tables of a system of tables, a structured query language database, etc.

Thus, in some embodiments, the causal discovery 1705 may involve obtaining the DAG input data 1450. In some embodiments, the DAG input data 1450 may be arranged in a plurality of rows and a plurality of columns. Each row of the plurality of rows may be referred to as an "observation vector" or "observation record." Each column of the plurality of columns may be associated with one variable. Thus, for rows i=1, 2, . . . N, where N is the number of observation vectors, and for columns, j=1, 2, . . . , n, where n is the number of variables identified from the causal discovery 1705, an observation vector $x_i$ may have a value $x_{ij}$ associated with a row i and column j. An example observation vector $x_i$ may be given as: $\{x_{i1}, x_{i2}, \ldots, x_{in}\}$ where i=1, 2, . . . N. In some embodiments, the number of observation vectors in the DAG input data 1450 may be in the hundreds or thousands or millions depending on the application. Likewise, in some embodiments, the number of variables may be in the hundreds or thousands or millions depending on the application. In other embodiments, the data on the rows and columns may be transposed.

The observation vectors may be used to generate the causal graph 1710 by the DAG learning application 1435. Creating or learning the causal graph 1710 from the observation vectors is an NP-hard (where NP stands for non-deterministic polynomial time) problem. A computational problem, H, is said to be NP-hard if, for every problem, L, which may be solved in NP, there is a polynomial time reduction from L to H. In other words, if a problem, H, may be solved efficiently, the problem, L, may also be solved efficiently using the solution for H. NP-hard problems are computationally intensive. Thus, because creating the causal graph 1710 from the observation vectors is an NP-hard problem and NP-hard problems are computationally intensive, creating the causal graph is computationally intensive as well. The present disclosure provides a mechanism to generate the causal graph 1710 using fewer computational resources than existing mechanisms.

To generate the casual graph 1710, the causal discovery 1705 may first determine a topological order 1720 of the DAG based on the observation vectors and then find a correct set of edges 1725 (e.g., the existence of an edge between two variables) between the nodes according to the topological order. Determining the topological order 1720 of a DAG is discussed in more detail below. Finding the correct set of edges 1725 is discussed in greater detail in U.S. Pat. No. 11,443,198, filed on Nov. 9, 2021, and titled "Directed Acyclic Graph Machine Leaning System," the entirety of which is incorporated by reference herein. The result of the causal discovery 1705 is the causal graph 1710.

The causal graph 1710 may then be used to perform the causal estimation 1715. In other words, the causal graph 1710 may be used to help quantify the impact or effect of the variables on the data in the causal estimation 1715, and answer the questions mentioned above. In some embodiments, the causal estimation 1715 may be performed by the DAG learning application 1435 as well. In other embodiments, the DAG learning application 1435 may provide the causal graph 1710 to an associated application for performing the causal estimation 1715.

Figure 18:
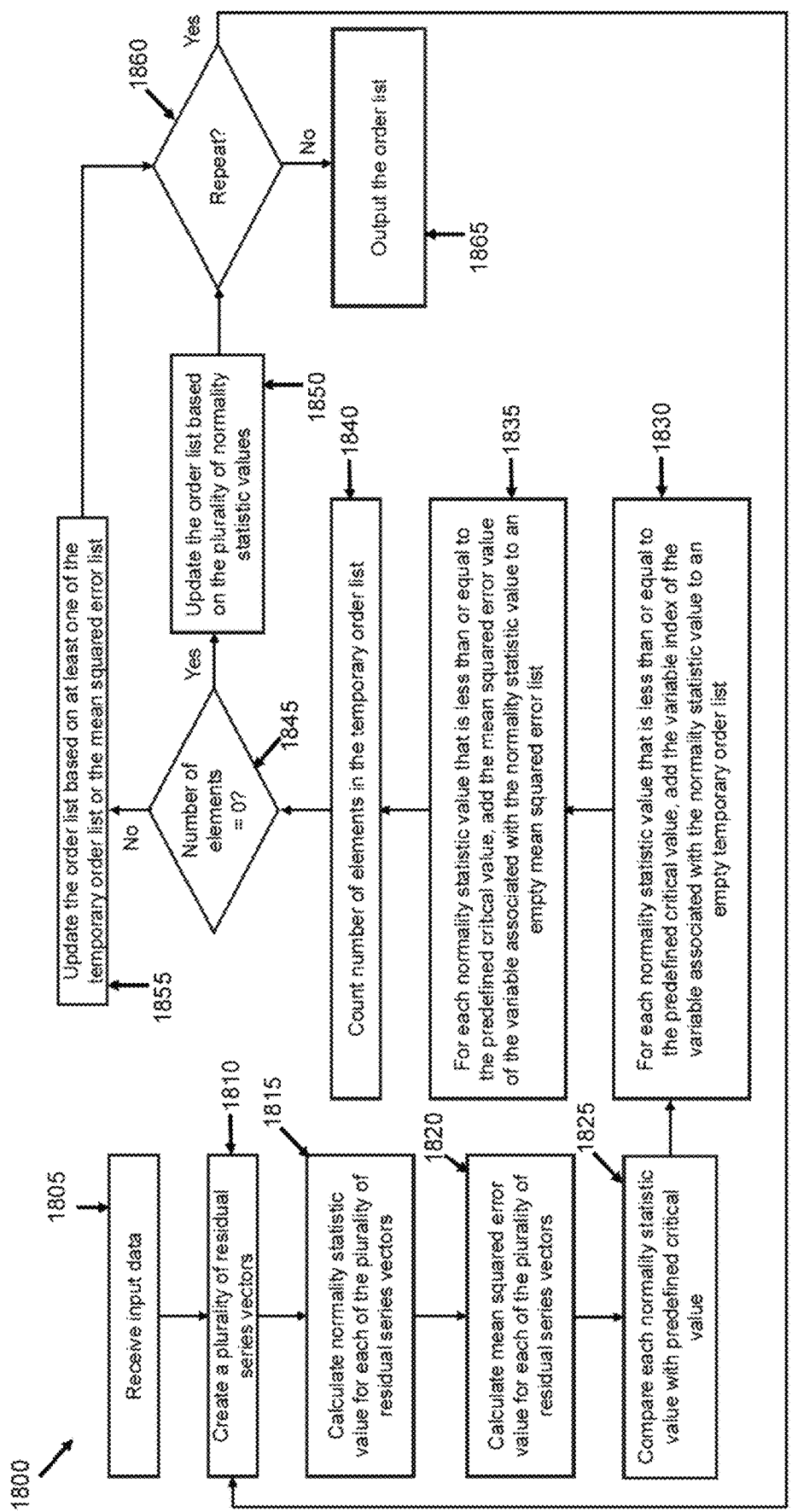
FIG. 18 illustrates a flowchart showing an example process for determining a topological order for a DAG, according to embodiments of the present technology.

Turning now to FIG. 18, an example flowchart outlining the operations of a process 1800 is shown, in accordance with some embodiments of the preset disclosure. The process 1800 may be used to determine the topological order 1720 of a DAG (e.g., the DAG 1500). The process 1800 may be executed by one or more processors (e.g., the processor 1430) associated with the DAG learning application 1435. In particular, one or more processors may execute computer-readable instructions (e.g., the DAG learning computer-readable instructions 1445) to determine the topological order 1720 of the DAG. The process 1800 may include other or additional operations depending upon the embodiment.

The determination of the topological order 1720 of a DAG as described herein is based on a nonlinear Gaussian additive model. Thus, the proposed approach is also referred to herein as the Gitto approach or the Gaussians in the Topological Order approach. Nonlinearity in the Gitto approach refers to an unknown functional form $f(\bullet)$ of the relationship between a variable $x_i$ and its parents $pa(x_i)$, where this relationship is nonlinear. In contrast, a linear model assumes that the functional form $f(\bullet)$ of the relationship between a variable $x_i$ and its parents $pa(x_i)$ is known and linear. Nonlinear models may, thus, be useful when the true relationships between the variables are more complex and unknown. Through hundreds of trials, the inventors have found that the nonlinear Gaussian additive model provides the correct topological order, particularly when used for continuous variables. The nonlinear Gaussian additive model indicates that the correct topological order 1720 of a DAG is based on a structural causal model that may be defined as:

$$x_i = f_i(pa(x_i)) + \epsilon_i, i=1, \ldots, n \qquad \text{Equation 2}$$

$$E_i \sim N(0, \sigma_i^2) \qquad \text{Equation 3}$$

where n is the number of variables in an observation vector, $x_i$ is the variable value of a variable in the $i^{th}$ observation vector, $f(\bullet)$ is a nonlinear function, $\epsilon_i$ are jointly independent error terms, and $pa(x_i)$ is the parental set of nodes for node $x_i$.

Referring specifically to the process 1800, the one or more processors may cause presentation of one or more user interface windows, which may include one or more menus and/or selectors such as drop-down menus, buttons, text boxes, hyperlinks, etc. associated with the DAG learning application 1435. The one or more menus and/or selectors may be accessed in various orders. An indicator may indicate one or more user selections from such one or more user interface windows, one or more data entries into a data field of the one or more user interface windows, one or more data items read from a command line, one or more data items read from a computer-readable medium (e.g., the computer-readable medium 1410), and/or one or more data items otherwise defined with one or more default values, etc. that are received as an input by DAG learning application 1435. Some of the operations of the process 1800 may be performed in parallel, for example, using a plurality of threads and/or a plurality of computing devices.

The process 1800 may, thus, include receiving, by the processor, input data (e.g., the DAG input data 1450) at operation 1805. In some embodiments, the input data may be received in the form of a first indicator identifying a name and location of where the DAG input data 1450 is stored. The processor may also receive a second indicator identifying the plurality of variables and their associated variable values to use for the process 1800. The processor may retrieve the variables and their associated variable values identified in the second indicator from the location/name identified in the first indicator at the operation 1805. Also, at the operation 1805, the one or more processors may sequentially assign each of the plurality of variables a unique variable index, k from k=1, 2, ..., n. In some embodiments, the processor may receive a copy of the DAG input data 1450.

Thus, at the operation 1805, the processor receives input data (e.g., the DAG input data 1450) having a plurality of observation vectors (e.g., ten thousand observation vectors) with each observation vector having variable values for a plurality of variables. The plurality of observation vectors may be arranged in the form of a matrix, as discussed above, having n (e.g., number of variables) columns and N (e.g., number of observation vectors) rows. In some embodiments, variables having the same index may be arranged in the same column of the matrix. For example, if the input data includes three observation vectors (any example used herein is not intended to be limiting and only used for explanation purposes) and each observation vector includes four variables (V1, V2, V3, V4), V1 may be column 1, V2 may be colun 2, V3 may be column 3, and V4 may be column 4 of the matrix, and the associated variable values for the variables of each observation vector may be provided in that column. Row 1 of the matrix may correspond to the first observation vector, row 2 may correspond to the second observation vector, and row 3 may correspond to the third observation vector. Variable V1 may be assigned a first index, variable V2 may be assigned a second index, variable V3 may be assigned a third index, and variable V4 may be assigned a fourth index. Thus, each variable has a variable index and each variable's index is unique and different from the variable index of another variable. The variable index may be a numerical value, alphabetical value, or alphanumerical value, Each column of the matrix may be associated with the same variable index. Thus, each of the plurality of observation vectors includes variable values of a plurality of variables, and a number of the plurality of variables in each of the plurality of observation vectors is n.

At operation 1810, the processor creates creating a plurality of residual series vectors. Each of the plurality of residual series vectors may be associated with one variable of the plurality of variables. Each of the residual series vectors may include residual values or variable values. The process 1800 may be repeated a plurality of times. In some embodiments, in the first iteration, each of the plurality of residual series vectors may include the variable values from the plurality of observation vectors received at the operation 1805. In some embodiments, for each iteration after the first iteration of the process 1800, each of the plurality of residual series vectors may include residual values that may be computed based on the variable values, as discussed in more detail below. In some embodiments, the residual series values may be computed based on a difference between an actual or expected variable value of a variable and a predicted variable value of that variable. In some embodiments, the processor may compute the plurality of residual series vectors in parallel using distributed computing.

The distributed computing system may include a main machine communicatively and operatively connected (e.g., via a network) to a plurality of worker machines. The main machine and each of the plurality of worker machines may include one or more discrete computing devices or machines, each having one or more processing cores. In some embodiments, the main machine and the plurality of worker machines may be communicatively and operatively connected via any type of suitable wired or wireless, public or private network, including cellular network, local area network, wide area network such as the Internet or the World Wide Web, Bluetooth®, or any other suitable network. The plurality of worker machines may operate based on instructions and commands from the main machine. For example, the main machine may request the plurality of worker machines to compute the plurality of residual series vectors. Each of the plurality of worker machines may compute one (or more) of the plurality of residual series vectors and send the computed vector to the main machine. The plurality of worker machines may be operatively and communicatively connected to each other as well.

At operation 1815, the processor calculates a normality statistic value for each of the plurality of residual series vectors created at the operation 1810 to obtain a plurality of normality statistic values. In particular, for each of the plurality of residual series vectors created at the operation 1810, the processor computes one normality statistic value. Thus, the processor may compute a plurality of normality statistic values and each normality statistic value may be associated with one variable of the plurality of variables. In other words, for each variable of the plurality of variables, the processor may compute one normality statistic value. For example, if the residual series vector S is associated with variable A and a normality statistic value is computed for the residual series vector S, the normality statistic value is computed for, and associated with, the variable A. Thus, for each of the plurality of residual series vectors, the processor computes a normality statistic value at the operation 1815.

In some embodiments, the normality statistic value may be used to determine if a residual series vector follows a standard normal distribution, also referred to as a Gaussian distribution. A standard normal distribution may be used to compare variable values. For example, the standard normal distribution may be used to compare how different the actual or expected variable value is from a predicted variable value. In other words, the standard normal distribution may be used to determine how likely it is that the estimated error value is normally distributed. The nonlinear Gaussian additive model assumes that the error terms are normally distributed. After estimating the unknown function $f(\bullet)$ and obtaining the residuals $\hat{\varepsilon}_i = x_i - \hat{f}_{DNN}(\text{pa}(x_i))$, the normality test may be used to determine how close the distribution of the residuals is to a normal distribution. For each residual series, a normality statistic value may be computed to measure how well the residuals follow a normal distribution. In some embodiments, the smaller the normality statistic value, the better the residual series vector follows a normal distribution.

In some embodiments, the normality statistic value may be an Anderson-Darling Statistic (ADS) value. In some embodiments, the ADS value for each of the plurality of residual series vectors may be computed as follows:

$$ADS^2 = -N - S \qquad \text{Equation 4}$$

Where:

$$S = \sum_{t=1}^{N} \frac{2t-1}{N} [\ln(\Phi(Y_t)) + \ln(1 - \Phi(Y_{N+1-t}))] \qquad \text{Equation 5}$$

$Y_t$ is the $t^{th}$ residual value of a residual series vector;
$Y_{N+1-t}$ is the $(N+1-t)^{th}$ residual value of the residual series vector; and
$\Phi$ is a cumulative distribution function of a standard normal distribution.

In other embodiments, other suitable normality statistic values may be used.

At operation 1820, the processor calculates a Mean Squared Error (MSE) value for each of the plurality of residual series vectors created at the operation 1810. In some embodiments, the processor may compute the mean squared error value as follows:

$$MSE_i = \frac{1}{N} \sum_{t=1,\ldots,N} r_{i,t}^2 \qquad \text{Equation 6}$$

where $r_{i,t}^2$ is the $t^{th}$ residual value from the $i^{th}$ residual series vector of the plurality of residual series vectors and $MSE_i$ is the mean squared error value of the $i^{th}$ residual series vector of the plurality of residual series vectors. Thus, the processor may compute a plurality of MSE values and each MSE value may be associated with one variable of the plurality of variables. In other words, for each variable of the plurality of variables, the processor may compute one MSE value. For example, if the residual series vector S is associated with variable A and an MSE value is computed for the residual series vector S, the MSE value is computed for, and associated with, the variable A. Thus, for each of the plurality of residual series vectors, the processor computes an MSE value at the operation 1820.

At operation 1825, the processor compares each of the plurality of normality statistic values computed at the operation 1815 with a predefined critical value. In some embodiments, the predefined critical value may be defined based on a significance level. In some embodiments, the comparison with the critical value may be used to determine if the residuals follow a normal distribution. In some embodiments, the critical value may be tabulated and depend on the sample size and a chosen significance level. For example, in some embodiments, a critical value of 0.787 corresponding to a significance level of 5% may be used. In some embodiments, if a significance level of 2.5% is desired, a critical level of 0.918 may be used. In some embodiments, if a significance level of 1.0% is desired, a critical level of 1.092 may be used. In some embodiments, if a significance level of 10% is desired, a critical level of 0.656 may be used. In some embodiments, if a significance level of 15% is desired, a critical level of 0.576 may be used. In other embodiments, other critical values may be used based on the desired significance level.

At operation 1830, the processor populates a temporary order list based on the comparison of the operation 1825. In particular, for each value of the plurality of normality statistic values that is less than or equal to the predefined critical value, the processor adds the variable index of the variable of the plurality of variables associated with the each value to an empty temporary order list. For example, if a normality statistic value is computed for, and associated with, the variable A at the operation 1815, and this normality statistic value has a value that is less than the predefined critical value, the processor may add the variable index assigned to variable A to the temporary order list. In some embodiments, the temporary order list is a list of variable indices. Thus, the temporary order list may be a 1×n vector, where n is the number of variables in the plurality of variables. Each variable may occur only once in the temporary order list.

At operation 1835, the processor populates an empty MSE list based on the comparison of the operation 1825. Thus, in addition to populating the temporary order list, for each value of the plurality of normality statistic values that is less than or equal to the predefined critical value, the processor adds the MSE value of the variable of the plurality of variables associated with the each value to an empty MSE list. For example, if a normality statistic value is computed for, and associated with, the variable A at the operation 1815, and this normality statistic value has a value that is less than the predefined critical value, then the processor adds the MSE computed for Variable A at the operation 1820 to the MSE list. In some embodiments, the MSE list is a list of MSE values computed for each of the n variables. Thus, the MSE list may be a 1×n vector, where n is the number of variables in the plurality of variables. The MSE value of each variable may occur only once in the MSE list.

At operation 1840, the processor counts a number of elements in the temporary order list that was populated at the operation 1830. In some embodiments, if the processor determines that no normality statistic values of the plurality of normality statistic values computed at the operation 1815 were less than or equal to the predefined critical value at the operation 1825, then no variable indices are added to the temporary order list at the operation 1830 and the temporary order list is empty. On the other hand, if the processor determines that one or more normality statistic values of the plurality of normality statistic values computed at the operation 1815 were less than or equal to the predefined critical value at the operation 1825, then the temporary order list includes the variable indices of the one or more variables at the operation 1830 and the temporary order list is not empty. Thus, depending on the number of plurality of normality statistic values that are less than or equal to the predefined critical value, the temporary order list may have zero or more but no more than n elements therein.

At operation 1845, the processor determines if the number of elements in the temporary order list is zero. If so, at the operation 1850, the processor updates an order list based on the plurality of normality statistic values computed at the operation 1815. The order list includes the variable indices of the plurality of variables and corresponds to the topological order of the DAG. In each iteration of the process 1800, one or more variable indices may be added to the order list. The order list may be a vector of size 1×n, where n is the number of variables in the plurality of variables. On the other hand, if at the operation 1845, the processor determines that the number of elements in the temporary order list is not zero (e.g., the temporary order list has at least one element), then at operation 1855 the processor updates the order list based on at least one of the temporary order list populated at the operation 1830 or the MSE list populated at the operation 1835. In particular and as described in more detail below, if the processor determines that the number of elements in the temporary order list is one, then the processor updates the order list based on the temporary order list. If the processor determines that the number of elements in the temporary order list is greater than one, then the processor updates the order list based on the temporary order list and the MSE list.

At operation 1860, the processor determines if the process 1800 is to be repeated. In some embodiments, the process 1800 may be repeated a plurality of times. In some embodiments, the plurality of times may be based on the number of variables, n, in the plurality of variables. In some embodiments, the plurality of times may be less than or equal to n. The plurality of times may be dynamically determined based on how many variables have been added to the order list in the correct topological order at the operations 1855 and 1850. Thus, in some embodiments, the processor may determine if the variable indices of all variables of the plurality of variables are in the order list. In each iteration, the correct topological order of one or more variables may be found. If the processor determines at the operation 1860 that all variables have been arranged in the correct topological order (e.g., the order list updated at the operations 1850 or 1855 of the current iteration includes the variable indices of all of the plurality of variables), the process 1800 need not be repeated and the processor outputs the order list from the operations 1850 or 1855 of the current iteration at operation 1865. On the other hand, if the processor determines at the operation 1860 that the process 1600 needs to be repeated again (e.g., because the variable index of at least one variable is missing from the order list updated at the operations 1850 or 1855 of the current iteration), the process 1800 loops back to the operation 1810 to repeat.

Figure 19:
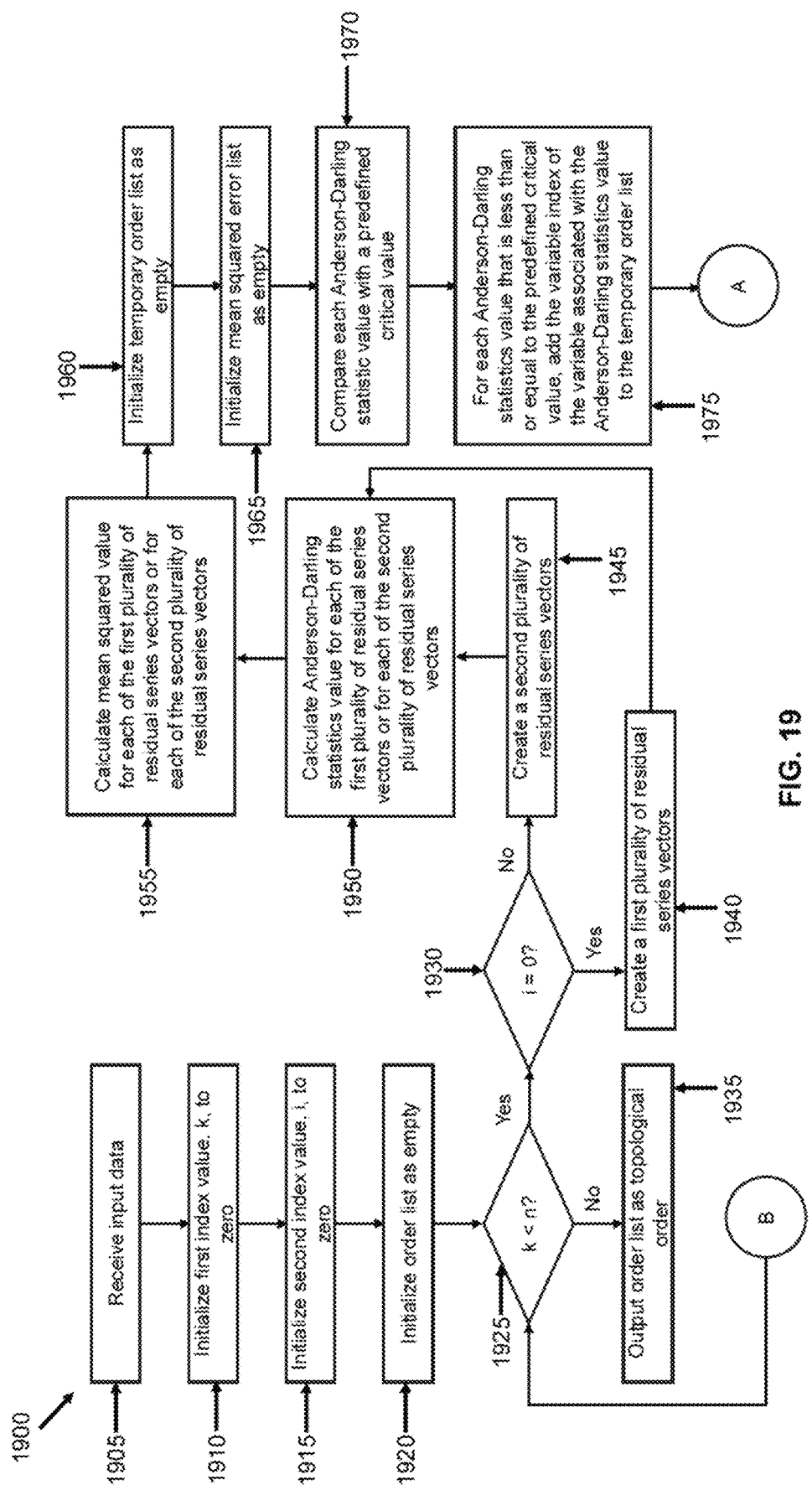
FIG. 19 illustrates a flowchart showing the process of FIG. 18 in greater detail, according to embodiments of the present technology.
Figure 19:
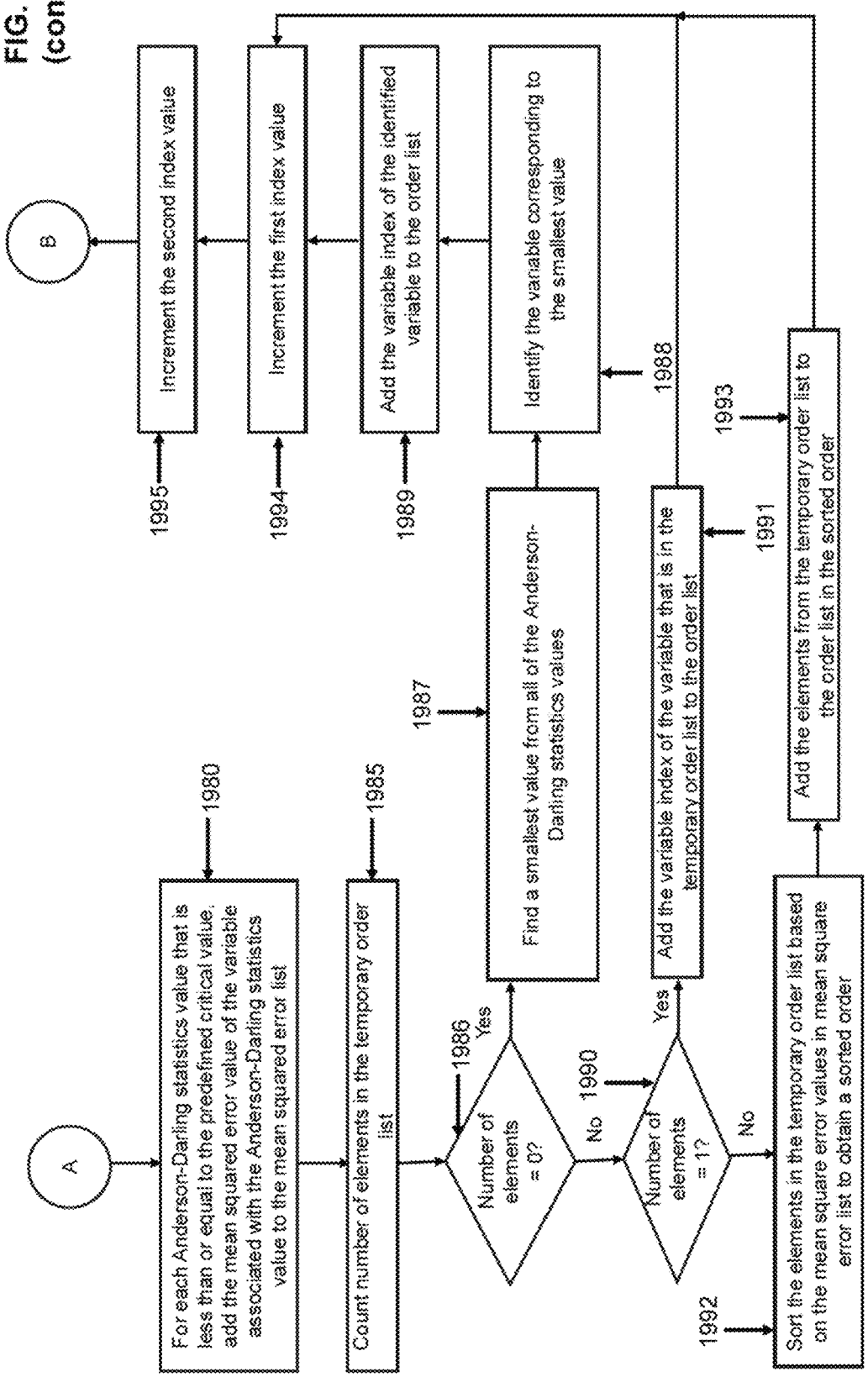

Turning now to FIG. 19, an example flowchart outlining the operations of a process 1900 is shown, in accordance with some embodiments of the preset disclosure. The process 1900 may be used to determine the topological order 1720 of a DAG (e.g., the DAG 1500). The process 1900 may be executed by one or more processors (e.g., the processor 1430) associated with the DAG learning application 1435. In particular, one or more processors may execute computer-readable instructions (e.g., the DAG learning computer-readable instructions 1445) to determine the topological order 1720 of the DAG. The process 1900 may include other or additional operations depending upon the embodiment. The process 1900 describes the process 1800 in more detail.

At operation 1905, the processor receives input data similar to the operation 1805. At operation 1910, the processor initializes a first index value, k, to zero. The first index value is used to determine how many times the process 1900 is to be repeated. In other words, the first index value is used to determine the plurality of times to repeat the process 1800 at the operation 1860. At operation 1915, the processor initializes a second index value, i, to zero. The second index value is used to determine if the process 1900 is in the first iteration or the subsequent iterations. Based on the second index value, the plurality of residual series vectors may be created. For example, in the first iteration of the process 1900 (e.g., when i=0), the plurality of residual series vectors may be created differently than in the subsequent iterations (e.g., when i #0). At operation 1920, the processor initializes an order list for the plurality of variables as empty. The order list includes the variable indices of the plurality of variables in the determined topological order. At the beginning of the first iteration, the order list is empty. During each iteration of the process 1900, at least one variable index is added to the order list.

At operation 1925, the processor compares the first index value k with n. In other words, the processor determines if k<n. Specifically, at the operation 1925, the processor determines whether the last iteration (e.g., the plurality of times of the operation 1860) is reached. If the last iteration is not reached, the process 1900 proceeds to operation 1930. Otherwise, if the processor determines at the operation 1925 that the first index value is equal to or greater than n, then the process 1900 proceeds to operation 1935 where the order list is output similar to the operation 1865. The order list of the operation 1935 corresponds to the topological order 1720 of the DAG.

At the operation 1930, the processor determines if the second index value i is equal to zero. In other words, the processor determines if i=0. Thus, the processor determines whether the process 1900 is in the first iteration (i=0). If the processor determines that the process 1900 is in the first iteration (that is, i=0), the process proceeds to operation 1940. If the processor determines at the operation 1930 that i≠0 (e.g., the process 1900 is in a second or subsequent iteration), then the process 1900 proceeds to operation 1945. The operations 1940 and 1945 are analogous to the operation 1810.

At the operation 1940, the processor creates a first plurality of residual series vectors based on the variable values of the plurality of variables from the plurality of observation vectors. In some embodiments, the first iteration is treated differently from the remaining iterations of the process 1900 because computation of residual values for the plurality of residual series vectors is not needed in the first iteration. As discussed in more detail below, the residual values are conditional on the variable values of the variables that are in the order list. In other words, the residual values of the plurality of residual series vectors are computed based on a comparison with the variable values of the variables that are in the order list. In the first iteration, the order list is empty. Thus, there are no variable values in the order list to compare with. Accordingly, there is no need to compute the residual values in the first iteration.

Thus, in the first iteration, each of the first plurality of residual series vectors includes the variable values for one variable of the plurality of variables from the input data. As indicated above, the plurality of observation vectors is arranged in a matrix of a plurality of rows and a plurality of columns. Each row is one observation vector and each column is one variable of the plurality of variables. Thus, each of the first plurality of residual series vectors includes the variable values from one column of the plurality of columns. The number of the first plurality of residual series vectors is equal to n. In other words, one residual series vector is created from each column of the matrix and each residual series vectors includes all of the variables values from the column associated with one variable. Therefore, each of the first plurality of residual series vectors is a vector of size 1×N, where N is a number of the plurality of observation vectors (e.g., number of the plurality of rows in the matrix). Upon creating the first plurality of residual series vectors at the operation 1940, the process 1900 proceeds to operation 1950.

If, at the operation 1930, the processor determined that i #0 (e.g., the process 1900 is in a second or subsequent iteration), then at the operation 1945, the processor creates a second plurality of residual series vectors based on residual values calculated from the variable values of the plurality of variables whose variable index is not in the order list. At the end of the first iteration, the order list has at least one variable index. Thus, at the beginning of the second iteration, there is at least one variable index in the order list based on which the residual values of each of the second plurality of residual series vectors are computed. Assuming there are k number of variable indices in the order list when the operation 1945 is reached, n−k number of the second plurality of residual series vectors are computed at the operation 1945, where n is the number of the plurality of variables in the input data. Thus, a number of the second plurality of residual series vectors is less than n. Further, each of the second plurality of residual series vectors is a vector of size 1×N, where N is a number of the plurality of observation vectors.

In some embodiments, the processor may compute the residual values of each of the second plurality of residual series vectors as follows:

$$r_{i_m,t} = x_{i_m,t} - \widehat{x_{i_m,t}} \qquad \text{Equation 7}$$

In Equation 7 above, $r_{i_m,t}$ is the $t^{th}$ residual value of the $i_m^{th}$ residual series vector of the second plurality of residual series vectors, t=1, ..., N, m=1, ..., n–k, N is a number of the plurality of observation vectors, k is the number of variables whose variable indices are in the order list, n–k is a number of variables of the plurality of variables whose variable index is not in the order list.

Further, in Equation 7 above:

$$x_{i_m,t} = f(x_{j_1,t}, \ldots, x_{j_k,t}) + \epsilon_{i_m,t}, t=1, \ldots, N \qquad \text{Equation 8}$$

$$\widehat{x_{i_m,t}} = \widehat{f_{ML}}(x_{j_1,t}, \ldots, x_{j_k,t}), t=1, \ldots, N \qquad \text{Equation 9}$$

In Equations 8 and 9 above, $(j_1, \ldots, j_k)$ is the order list, $x_{i_m,t}$ is a $t^{th}$ variable value for the it variable of the plurality of variables, $f(x_{j_1,t}, \ldots, x_{j_k,t})$ is a predictive function of projecting variables $x_{j_1}, \ldots, x_{j_k,t}$ on variable $x_{i_m}$, $\epsilon_{i_m,t}$ is an error term associated with the prediction of $x_{j_1,t}, \ldots, x_{i_m,t}$ on $x_{i_m,t}$, $\widehat{x_{i_m,t}}$ is a $t^{th}$ predicted variable value for the $i_m^{th}$ variable of the plurality of variables, and $\widehat{f_{ML}}(x_{j_1,t}, \ldots, x_{j_k,t})$ is a machine-learning-model-fitted function of $f(x_{j_1,t}, \ldots, x_{j_k,t})$.

In some embodiments, Equations 7-9 may be computed using a machine learning model. In some embodiments, the machine learning model may be a random forest, a neural network, deep neural network, or another suitable machine learning model. Each of the residual values of Equation 7 may be computed in parallel using distributed computing, as described above. In some embodiments, where a deep neural network is used for computing the residual values, the deep neural network may include eight layers and each layer may include thirty two nodes. In other embodiments, the deep neural network may include other configurations.

The operation 1950 is reached from either the operation 1940 or the operation 1945. The operation 1950 is analogous to the operation 1815. At the operation 1950, the processor calculates the ADS value for each of the first plurality of residual series vectors or for each of the second plurality of residual series vectors. In particular, if the operation 1950 is reached from the operation 1940, the processor computes the ADS values from the first plurality of residual series vectors. If the operation 1950 is reached from the operation 1945, the processor calculates the ADS values from the second plurality of residual series vectors. The processor may calculate the ADS values using Equations 4 and 5 above.

At operation 1955, the processor calculates the MSE values for each of the first plurality of residual series vectors or for each of the second plurality of residual series vectors. The operation 1955 is analogous to the operation 1820. If the processor computed the ADS values using the first plurality of residual series vectors at the operation 1950, then the processor computes the MSE values for the first plurality of residual series vectors at the operation 1955. If the processor computed the ADS values using the second plurality of residual series vectors at the operation 1950, then the processor computes the MSE values for the second plurality of residual series vectors at the operation 1955. The processor may compute the MSE values using Equation 6 above.

At operation 1960, the processor initializes the temporary order list described at the operation 1830 as empty. At operation 1965, the processor initializes the mean squared error list described at the operation 1835 as empty. At operation 1970, the processor compares each of the ADS values computed at the operation 1950 with a predefined critical value. The operation 1970 is analogous to the operation 1825. At operation 1975, for each ADS value computed at the operation 1950 that is less than or equal to the predefined critical value, the processor adds the variable index of the variable associated with the ADS value to the empty temporary order list of the operation 1960. The operation 1975 is analogous to the operation 1830.

At operation 1980, for each ADS value that is less than or equal to the predefined critical value, the processor adds the MSE value computed at the operation 1955 of the variable associated with that ADS value to the MSE list of the operation 1965. The operation 1975 is analogous to the operation 1835. At operation 1985, the processor counts the number of elements in the temporary order list. The operation 1985 is analogous to the operation 1840. At operation 1986, the processor determines if the number of elements in the temporary order list is zero similar to the operation 1845. In some embodiments, the number of elements in the temporary order list may be zero because none of the ADS values computed at the operation 1950 are less than or equal to the predefined critical value at the operation 1975. If the processor determines that there are no elements in the temporary order list at the operation 1986, the process 1900 proceeds to operation 1987 where the order list is updated.

In the first iteration (e.g., when i=0), the order list that is updated is empty. In subsequent iterations, there is at least one variable index in the order list. For second and subsequent iterations, the order list from the immediately prior iteration is updated. For example, in iteration 2, the order list updated in iteration 1 is updated. In iteration 3, the order list updated in iteration 2 is updated, and so on.

To update the order list at the operation 1987 when there are no elements in the temporary order list, the processor finds a smallest value from all ADS values computed at the operation 1950 of the current iteration. The processor identifies the variable corresponding to the smallest value at operation 1988 and adds the variable index of the identified variable to the order list at operation 1989. Thus, at the end of iteration 1, the order list has one variable index if the number of elements in the temporary order list is zero at the operation 1986, and in each subsequent iteration one additional variable index may be added to the order list if the number of elements in the temporary order list is zero at the operation 1986 of the subsequent iteration. The operations 1987-1989 are analogous to the operation 1850.

On the other hand, if at the operation 1986 the processor determines that the number of elements in the temporary order list is not zero (e.g., the temporary order list has at least one element), the process 1900 proceeds to operation 1990. At the operation 1990, the processor determines whether the temporary order list has a single element or more than one element. The temporary order list may have a single element if only one ADS value of all the ADS values computed at the operation 1950 is less than or equal to the predefined critical value. The temporary order list may have more than one element if more than one ADS values of all of the ADS values computed at the operation 1950 are less than or equal to the predefined critical value. If the temporary order list has a single element therein at the operation 1990, the process 1900 proceeds to operation 1991. Otherwise, the process 1900 proceeds to operation 1992.

At the operation 1991, the processor updates the order list based on the elements in the temporary order list of the current iteration. When there is a single element in the temporary order list, a single element is added to the order list. In particular, responsive to determining that the number of elements in the temporary order list is equal to one, the processor adds the variable index of the variable that is in the temporary order list to the order list. Thus, at the end of iteration 1, the order list has one variable index if the number of elements in the temporary order list is one at the operation 1990, and in each subsequent iteration one additional variable index may be added to the order list if the number of elements in the temporary order list is one at the operation 1990 of the subsequent iteration. The operation 1991 is analogous to the operation 1855.

If the processor determines at the operation 1990 that the temporary order list has more than one element therein, the processor updates the order list at the operation 1992. When there are multiple elements in the temporary order list, multiple elements are added to the order list. In general, the number of elements added to the order list at the operation 1992 is equal to the number of elements in the temporary order list. Responsive to determining that the number of elements in the temporary order list is greater than one, the processor sorts the elements in the temporary order list at the operation 1992. In some embodiments, the processor sorts the elements in the temporary order list based on the MSE values in the MSE list to obtain a sorted order. In some embodiments, the sorted order may be an ascending order. In other embodiments, the sorted order may be a descending order. For example, at the operation 1992, the processor may sort the MSE values in the MSE list in an ascending order. As discussed above, each MSE value is associated with a variable of the plurality of variables. Each of the plurality of variables includes a variable index. The processor may identify the variable indices of the sorted MSE values and sort the variable indices in the temporary order list in the same sorted order. For example, if the MSE list includes MSE values that have been sorted in an ascending order as {M1, M2, and M3} where value M1 corresponds to variable index V1, value M2 corresponds to variable index V2, and value V3 corresponds to variable index V3, and the temporary order list includes variable indices {V3, V2, V1}, at the operation 1992 the processor may sort the temporary order list to correspond to the sorted order of the MSE list as {V1, V2, V3}.

Then, at operation 1993 the processor adds the elements from the temporary order list to the order list in the sorted order. Thus, at the operation 1993 the processor may add {V1, V2, V3} in that order to the order list. The operations 1992 and 1993 are analogous to the operation 1855. Thus, at the operations 1992 and 1993, more than one element are added to the order list.

Responsive to updating the order list at the operations 1987-1993, the process 1900 proceeds to operation 1994 where the processor increments the first index value, k. In some embodiments, the processor increments the first index value by a maximum of one or the number of elements in the temporary order list in the current iteration. The incrementing of the first index value determines the plurality of times of repeating the operation 1860. As discussed above, when updating the order list, more than one variable index may be added to the order list. When multiple variable indices are added to the order list, the topological order of the variables corresponding to those variable indices has been determined. Thus, a single iteration may find the topological order of multiple variables, which may reduce the number of times that the process 1900 is to be repeated. Thus, by incrementing the first index value based on the temporary order list, the number of times that the process 1900 is to be repeated may be dynamically determined. The first index value is incremented by either one or the number of elements in the temporary order list, whichever is greater.

For example, if the temporary order list at the operation 1986 was determined to have no elements or a single element, the first index value may be incremented by one. However, if the temporary order list was determined to have more than one element at the operation 1986, then the first index value may be incremented by the number of elements in the temporary order list. For example, if the temporary order list had three elements, the first index value may be incremented by three (because three is greater than one).

At operation 1995, the second index value, i, is incremented by one. The incrementing of the second index value may be used to calculate the correct residual series vectors at the operations 1940 or 1945. Responsive to incrementing the second index value, the process 1900 loops back to the operation 1925 which is repeated with the incremented values of the first index value and the second index value, as well as the order list updated at the operations 1987-1993.

At the end of the last iteration (e.g., when k≥n), the updated order list from the immediately previous iteration is output at the operation 1935. The output order list constitutes the topological order 1720 of the DAG.

Figure 20:
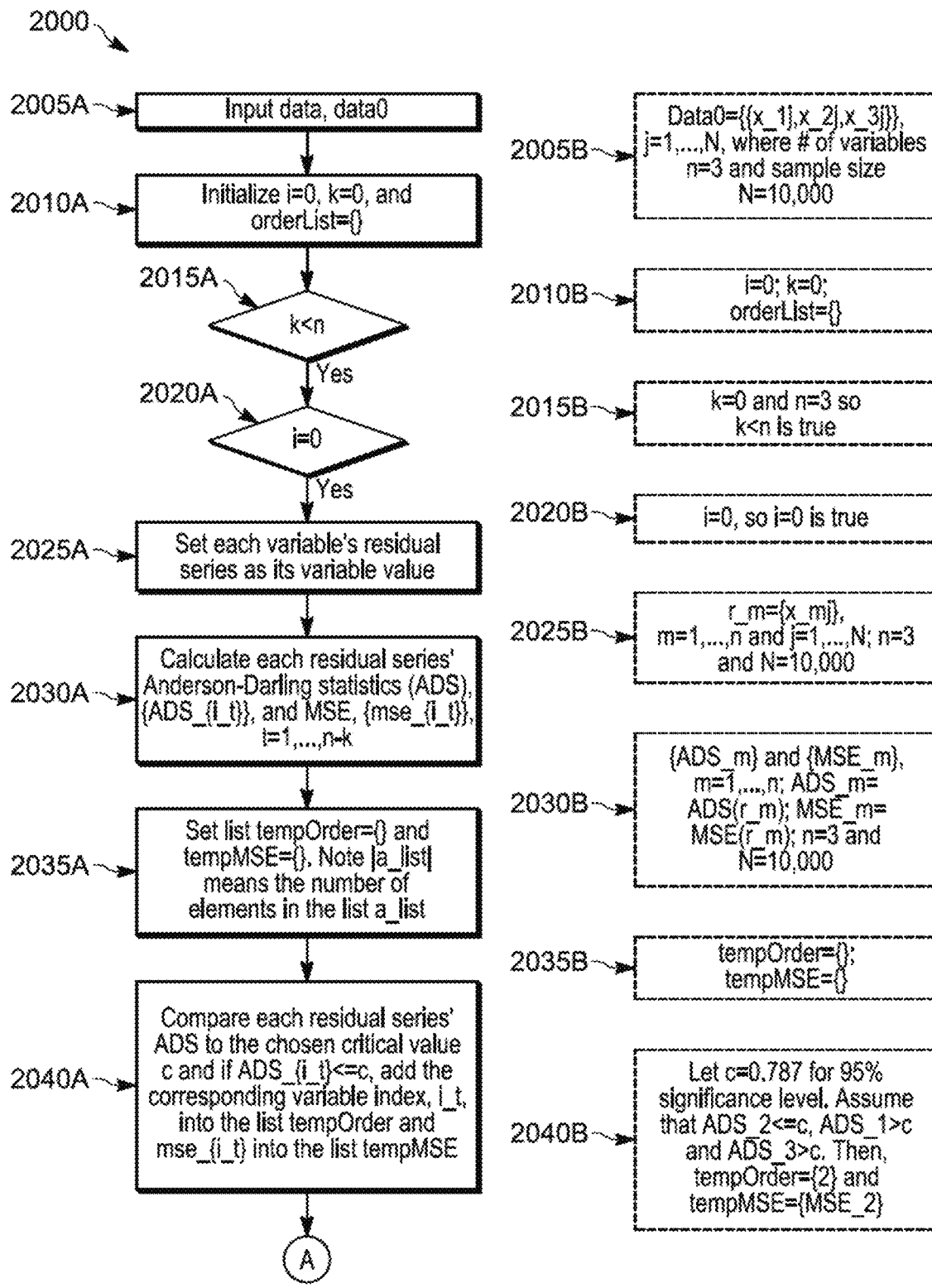
FIG. 20 illustrates an example showing how the flowcharts of FIGS. 18 and 19 may be used for determining the topological order for a three variable data set, according to embodiments of the present technology.
Figure 20:
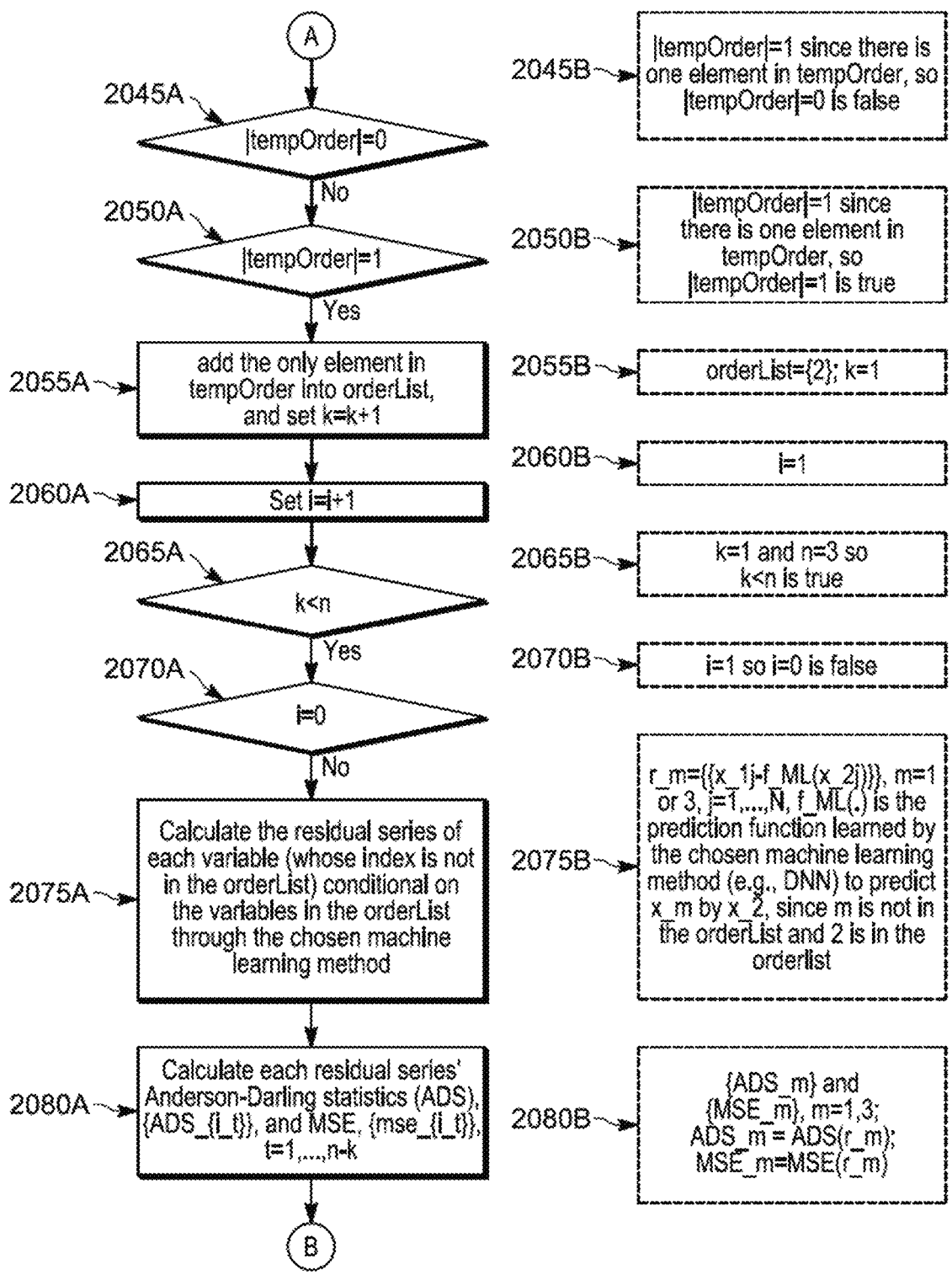
Figure 20:
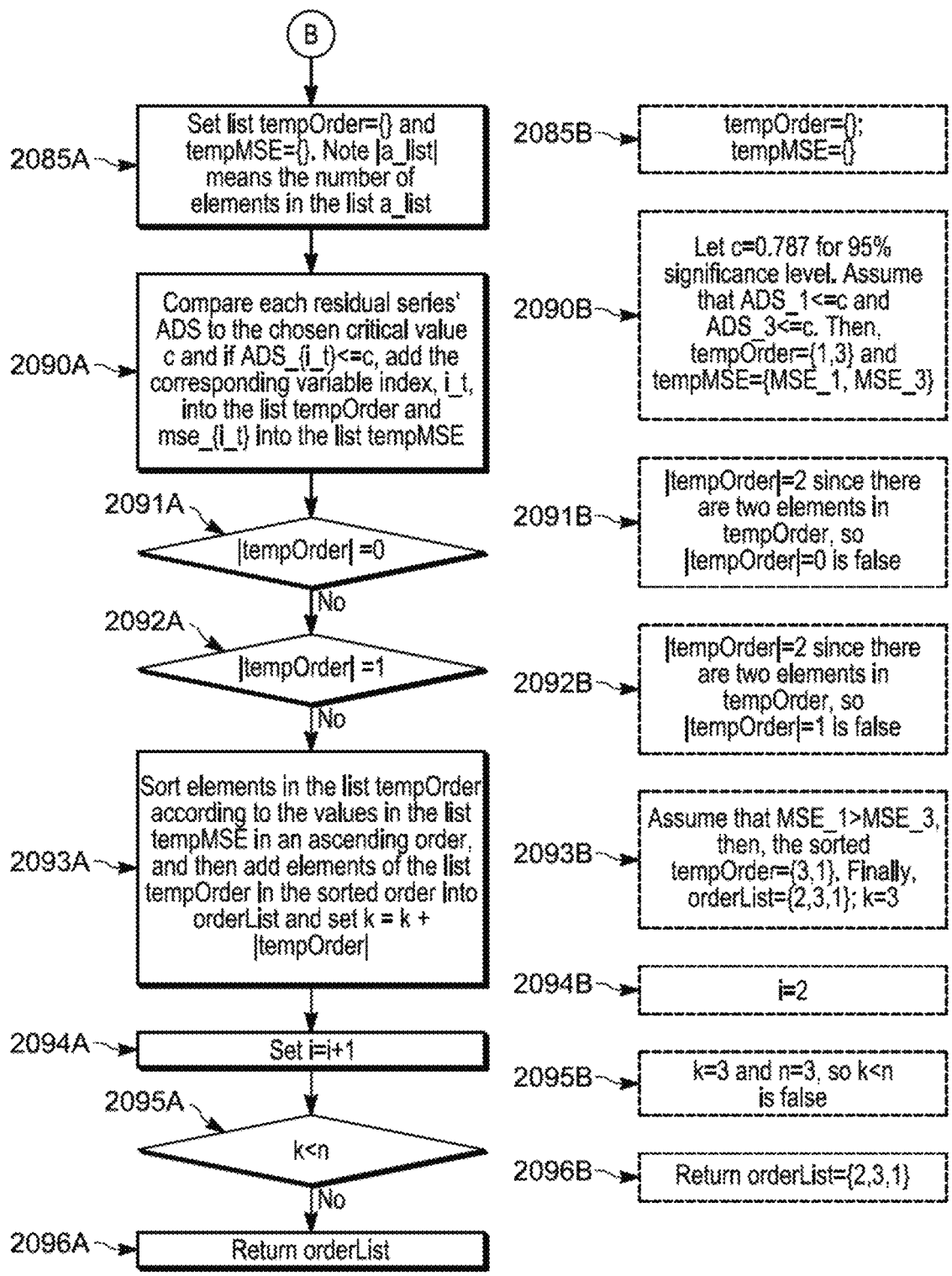

Turning now to FIG. 20, an example shows how the processes 1800 and 1900 may be applied, in accordance with some embodiments of the present disclosure. For explanation purposes only, the example of FIG. 20 is based on input data having ten thousand observation vectors and three variables. Thus, the DAG input data 1430 for this example may include a matrix having ten thousand rows and three columns, with each row corresponding to one observation vector. Thus, the number of variables, n=3 and the number of observation vectors, N=10,000 in the example of FIG. 20. Because n=3, the processes 1800 and 1900 may have less than or equal to three iterations. The first iteration includes operations 2005A-2060A and corresponding boxes 2005B-2060B.

In the first iteration, at the operation 2005A, the processor receives input data, "Data 0." This input data, as shown in the box 2005B, includes a plurality of observation vectors (e.g., ten thousand observation vectors) and each observation vector includes variable values of three variables. Thus, Data 0={$x_{1j}$, $x_{2j}$, $x_{3j}$}, where j=1, . . . , N, and N=number of the plurality of observation vectors and each observation vector has three variables $x_1$, $x_2$, $x_3$. The operation 2005A is analogous to the operations 1805 and 1905.

At the operation 2010A, which corresponds to the operations 1910, 1915, and 1920, the processor initializes the first index value k, the second index value i, and the order list as empty. As shown in the box 2010B, in the first iteration, k=0, i=0, and the order list is { }.

At the operation 2015A, which corresponds to the operation 1925, the processor compares the first index value k with the number of variables, n and determines if k<n. For example, as shown in the box 2015B, in the first iteration, the first index value k as initialized at the operation 2010A is zero, the number of variables n=3, therefore k<n is true.

At the operation 2020A, which corresponds to the operation 1930, the processor compares the second index value i with zero. As shown in the box 2020B, in the first iteration the second index value i initialized at the operation 2010A is zero, so i=0 is true.

At the operation 2025A, which corresponds to the operations 1810 and 1940, the processor computes the first plurality of residual series vectors. In the first iteration, the processor computes n residual series vectors, one for each of the three variables $x_1$, $x_2$, $x_3$. Each of the three residual series vectors has a size of 1×N and includes the variables values of the three variables $x_1$, $x_2$, $x_3$ from Data 0. Thus, as shown in the box 2025B, the processor creates the first plurality of residual series vectors, $r_m$=($x_{mj}$), where m=1, . . . n, j=1, . . . N, N=10,000, and $x_{mj}$ is the variable value of variable $x_m$ of the $j^{th}$ observation vector.

At the operation 2030A, which corresponds to the operations 1815, 1820, 1950, and 1955, the processor calculates the ADS values and the MSE values of each of the plurality of residual series vectors created at the operation 2025A. Thus, the processor calculates $\{ADS_{it}\}$ and $\{MSE_{it}\}$ where t=1, ... (n−k) and i=1, ..., n. The variable i at this operation is not the second index value. Accordingly, in the first iteration, as shown in the box 2030B, the processor calculates $ADS_m = ADS(r_m)$ and $MSE_m = MSE(r_m)$ where m=1, ..., n and n=3. Thus, the processor computes three ADS values (one for each residual series vector) and three MSE values (one for each residual series vector). Each ADS value and each MSE value corresponds to one of the three variables.

At the operation 2035A, which corresponds to the operations 1960 and 1965, the processor initializes the temporary order list and the MSE list as empty. Thus, as shown in the box 2035B, the temporary order list, tempOrder={ } and tempMSE={ }.

At the operation 2040A, the processor compares each of the ADS values computed at the operation 2030A with a predefined critical value. At the operation 2040A, for each ADS value that is less than or equal to the predefined critical value, the processor also adds the variable index of the variable associated with that ADS value to the temporary order list and the computed MSE value to the MSE list. Thus, the operation 2040A corresponds to the operations 1830, 1835, 1975, and 1980. Assuming, as shown in the box 2040B, the predefined critical value is c=0.787 to indicate a 5% significance level, $ADS_2 < c$, $ADS_1 > c$, and $ADS_3 > c$, then the processor adds the variable index of the variable associated with $ADS_2$ to the temporary order list. Assuming $ADS_2$ corresponds to variable $x_2$ having a variable index 2, the processor updates the temporary order list as tempOrder={2} and tempMSE={$MSE_2$}, where $MSE_2$ is the MSE value of the variable $x_2$.

At the operation 2045A and 2050A, the processor counts the number of elements in the temporary order list. For example, the processor determines if |tempOrder|=0. The operation 2045A corresponds to the operations 1845, 1986, and 1990. Because tempOrder={2}, as shown in the box 20245B, the processor determines that |tempOrder|=1.

At the operation 2055A, which corresponds to the operations 1855, 1860, 1991-1989, and 1994, the processor adds the variable index that is the temporary order list to the order list initialized at the operation 2010A. Thus, as shown in the box 2055B, the processor updates the order list as order list={2}. At the operation 2055A, the processor also increments the first index value k. Because there is there a single element in the temporary order list, the first index value is incremented by one (k=k+1). Because k=0 as initialized at the operation 2010A, as shown in the box 2055B, after incrementing, k=0+1=1.

At the operation 2060A, the processor increments the second index value i by one. Thus, as shown in the box 2060B, the processor sets the value of the second index value i=1.

Thus, at the end of the first iteration, the first index value k=1, the second index value i=1, and the order list={2}. These values are used in the second iteration, which includes operations 2065A-2094A and corresponding boxes 2065B-2094B.

At the operation 2065A, which corresponds to the operation 1925, the processor compares the first index value k with the number of variables, n and determines if k<n. For example, as shown in the box 2065B, in the second iteration,
the first index value k as incremented at the operation 2055A is one, the number of variables n=3, therefore k<n is true.

At the operation 2070A, which corresponds to the operation 1930, the processor compares the second index value i with zero. As shown in the box 2070B, in the first iteration the second index value i incremented at the operation 2060A is one, so i=0 is false.

At the operation 2075A, which corresponds to the operations 1810 and 1945, the processor computes the second plurality of residual series vectors. In the second iteration, the processor computes n−k residual series vectors, where n is the number of variables (e.g., three) and k here is the number elements in the order list (k here is not the first index value). Since the order list at the end of the first iteration has one element (e.g., order list={2}), the processor computes two residual series vectors at the operation 2075A—one for each of the variables $x_1$, $x_3$ whose variable indices are not already in the order list. Each of the two residual series vectors has a size of 1×N and is conditional on the variable $x_2$ whose variable index is already in the order list. The processor may compute the residual series vectors using Equations 7-9. Thus, as shown in the box 2075B, the processor creates the second plurality of residual series vectors, $r_m = (x_{mj} - F_{ML}(x_{2j}))$, where m=1 or 3, j=1, ... N, N=10,000, $x_{mj}$ is the variable value of variable $x_m$ of the $j^{th}$ observation vector, and $F_{ML}(\bullet)$ is the prediction function learned by a chosen machine learning method (e.g., deep neural network) to predict $x_1$ or $x_3$ using $x_2$.

At the operation 2080A, which corresponds to the operations 1815, 1820, 1950, and 1955, the processor calculates the ADS values and the mean squared error (MSE) values of each of the plurality of residual series vectors created at the operation 2025A. Thus, the processor calculates $\{ADS_{it}\}$ and $\{MSE_{it}\}$ where t=1, ... (n−k), i=1, ..., n, k is the number of elements in the order list (e.g., 1), and n=3 is the total number of variables. The variable i at this operation is not the second index value and the variable k is not the first index value. Accordingly, in the second iteration, as shown in the box 2080B, the processor calculates $ADS_m = ADS(r_m)$ and $MSE_m = MSE(r_m)$ where m=1, 3 and n=3. Thus, the processor computes two ADS values and two MSE values. Each ADS value and each MSE value corresponds to one of the two variables whose variable index is not in the order list (e.g., variables $x_1$, $x_3$).

At the operation 2085A, which corresponds to the operations 1960 and 1965, the processor initializes the temporary order list and the MSE list as empty. Thus, as shown in the box 2085B, the temporary order list, tempOrder={ } and tempMSE={ }.

At the operation 2090A, the processor compares each of the ADS values computed at the operation 2080A with a predefined critical value. At the operation 2090A, for each ADS value that is less than or equal to the predefined critical value, the processor also adds the variable index of the variable associated with that ADS value to the temporary order list and the computed MSE value to the MSE list. Thus, the operation 2090A corresponds to the operations 1830, 1835, 1975, and 1980. Assuming, as shown in the box 2090B, the predefined critical value is c=0.787 to indicate a 5% significance level, $ADS_1 \le c$ and $ADS_3 \le c$, then the processor adds the variable index of the variable associated with $ADS_1$ and $ADS_3$ to the temporary order list. Assuming $ADS_1$ corresponds to variable $x_1$ having a variable index 1 and $ADS_3$ corresponds to variable $x_3$ having a variable index 3, the processor updates the temporary order list as tempOrder={1, 3} and tempMSE={$MSE_1$, $MSE_3$}, where MSE₁ is the MSE value of the variable x₁ and MSE₃ is the MSE value of the variable X₃.

At the operation 2091A and 2092A, the processor counts the number of elements in the temporary order list. For example, the processor determines if |tempOrder|=0. The operations 2091A and 2091B correspond to the operations 1845, 1986, and 1990. Because tempOrder={1, 3}, as shown in the boxes 2091B and 2092B, the processor determines that |tempOrder|=2.

At the operation 2093A, which corresponds to the operations 1855, 1860, 1992, 1993, and 1994, the processor sorts the elements in the temporary order list in an ascending order according to the MSE values of the associated variables. Thus, as shown in the box 2093B, the processor compares $MSE_1$ and $MSE_3$. Assuming $MSE_1 > MSE_3$, the processor sorts the elements in the temporary order list as tempOrder={3, 1}. At the operation 2093A, the processor also adds the sorted elements to the order list. Since the order list at the end of the first iteration was order list={2}, in the second iteration, the processor updates the order list as order list={2, 3, 1}. Thus, the processor appends the variable indices determined in the second iteration to the variable index that was already in the order list. At the operation 2093A, the processor also increments the first index value k. Because there are two elements in the temporary order list, the first index value is incremented by two (k=k+|tempOrder|). Because k=1 at the end of the first iteration, as shown in the box 2093B, after incrementing, k=1+2=3.

At the operation 2094A, the processor increments the second index value i by one. Thus, as shown in the box 2094B, the processor sets the value of the second index value i=2.

Thus, at the end of the second iteration, the first index value k=3, the second index value i=2, and the order list={2, 3, 1}. These values are used in the third iteration, which includes operations 2095A-2096A and corresponding boxes 2095B-2096B.

At the operation 2095A, which corresponds to the operation 1925, the processor compares the first index value with the number of variables, n and determines if k<n. For example, as shown in the box 2095B, in the third iteration, the first index value k as incremented at the operation 2093A is three, the number of variables n=3, therefore k<n is false.

At the operation 2096A, the processor returns the order list updated in the second iteration. The operation 2096A corresponds to the operations 1865 and 1935. Thus, as shown in the box 2096B, the processor returns order list={2, 3, 1}, which corresponds to the topological order of the DAG.

The proposed approach discussed herein learns an accurate topological order of a DAG at increased speed and accuracy compared to conventional approaches. In particular, the inventors compared the proposed approach with a Topological Order Permutation Search (TOPS) mechanism discussed in the U.S. Pat. No. 11,443,198, the entirety of which is incorporated by reference herein. The TOPS mechanism provides a neighboring search-based mechanism to find the topological order. The inventors found that the proposed approach is at least as accurate as the TOPS mechanism and significantly faster than the TOPS mechanism. The inventors also compared the proposed approach with a Score Matching (SM) algorithm described in Rolland, P., Cevher, V., Kleindessner, M., Russell, C., Janzing, D., Schölkopf, B., & Locatello, F, Score matching enables causal discovery of nonlinear additive noise models (2022), International Conference on Machine Learning (pp. 18741-18753) and Montagna, F., Noceti, N., Rosasco, L., Zhang, K., & Locatello, F., Scalable causal discovery with score matching (2023), Conference on Causal Learning and Reasoning (pp. 752-771), the entireties of both of which are incorporated by reference herein. The SM algorithm iteratively builds the topological order by repeatedly identifying a leaf as the diagonal element in the score's Jacobian with a variance value of zero. The inventors found that the proposed approach is significantly more accurate than the SM algorithm and at least as fast as the SM algorithm.

The inventors compared the accuracy using a topological ordering divergence (TOD) metric. The TOD metric asks: given a perfect algorithm to find the correct edges for a given topological order, how many correct edges are found. The TOD metric may be defined as:

$$D_{top}(\pi, A) = \sum_{i=1}^{d} \sum_{j:\pi_i > \pi_j} A_{ij} \qquad \text{Equation 10}$$

In equation 10 above, w is the topological order for a DAG, A. If T is the correct topological order for the DAG, A, then $D_{top}(\pi, A) = 0$. Otherwise, $D_{top}(\pi, A)$ counts the number of edges that are incorrect due to the topological order. Thus, the TOD metric provides a lower bound on the SHD for a particular topological order. The lower the value of the TOD metric, the higher the accuracy of the topological order. Thus, TOD=0 means 100% accuracy. The inventors compared the accuracy of the topological order obtained by the proposed approach (Gitto), the TOPS mechanism, and the SM algorithm for a DAG having five variables and eight edges, and for a DAG having ten variables and nineteen edges. The results are provided in Table 2 below:

TABLE 2

| # Variables | # Edges | Gitto (TOD) | TOPS (TOD) | SM (TOD) |
|---|---|---|---|---|
| 5 | 8 | 0 | 0 | 2 |
| 10 | 19 | 0 | 0 | 13 |

As seen from Table 2 above, both TOPS and the proposed approach have a TOD of zero, indicating a 100% accuracy for both DAGs. The accuracy of the SM algorithm is lower than the proposed approach and the TOPS mechanism. Thus, the proposed approach is as accurate as the TOPS mechanism.

The inventors also compared the speed of computing the topological order using the proposed approach, the TOPS mechanism, and the SM algorithm. The inventors used Big O notation, which may be used to describe the complexity of an algorithm, to compare speed. The big O notation may indicate how long an algorithm may take to complete and generate a result (e.g., the topological order) given the size of the input (e.g., the number of variables). For example, $O(n^3)$ may indicate that the time cost at which an algorithm determines the topological order of a DAG is directly proportional to or times $n^3$ seconds, where n is the number of variables in a DAG.

The TOPS mechanism includes a plurality of algorithm variations. The fastest of these algorithms computes the topological order at a time cost that is a polynomial function of $O(n^3 t_{ML})$, where n is the number of variables and $t_{ML}$ is the time cost of the machine learning method for one run $(x_{target} = \widehat{f_{ML}}(x_{input}) + \epsilon$ where $x_{target}$ is one of the variables, $x_{input}$ is the parent set of the $x_{target}$, and $\widehat{f_{ML}}()$ is the estimated function $f()$ using a machine learning method.

The time cost of computing the topological order using the proposed approach is $O(n^2 t_{ML})$. Thus, the proposed approach is at least $O(n)$ times faster than the fastest TOPS algorithm. The time complexity of the SM algorithm is $O(nN^3)$ where N is the number of observation vectors and n is the number of variables. While the time complexity of the SM algorithm cannot be directly compared to that of the proposed approach (e.g., because the time complexity of the SM algorithm is linear in the number of variables, n, and cubic in the number of observation vectors, N, which tends to be larger than the number of variables, n), as the number of observation vectors increases (e.g., N=10000 or more), the time complexity of the SM algorithm increases significantly, making the proposed approach faster than the SM algorithm. The inventors compared the speed of computing the topological order obtained by the proposed approach (Gitto), the TOPS mechanism, and the SM algorithm for a DAG having five variables and eight edges, and for a DAG having ten variables and nineteen edges. The proposed approach is faster than the TOPS mechanism. The results of the comparison are summarized in Table 3 below:

TABLE 3

| # Variables | # Edges | Gitto (Hours) | TOPS (Hours) | SM (Hours) |
|---|---|---|---|---|
| 5 | 8 | 0.09 | 1.00 | 0.006 |
| 10 | 19 | 0.33 | 6.60 | 0.022 |

Thus, as seen from Table 3 above, the proposed approach provides a speedup of 11 for the 5 variable DAG relative to the TOPS mechanism and a speedup of 20 for the 10 variable DAG relative to the TOPS mechanism. Further, the proposed approach is almost as fast as the SM algorithm for both DAGs. Thus, Gitto provides the accuracy of the TOPS mechanism and the speed of the SM algorithm.

The inventors conducted several other experiments comparing the proposed approach to the SM algorithm. In particular, the inventors conducted experiments for two specific DAG types: Erdös-Rényi (ER) DAG and the Scale-Free Network (SF) DAG. Each trial included a DAG with either ten variables or 20 variables (thus, n=10 or n=20) and either 2n or 4n number of edges, e. For each DAG type, each variable count (n=10 or n=20), and each edge count (2n or 4n), the inventors conducted thirty trials. Thus, for each DAG type, the inventors conducted one hundred and twenty trials for a total of two hundred and forty trials. Each of the two hundred and forty trials included ten thousand observation vectors and the nonlinear function $f_i(\bullet)$ used for the machine learning model included a randomly generated multilayer perceptron (MLP) neural network having eight layers and thirty-two nodes per layer. In each trial, the inventors compared the speed and accuracy of the proposed approach (Gitto) with the TOPS mechanism and the SM algorithm. The results of the speed and accuracy comparison for the ER DAG are summarized in Table 4 below and the results of the speed and accuracy comparison for the SF DAG are summarized in Table 5 below. The results of these trials are also discussed in FIGS. 21A-25. #DAG TOD mean variables #edges Type Algorithm (std.) Time mean (std.)

TABLE 4

| # variables | # edges | DAG Type | Algorithm | TOD mean (std.) | Time mean (std.) |
|---|---|---|---|---|---|
| 10 | 20 | ER | Gitto | 0.43 (0.24) | 413.24 (16.05) |
| 10 | 20 | ER | SM | 2.90 (0.35) | 79.84 (1.15) |
| 10 | 40 | ER | Gitto | 1.23 (0.30) | 690.05 (22.68) |

TABLE 4-continued

| # variables | # edges | DAG Type | Algorithm | TOD mean (std.) | Time mean (std.) |
|---|---|---|---|---|---|
| 10 | 40 | ER | SM | 9.47 (1.43) | 82.08 (0.67) |
| 20 | 40 | ER | Gitto | 0.83 (0.27) | 1188.80 (40.66) |
| 20 | 40 | ER | SM | 10.37 (0.85) | 672.33 (4.73) |
| 20 | 80 | ER | Gitto | 4.30 (0.74) | 1877.32 (94.81) |
| 20 | 80 | ER | SM | 31.27 (2.78) | 658.58 (3.19) |

TABLE 5

| # variables | # edges | DAG Type | algorithm | TOD mean (std.) | Time mean (std.) |
|---|---|---|---|---|---|
| 10 | 20 | SF | Gitto | 0.30 (0.15) | 320.56 (11.57) |
| 10 | 20 | SF | SM | 1.93 (0.27) | 81.48 (0.90) |
| 10 | 40 | SF | Gitto | 0.37 (0.12) | 432.31 (14.33) |
| 10 | 40 | SF | SM | 3.67 (0.40) | 82.39 (0.75) |
| 20 | 40 | SF | Gitto | 0.27 (0.10) | 661.26 (35.86) |
| 20 | 40 | SF | SM | 4.57 (0.50) | 631.14 (3.17) |
| 20 | 80 | SF | Gitto | 1.23 (0.28) | 913.09 (38.52) |
| 20 | 80 | SF | SM | 10.20 (1.05) | 659.47 (4.54) |

Thus, as seen from Tables 4 and 5 above, the proposed approach has much lower average TOD values over the 30 trials in each row, compared to the SM mechanism for all DAG types, number of variables, and number of nodes. SM is on average faster than Gitto but its speed advantage decreases significantly in the 20 variable SF DAGs, and the relatively larger standard error of the mean run time for Gitto indicates a wide variability in run time across all 30 trials, suggesting that SM is not always faster than Gitto. Thus, Gitto is significantly more accurate than SM for ER2, ER4, SF2, and SF4 DAGs with 10 and 20 nodes, and is comparable in the time taken to run. TOD (Topological Order Divergence) represents how much the estimated order is different from the true topological order in the simulated data. The "std" in Tables 4 and 5 above is the standard error of that mean, a measure of the variability from all the runs of the simulations.

Figure 21A:
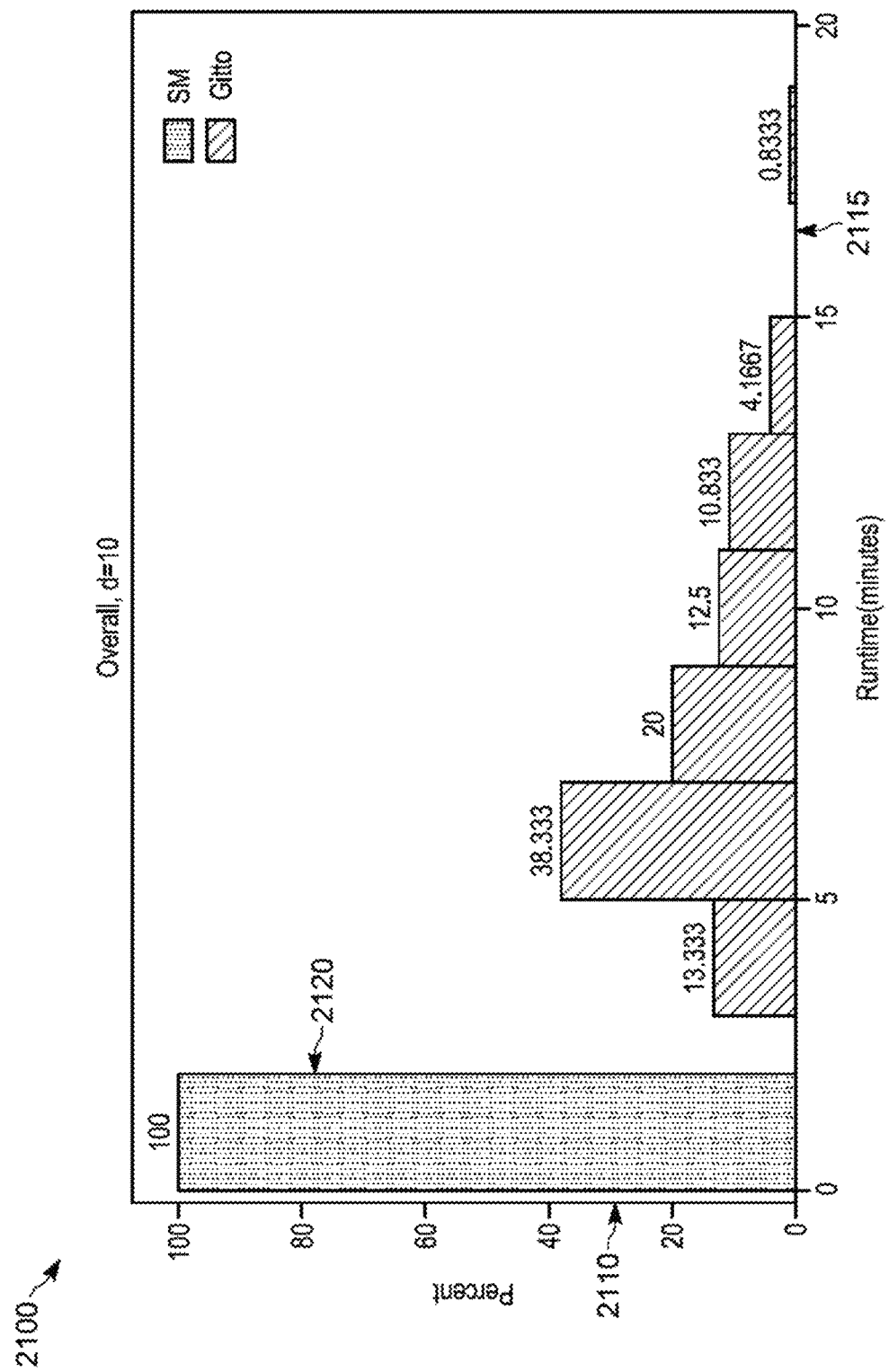
FIGS. 21A and 21B illustrate example graphs comparing the speed of the proposed approach with an existing approach, according to embodiments of the present technology.
Figure 21B:
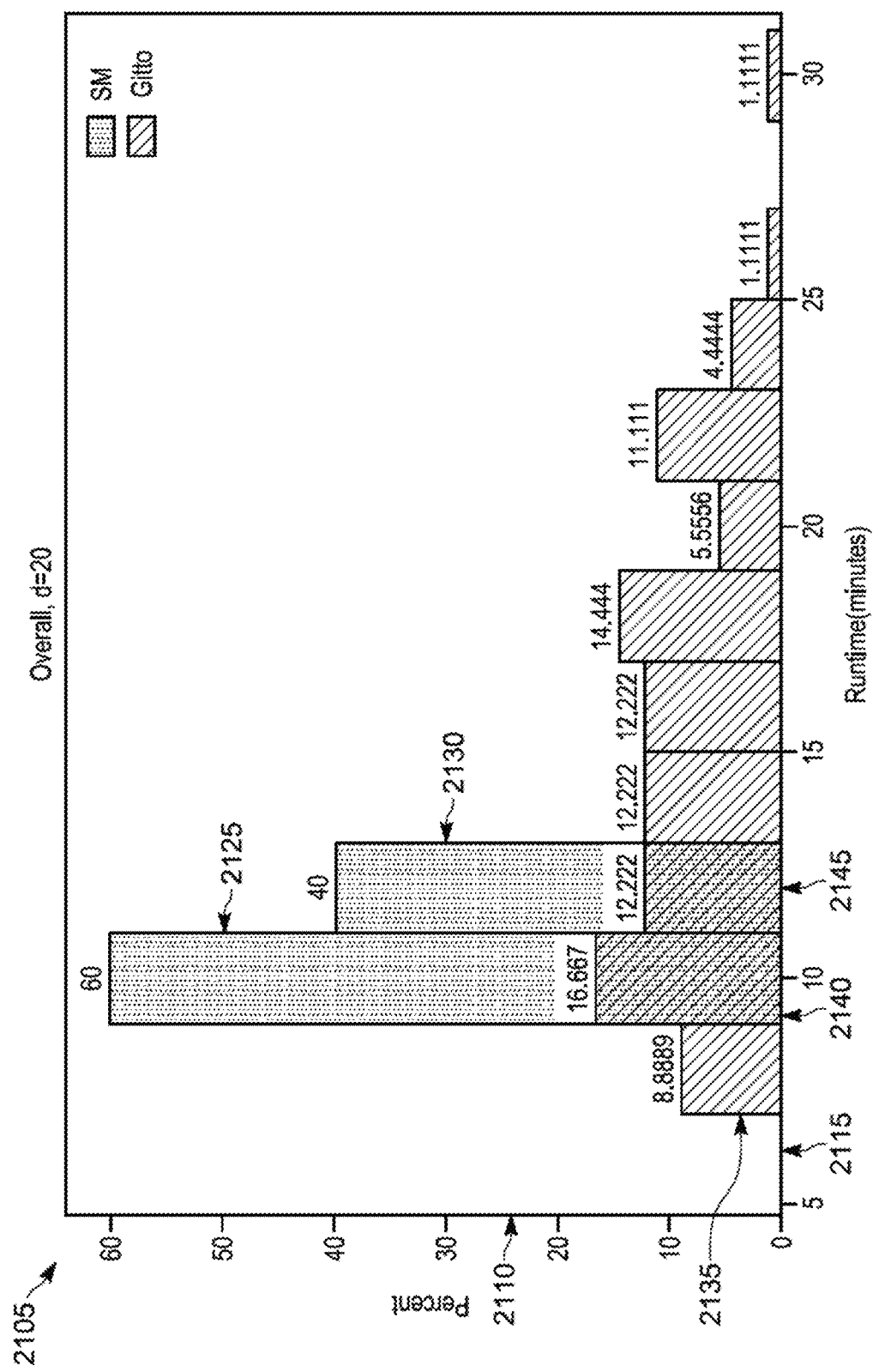

Turning now to FIGS. 21A and 21B, example bar graphs comparing the speed of the proposed approach with the SM algorithm for a ten variable (d=10) and a twenty variable (d=20) DAG in the two hundred and forty trials indicated above are shown, in accordance with some embodiments of the present disclosure. FIG. 21A shows a bar graph 2100 for the ten variable DAG trials and FIG. 21B shows a bar graph 2105 for the twenty variable DAG trials. Both the bar graphs 2100 and 2105 plot a percent of trials on Y-axis 2110 against a runtime in minutes on X-axis 2115. Bar 2120 of the graph 2100 corresponds to the SM algorithm and the remaining bars on this graph correspond to the proposed approach. The SM approach is faster than the proposed approach, but the proposed approach is not that much slower (but significantly more accurate) than the SM algorithm. The slight decrease in speed for the proposed approach is a tradeoff for the higher accuracy. Further, comparing the graph 2100 to the graph 2105, it may be seen that as the number of variables increases, the proposed approach may sometimes be faster than or as fast as the SM algorithm. For example, bars 2125 and 2130 correspond to the SM algorithm and the remaining bars on the graph 2105 correspond to the proposed approach. As indicated by bar 2135, about 9% of the trials using the proposed approach are faster than the SM algorithm and as indicated by bars 2140 and 2145, about 29% of the trials using the proposed approach are as fast as the SM algorithm.

Thus, as the number of variables increases, the speed of the proposed approach improves. Based on these experiments, real world applications which tend to have thousands or millions of variables, the proposed approach is expected to be as fast or faster than the SM algorithm. Further, by using distributed computing (e.g., parallel processing), the speed of both the proposed approach and the SM algorithm may be increased. In general, the speed may depend on the number of variables and the number of edges in the DAG, as well as the number of processing cores (e.g., central processing units, or graphics processing units) in the computing infrastructure. In one of the trials having forty variables and eighty edges, inventors found that the proposed approach was significantly faster than the SM algorithm (Gitto needed 1525.17 seconds compared to 4962.26 seconds for the SM algorithm).

Figure 22A:
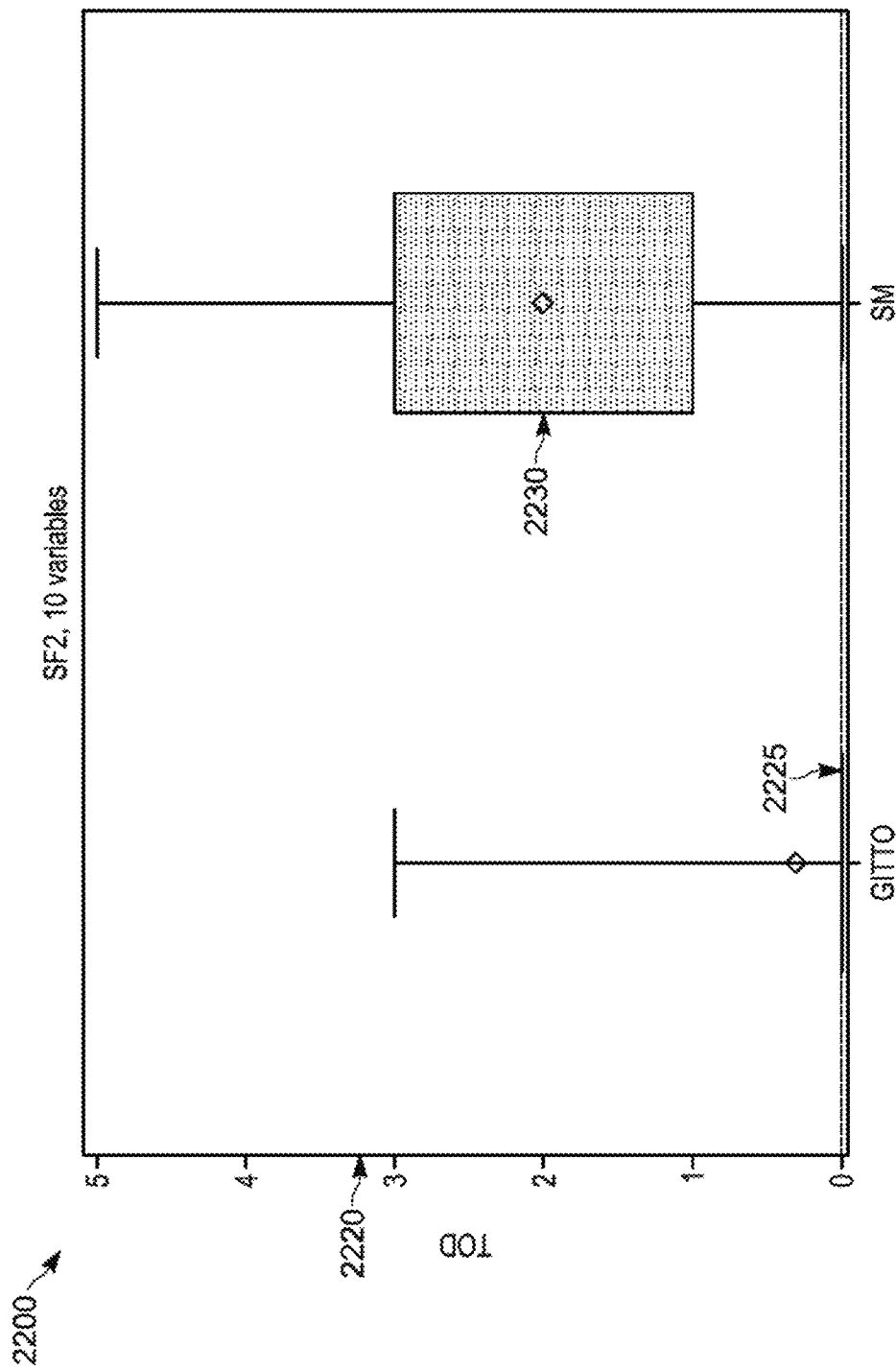
FIGS. 22A-22D illustrate example graphs comparing the accuracy of the proposed approach for a first type of DAG with an existing approach, according to embodiments of the present technology.
Figure 22B:
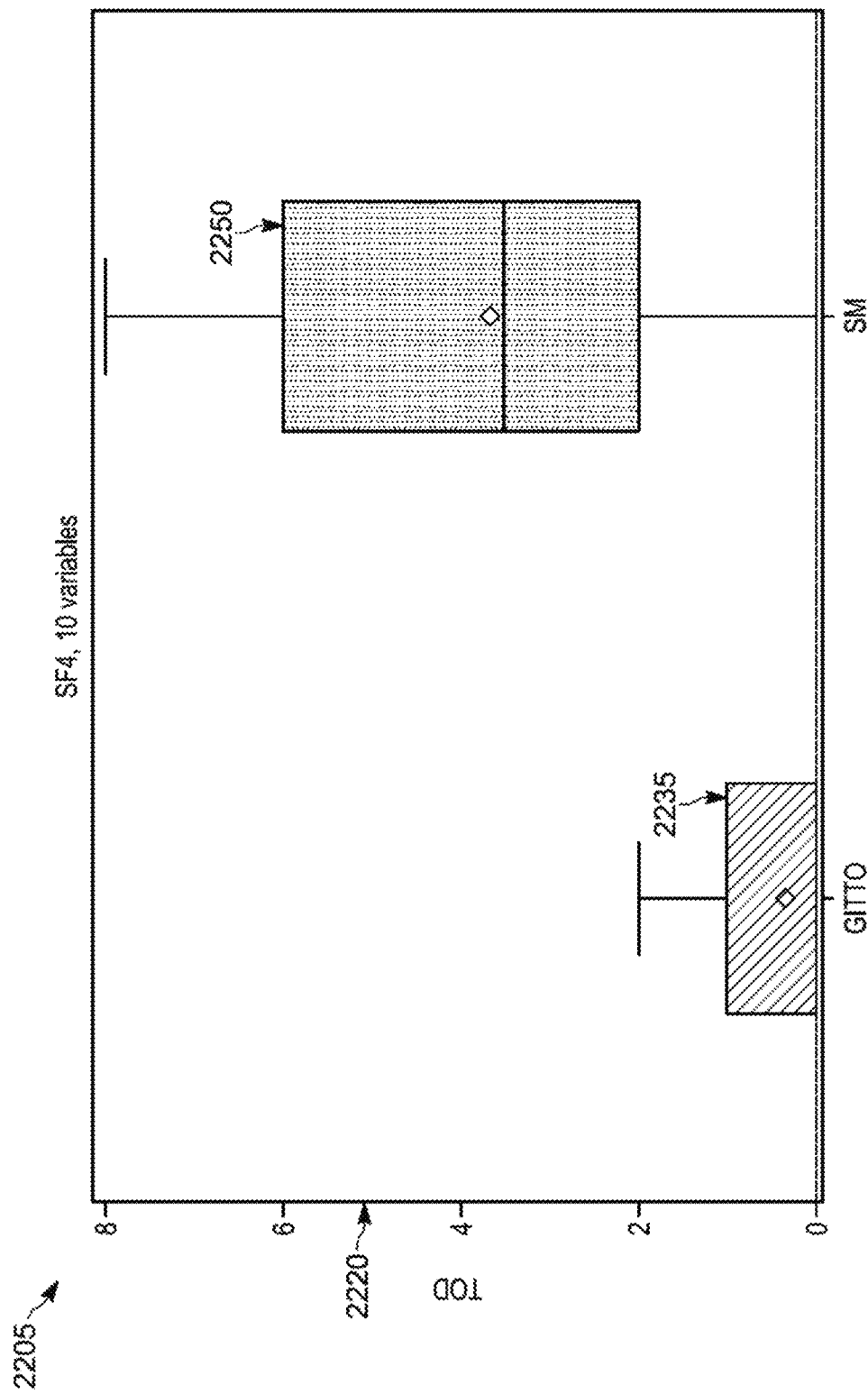
Figure 22C:
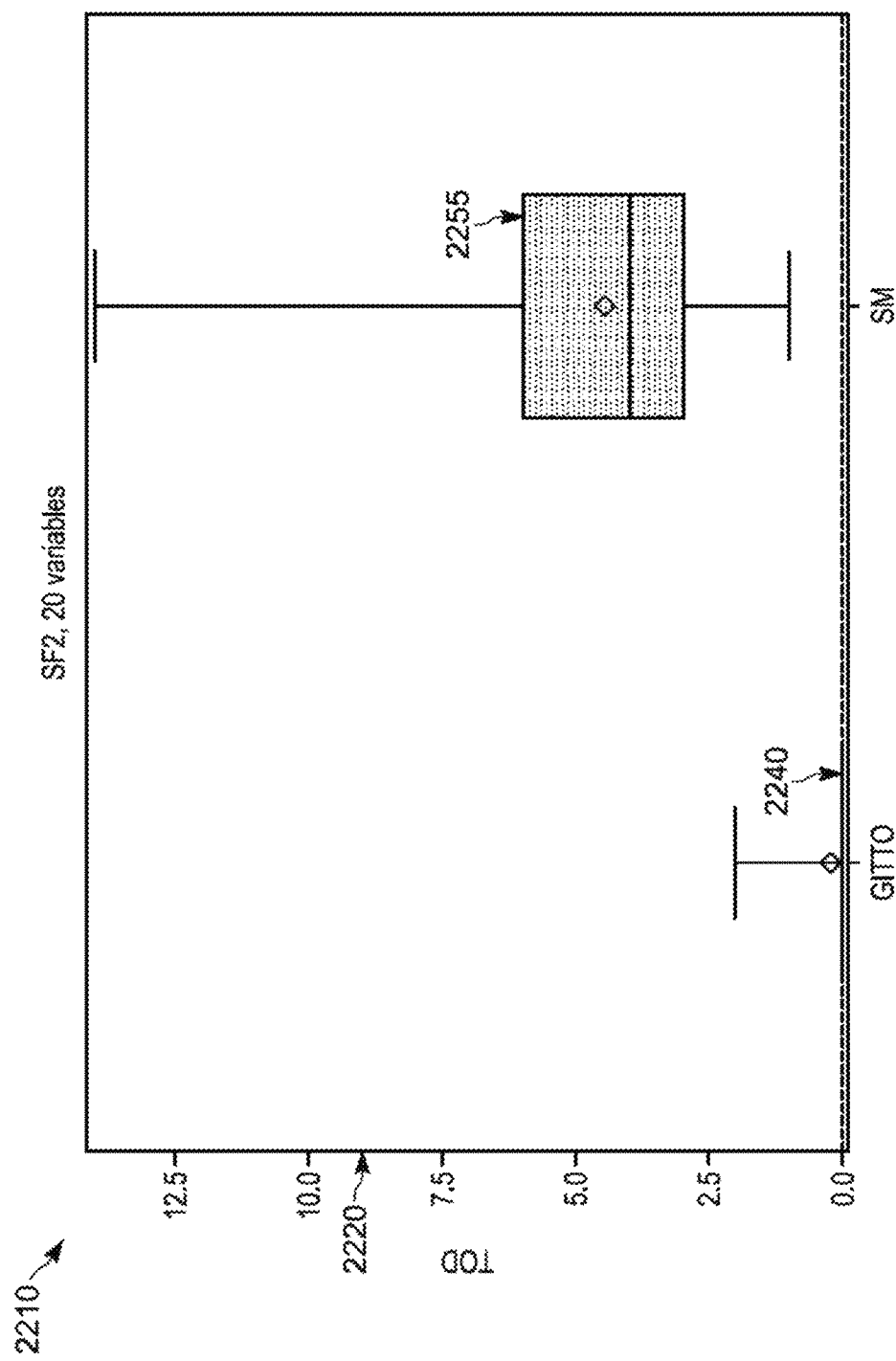
Figure 22D:
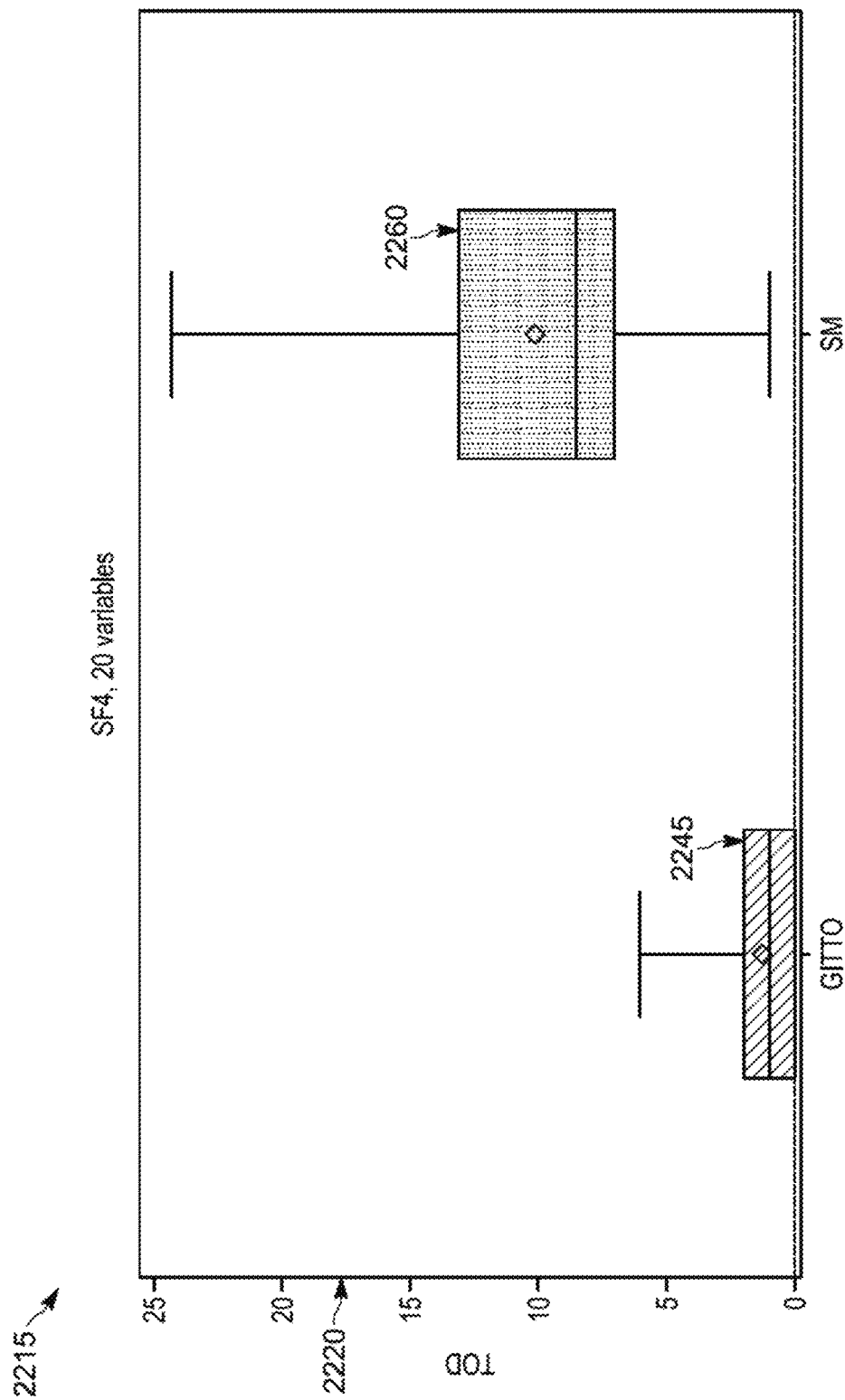

Turning now to FIGS. 22A-22D, example box graphs compare the accuracy of the topological order for the SF DAG determined using the proposed approach with the SM algorithm in the two hundred and forty trials, in accordance with some embodiments of the present disclosure. FIG. 22A shows a graph 2200 for the trials using ten variables and twenty edges, FIG. 22B shows a graph 2205 for the trials using ten variables and forty edges, FIG. 22C shows a graph 2210 for the trials using twenty variables and forty edges, while FIG. 22D shows a graph 2215 for the trials using forty variables and eighty edges. Each of the graphs 2200-2115 compares the TOD metric indicated on Y-axis 2220. Box 2225 of the graph 2200 corresponding to the proposed approach has a significantly lower TOD than box 2230 which corresponds to the SM approach across all trials in this case. Similarly, in each of the graphs 2205, 2210, and 2215, boxes 2235, 2240, and 2245 which correspond to the proposed approach have significantly lower TOD than boxes 2250, 2255, and 2260, respectively, corresponding to the SM algorithm. Thus, in all of the trials, the proposed approach is significantly more accurate than the SM algorithm.

Figure 23A:
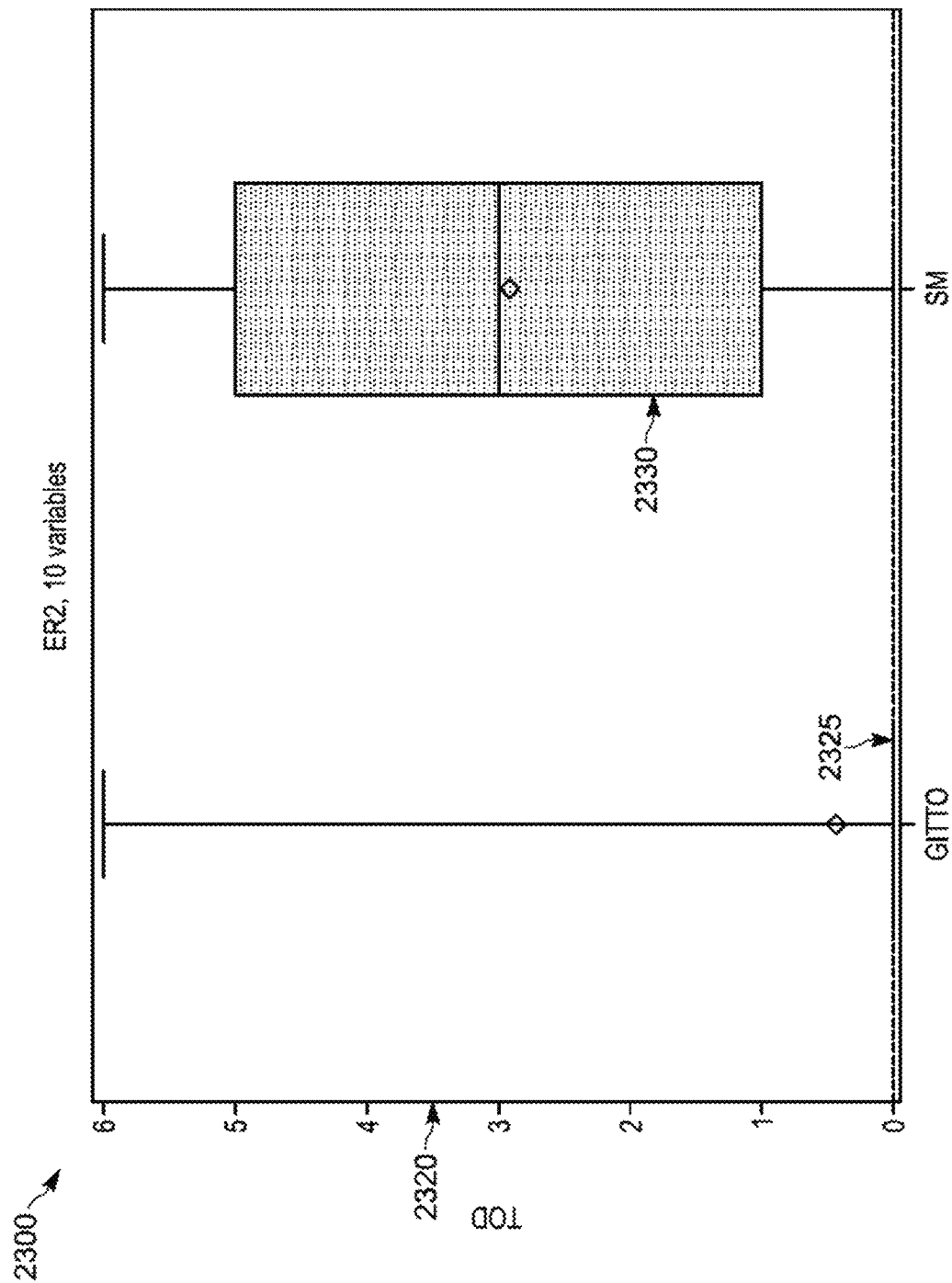
FIGS. 23A-23D illustrate example graphs comparing the accuracy of the proposed approach for a second type of DAG with an existing approach, according to embodiments of the present technology.
Figure 23B:
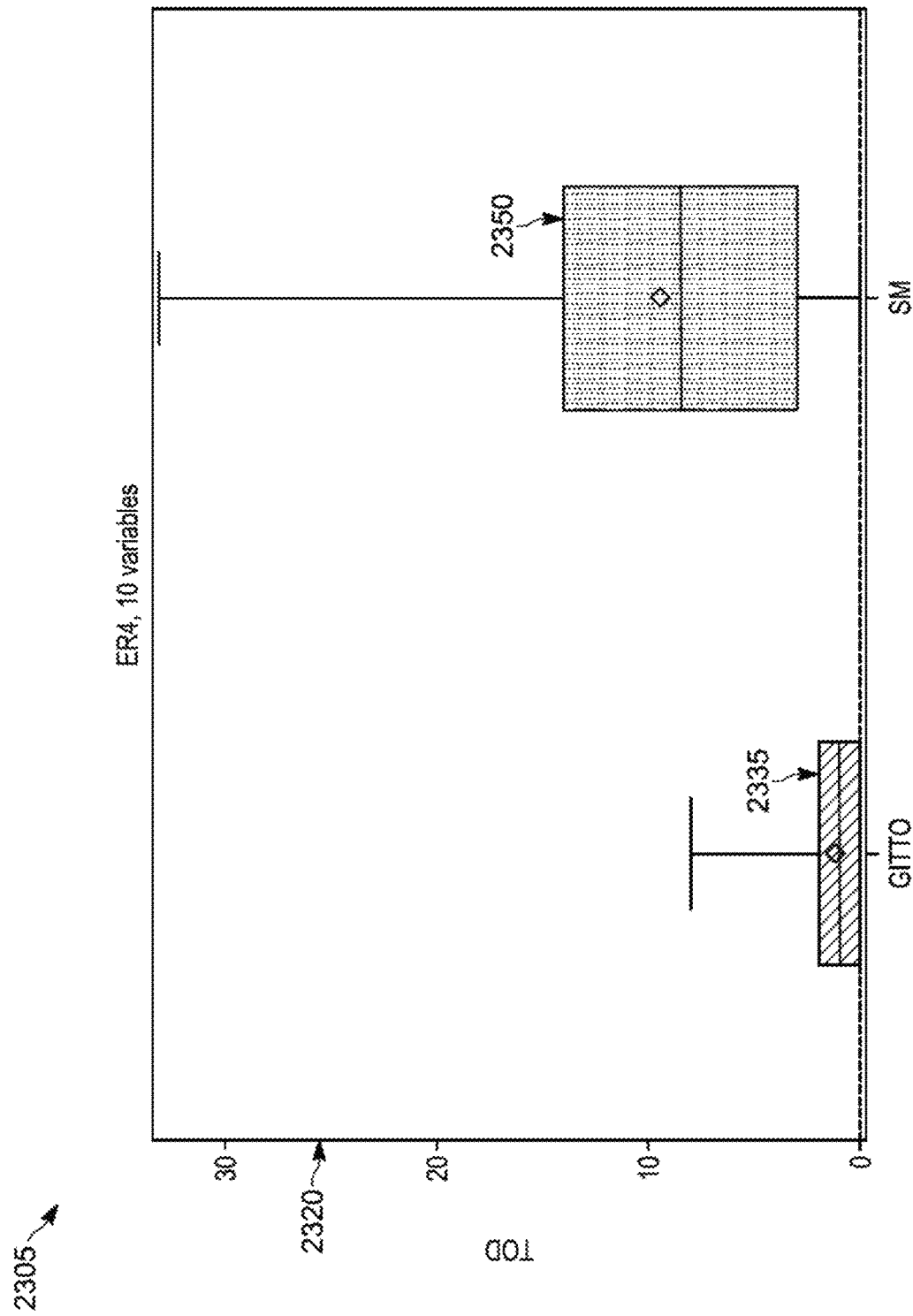
Figure 23C:
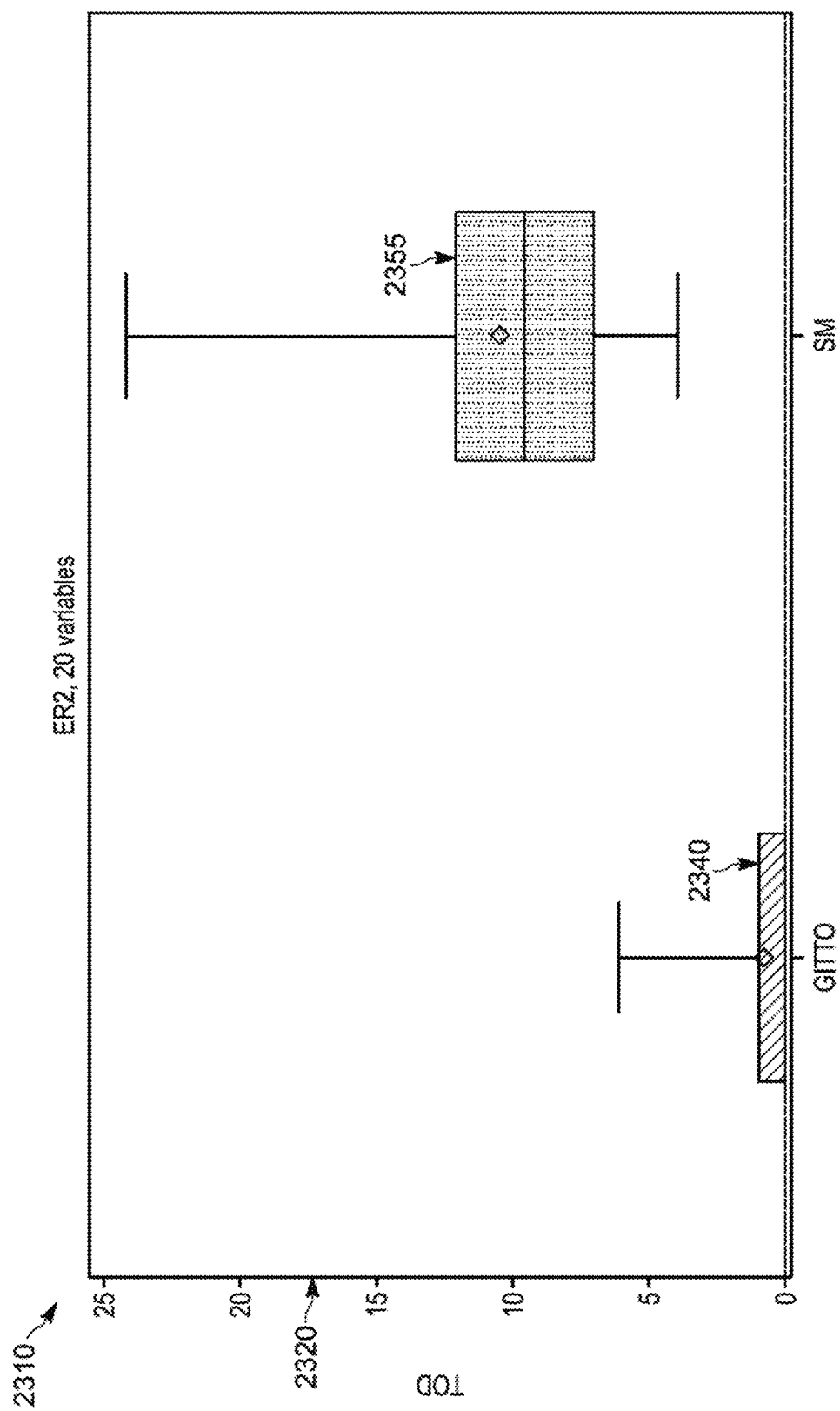
Figure 23D:
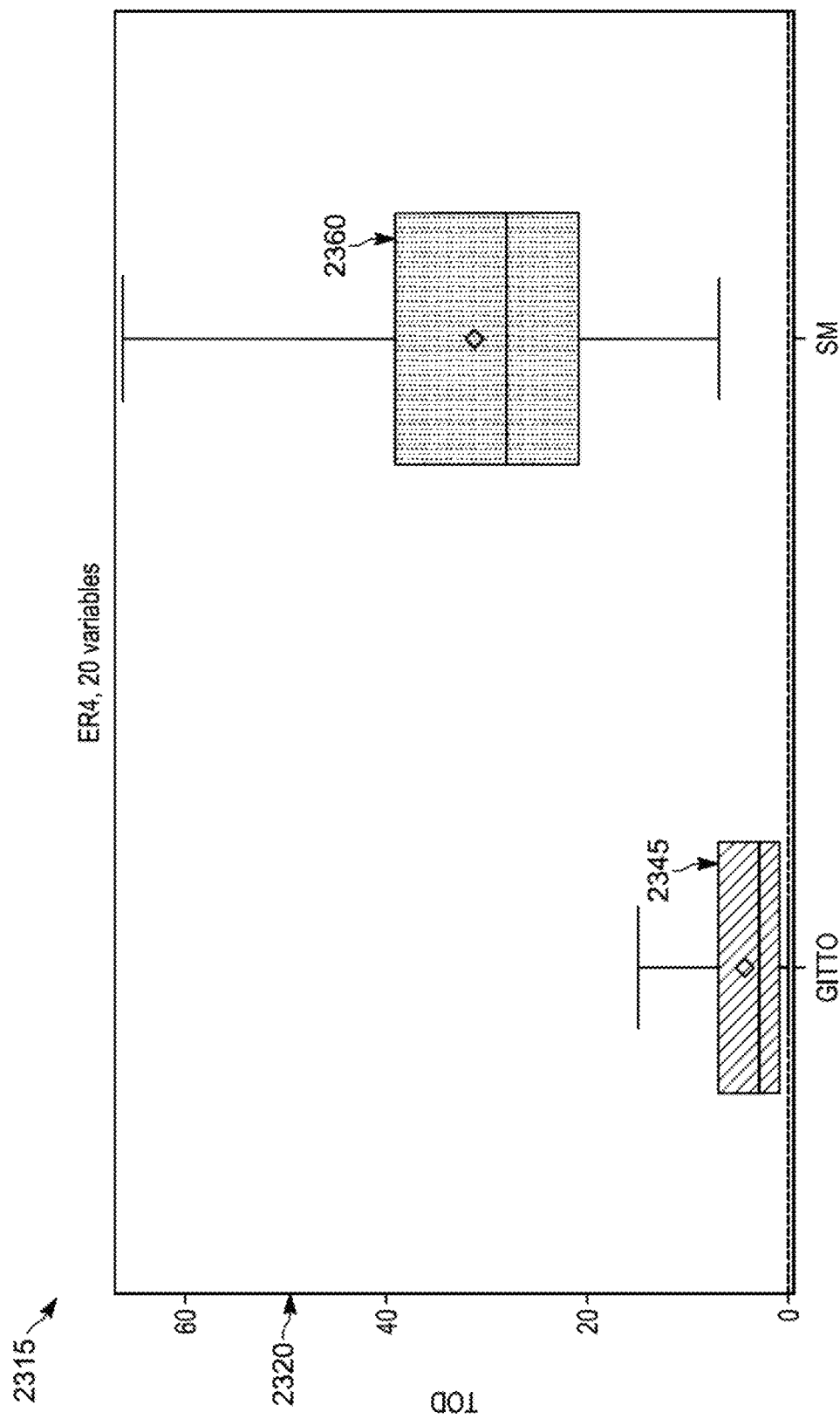

Turning now to FIGS. 23A-23D, example box graphs compare the accuracy of the topological order for the ER DAG determined using the proposed approach with the SM algorithm in the two hundred and forty trials, in accordance with some embodiments of the present disclosure. FIG. 23A shows a graph 2300 for the trials using ten variables and twenty edges, FIG. 23B shows a graph 2305 for the trials using ten variables and forty edges, FIG. 23C shows a graph 2310 for the trials using twenty variables and forty edges, while FIG. 23D shows a graph 2315 for the trials using forty variables and eighty edges. Each of the graphs 2300-2315 compares the TOD metric indicated on Y-axis 2320. Box 2325 which corresponds to the proposed approach has a significantly lower TOD than box 2330 which corresponds to the SM approach across all trials in this case. Similarly, in each of the graphs 2305, 2310, and 2315, respective boxes 2335, 2340, and 2345 which correspond to the proposed approach have significantly lower TOD than boxes 2350, 2355, and 2360, respectively, corresponding to the SM algorithm. Thus, in all of the trials, the proposed approach is significantly more accurate than the SM algorithm.

Figure 24A:
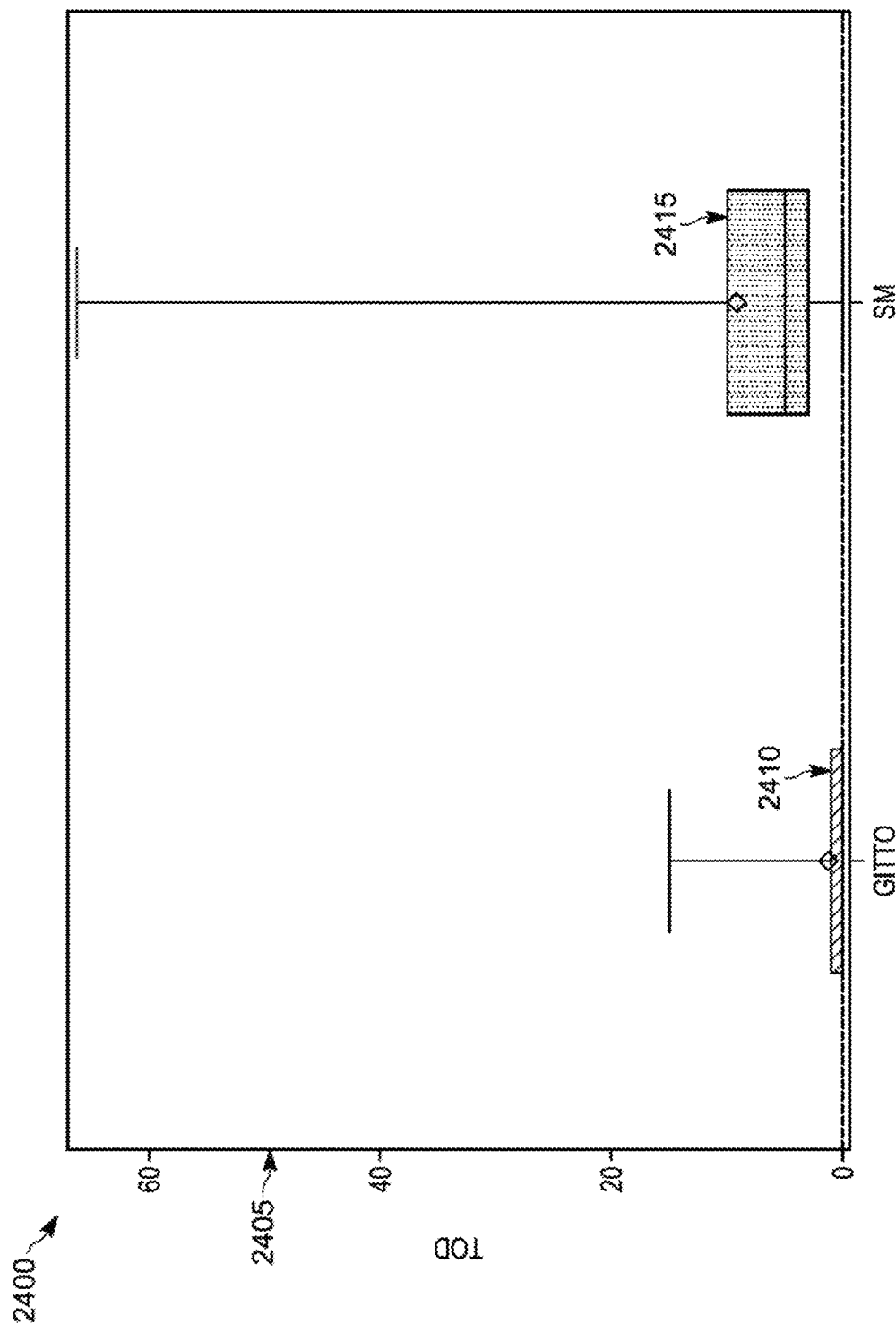
FIGS. 24A and 24B illustrate example graphs comparing the accuracy of the proposed approach with an existing approach over two hundred and forty trials, according to embodiments of the present technology.
Figure 24B:
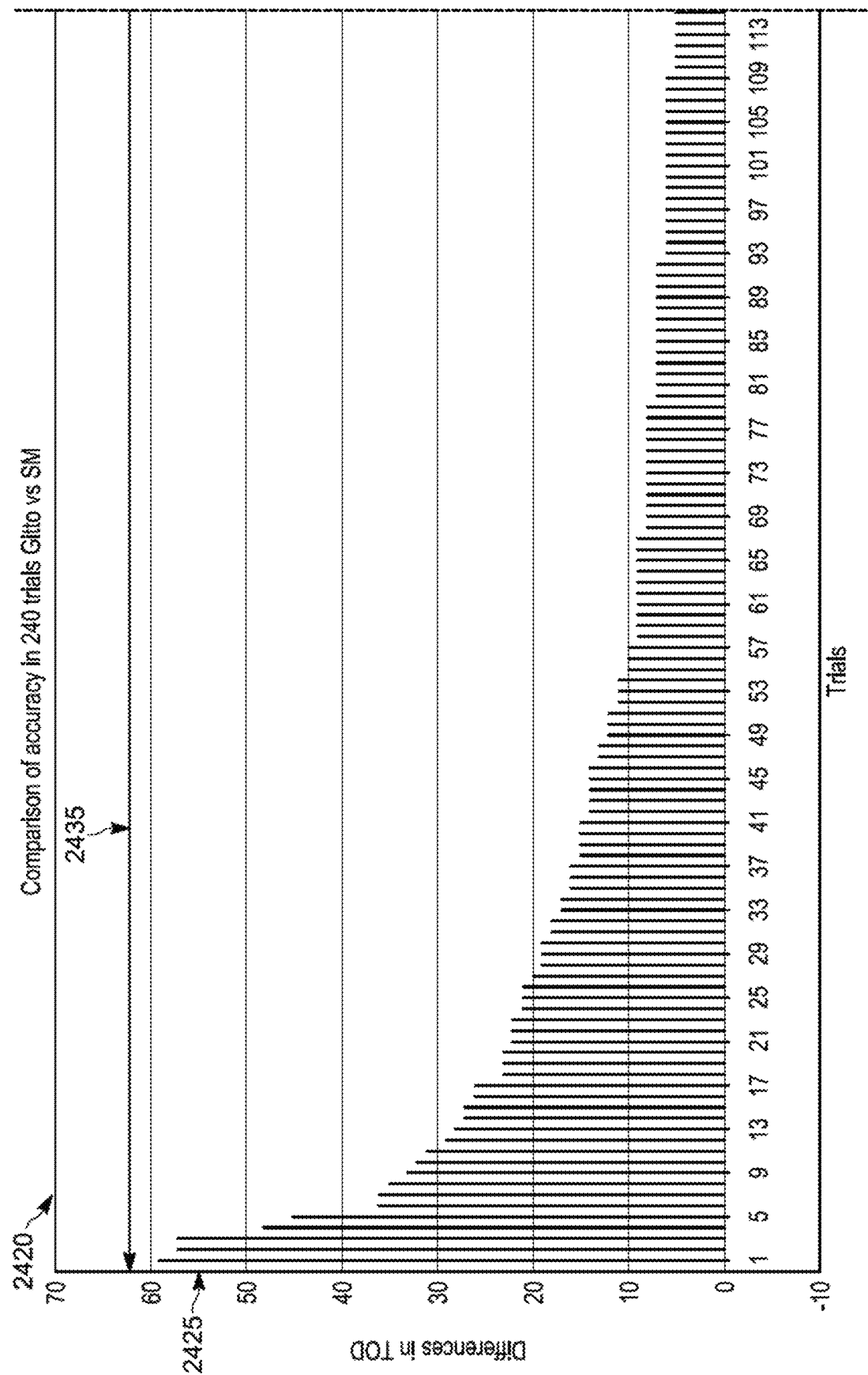
Figure 24B:
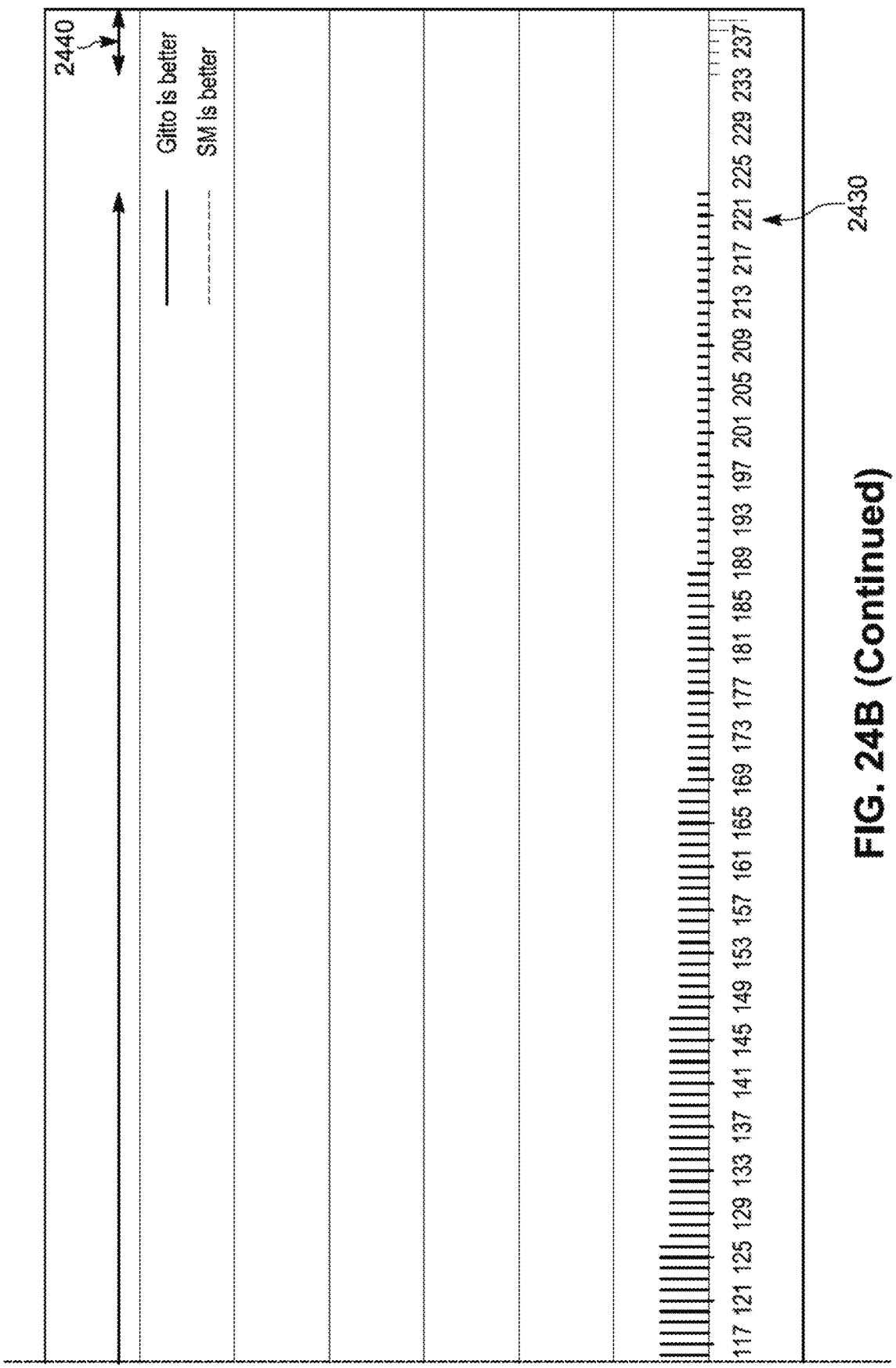

Referring to FIGS. 24A and 24B, example graphs compare the accuracy of the proposed approach with the SM algorithm over the combined two hundred and forty trials. FIG. 24A shows a graph 2400 plotting TOD on Y-axis 2405. The graph 2400 shows a box 2410 for the proposed approach and box 2415 for the SM algorithm. Across all trials, the accuracy of the proposed approach is better than the SM algorithm. FIG. 24B shows a graph 2420 that plots differences in TOD on Y-axis 2425 against each of the two hundred and forty trials on X-axis 2430. The graph 2420 shows that in trials 2435, the proposed approach is better in terms of accuracy than the SM algorithm, while in a very small portion of the trials 2440, the SM algorithm is better in terms of accuracy than the proposed approach. In particular, in 240 experiments, 234/240=97.5% showed that the Gitto algorithm had a better accuracy than the SM algorithm.

Figure 25:
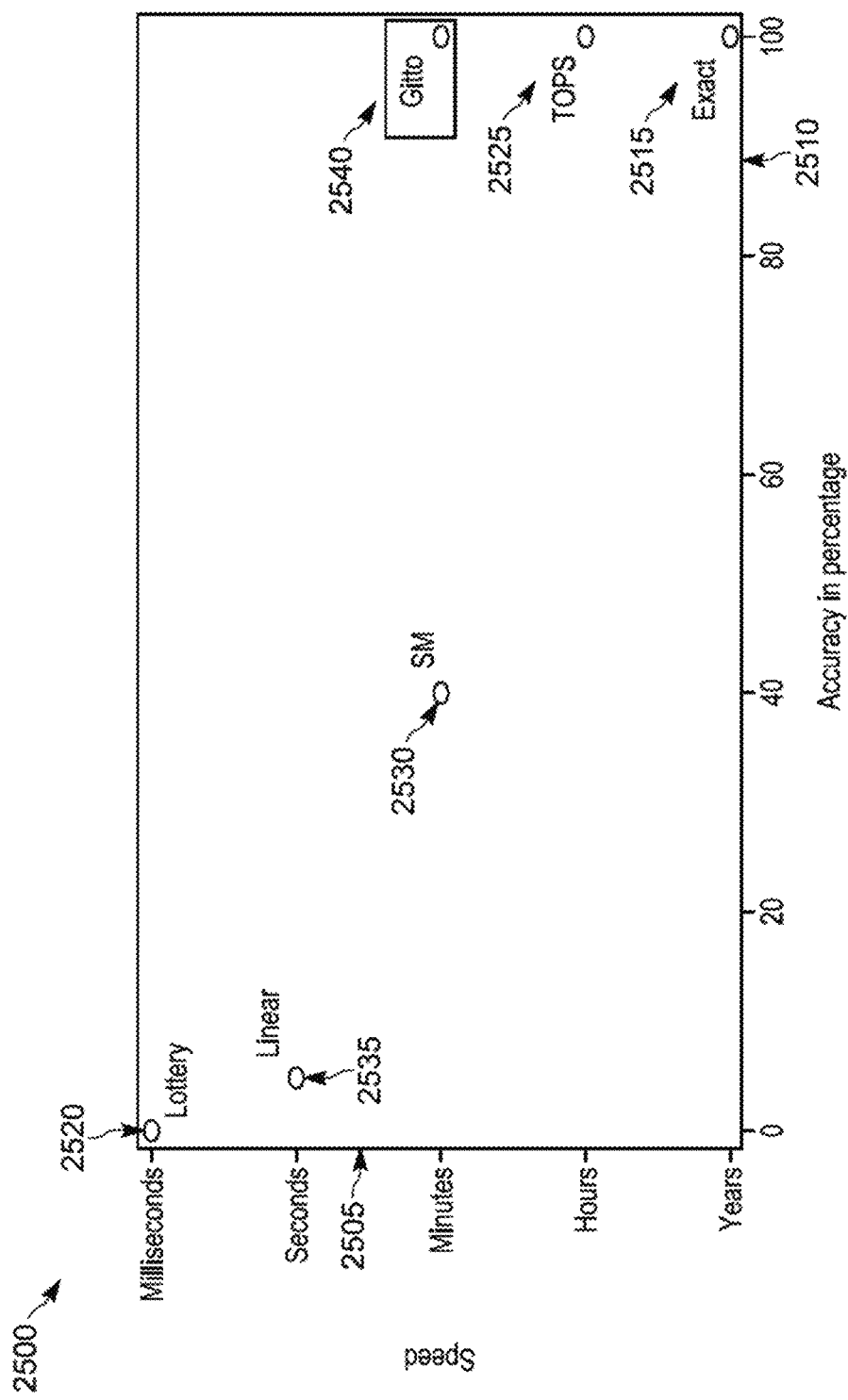
FIG. 25 illustrates an example graph comparing speed versus accuracy of the proposed approach with existing approaches, according to embodiments of the present technology.

Turning to FIG. 25, an example graph 2500 is shown, in accordance with some embodiments of the present disclosure. The graph compares the accuracy versus speed of the proposed approach and conventional techniques. Y-axis 2505 maps speed against accuracy on X-axis 2510. The graph 2500 shows an exact approach 2515, which is a brute force manual approach to obtain the correct topological order. While this approach is high on accuracy, it takes a long time and therefore is highly slow (e.g., may take years to determine the topological order). On the opposite spectrum is a lottery approach 2520 which is based on pure guesswork regarding the topological order. While the lottery approach 2520 is very fast, this approach is highly inaccurate. In between the exact approach 2515 and the lottery approach 2520 are the TOPS mechanism 2525, the SM algorithm 2530, the linear approach 2535, and the proposed approach 2540. The linear approach 2535 is not applicable to the current disclosure, which is directed to a non-linear approach. The TOPS mechanism 2525 is more accurate than the SM algorithm 2530 but takes longer than the SM algorithm. The proposed approach 2540 is as accurate as the TOPS mechanism 2525 and as fast as the SM algorithm 2530. Thus, the proposed approach 2540 provides the best of both the TOPS mechanism 2525 and the SM algorithm 2530.

The herein described subject matter illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to disclosures containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the disclosure be defined by the claims appended hereto and their equivalents. The word "illustrative" is used herein to mean serving as an example, instance, or illustration. Any aspect or design described herein as "illustrative" is not necessarily to be construed as preferred or advantageous over other aspects or designs.

What is claimed is:

1. A non-transitory computer-readable medium having computer-readable instructions stored thereon that when executed by a processor cause the processor to:
    receive input data from one or more network devices as part of a data analytics project for analyzing the input data, wherein the input data is based upon input streaming data or input non-streaming data received from the one or more network devices, wherein the input data comprises a plurality of observation vectors, each of the plurality of observation vectors comprising variable values of a plurality of variables, and wherein each of the plurality of variables is associated with a unique variable index; and
    determine at least one of a cause or effect relationship that each variable of the plurality of variables has with one or more other variables of the plurality of variables by generating, using machine learning, a topological order of a directed acyclic graph (DAG) by:
        (A) creating a plurality of residual series vectors, each of the plurality of residual series vectors associated with one variable of the plurality of variables;
        (B) calculating a normality statistic value for each of the plurality of residual series vectors to obtain a plurality of normality statistic values;
        (C) calculating a mean squared error value for each of the plurality of residual series vectors;
        (D) comparing each of the plurality of normality statistic values with a predefined critical value;
        (E) for each value of the plurality of normality statistic values that is less than or equal to the predefined critical value, adding (a) the variable index of the variable of the plurality of variables associated with the value to an empty temporary order list; and (b) the mean squared error value of the variable of the plurality of variables associated with the value to an empty mean squared error list;
        (F) counting a number of elements in the temporary order list;
        (G) responsive to determining that the number of elements in the temporary order list is equal to zero, updating an order list based on the plurality of normality statistic values or responsive to determining that the number of elements in the temporary order list is not equal to zero, updating the order list based on at least one of the temporary order list or the mean squared error list;
        (H) repeating (A) through (H) a plurality of times; and
        (I) outputting the order list from (G) as the topological order of the DAG, wherein the topological order of the DAG is used to analyze the input data by one or more users as part of the data analytics project and transform, using the processor, the input data into output data that is meaningful for the consumption by a particular user of the one or more users, wherein the topological order of the DAG is indicative of the at least one of the cause or effect relationship that each variable of the plurality of variables has with the one or more other variables of the plurality of variables.

2. The non-transitory computer-readable medium of claim 1, wherein the computer-readable instructions cause the processor to generate the topological order of the DAG in a time period that is a function of n times faster than a topological order permutation search algorithm, wherein n is a number of the plurality of variables in each of the plurality of observation vectors.

3. The non-transitory computer-readable medium of claim 1, wherein the computer-readable instructions further cause the processor to:
generate the DAG based on the generated topological order of the DAG; and
analyze the input data based on the DAG to generate the output data.

4. The non-transitory computer-readable medium of claim 1, wherein the plurality of times is less than or equal to a number of the plurality of variables in each of the plurality of observation vectors.

5. The non-transitory computer-readable medium of claim 1, when to generate the topological order of the DAG, before (A), the computer-readable instructions cause the processor to:
(AA) initialize a first index value to zero;
(AB) initialize a second index value to zero;
(AC) initialize the order list for the plurality of variables as empty; and
(AD) compare the first index value with n, wherein n is a number of the plurality of variables in each of the plurality of observation vectors; and
(AE) responsive to determining that the first index value is less than n, create the plurality of residual series vectors in (A) or responsive to determining that the first index value is greater than or equal to n, execute (I), wherein repeating (A) through (H) comprises repeating (AD) through (H).

6. The non-transitory computer-readable medium of claim 5, wherein to create the plurality of residual series vectors in (A), the computer-readable instructions cause the processor to:
compare the second index value to zero; and
responsive to determining that the second index value is equal to zero, create a first plurality of residual series vectors based on the variable values of the plurality of variables from the plurality of observation vectors; or
responsive to determining that the second index value is greater than zero, create a second plurality of residual series vectors based on residual values calculated from the variable values of the plurality of variables whose variable index is not in the order list.

7. The non-transitory computer-readable medium of claim 6, wherein the plurality of observation vectors are arranged in a plurality of rows and a plurality of columns, wherein each row of the plurality of rows corresponds to one observation vector of the plurality of observation vectors, wherein each column of the plurality of columns corresponds to one of the plurality of variables, and wherein each of the first plurality of residual series vectors comprises the variable values from one column of the plurality of columns.

8. The non-transitory computer-readable medium of claim 6, wherein to calculate the residual values for each of the second plurality of residual series vectors, the computer-readable instructions further cause the processor to compute:

$$r_{i_m,t} = x_{i_m,t} - \widehat{x_{i_m,t}}$$

where
$r_{i_m,t}$ is the $t^{th}$ residual value of the $i_m^{th}$ residual series vector of the plurality of residual series vectors;
$t=1, \ldots, N$;
$m=1, \ldots, n-k$;
N is a number of the plurality of observation vectors;
(n–k) is a number of variables of the plurality of variables whose variable index is not in the order list;
$x_{i_m,t} = f(x_{j_1,t}, \ldots, x_{j_k,t}) + \varepsilon_{i_m,t}$, $t=1, \ldots, N$;
$\widehat{x_{i_m,t}} = \widehat{f_{ML}}(x_{j_1,t}, \ldots, x_{j_k,t})$, $t=1, \ldots, N$;
$(j_1, \ldots, j_k)$ is the order list;
$x_{i_m,t}$ is a $t^{th}$ variable value for the it variable of the plurality of variables;
$f(x_{j_1,t}, \ldots, x_{j_k,t})$ is a predictive function of projecting variables $x_{j_1}, \ldots, x_{j_k}$ on variable $x_{i_m}$;
$\varepsilon_{i_m,t}$ is an error term associated with the prediction of $x_{j_1,t}, \ldots, x_{j_k,t}$ on $x_{i_m,t}$;
$\widehat{x_{i_m,t}}$ is a $t^{th}$ predicted variable value for the $i_m^{th}$ variable of the plurality of variables; and
$\widehat{f_{ML}}(x_{j_1,t}, \ldots, x_{j_k,t})$ is a machine-learning-model-fitted function of $f(x_{j_1,t}, \ldots, x_{j_k,t})$.

9. The non-transitory computer-readable medium of claim 6, wherein a number of the first plurality of residual series vectors is equal to n, wherein a number of the second plurality of residual series vectors is less than n, and wherein each of the first plurality of residual series vectors and each of the second plurality of residual series vectors is a vector of size 1×N, where N is a number of the plurality of observation vectors.

10. The non-transitory computer-readable medium of claim 5, wherein before (H), the computer-readable instructions cause the processor to:
(GA) increment the first index value by a maximum of one or the number of elements in the temporary order list; and
(GB) increment the second index value by one.

11. The non-transitory computer-readable medium of claim 1, wherein each of the plurality of residual series vectors is computed in parallel.

12. The non-transitory computer-readable medium of claim 1, wherein the normality statistic value comprises an Anderson-Darling statistic value.

13. The non-transitory computer-readable medium of claim 12, wherein to compute the Anderson-Darling statistic value for each of the plurality of residual series vectors, the computer-readable instructions further cause the processor to compute:

$$ADS^2 = -N - S,$$

where $$S = \sum_{t=1}^{N} \frac{2t-1}{N} [\ln(\Phi(Y_t)) + \ln(1 - \Phi(Y_{N+1-t}))];$$

$Y_t$ is the $t^{th}$ value of the plurality of residual values;
$Y_{N+1-t}$ is the $(N+1-t)^{th}$ value of the plurality of residual values; and
$\Phi$ is a cumulative distribution function of a standard normal distribution.

14. The non-transitory computer-readable medium of claim 12, wherein to update the order list responsive to determining that the number of elements in the temporary order list is equal to zero, the computer-readable instructions further cause the processor to:
find a smallest value from all Anderson-Darling statistics values;
identify the variable corresponding to the smallest value; and
add the variable index of the identified variable to the order list.

15. The non-transitory computer-readable medium of claim 1, wherein to compute the mean squared error value for each of the plurality of residual series vectors, the computer-readable instructions further cause the processor to compute:

$$MSE_i = \frac{1}{N} \sum_{t=1,\ldots,N} r_{i,t}^2$$

where $r_{i,t}^2$ is the $t^{th}$ residual value from the $i^{th}$ residual series vector of the plurality of residual series vectors; and $MSE_i$ is the mean squared error value of the $i^{th}$ residual series vector of the plurality of residual series vectors.

16. The non-transitory computer-readable medium of claim 1, wherein before (D), the computer-readable instructions further cause the processor to:
(CA) initialize the temporary order list as empty; and
(CB) initialize the mean squared error list as empty.

17. The non-transitory computer-readable medium of claim 1, wherein to update the order list responsive to determining that the number of elements in the temporary order list is not equal to zero, the computer-readable instructions further cause the processor to:
responsive to determining that the number of elements in the temporary order list is equal to one, add the variable index of the variable that is in the temporary order list to the order list; or
responsive to determining that the number of elements in the temporary order list is greater than one:
sort the elements in the temporary order list based on the mean squared error values in mean square error list to obtain a sorted order; and
add the elements from the temporary order list to the order list in the sorted order.

18. The non-transitory computer-readable medium of claim 17, wherein the sorted order is an ascending order.

19. A system comprising:
a memory having computer-readable instructions stored thereon; and
a processor that executes the computer-readable instructions to:
receive input data from one or more network devices as part of a data analytics project for analyzing the input data, wherein the input data is based upon input streaming data or input non-streaming data received from the one or more network devices, wherein the input data comprises a plurality of observation vectors, each of the plurality of observation vectors comprising variable values of a plurality of variables, and wherein each of the plurality of variables is associated with a unique variable index; and
determine at least one of a cause or effect relationship that each variable of the plurality of variables has with one or more other variables of the plurality of variables by generating, using machine learning, a topological order of a directed acyclic graph (DAG) by:
(A) creating a plurality of residual series vectors, each of the plurality of residual series vectors associated with one variable of the plurality of variables;
(B) calculating a normality statistic value for each of the plurality of residual series vectors to obtain a plurality of normality statistic values;
(C) calculating a mean squared error value for each of the plurality of residual series vectors;
(D) comparing each of the plurality of normality statistic values with a predefined critical value;
(E) for each value of the plurality of normality statistic values that is less than or equal to the predefined critical value, adding (a) the variable index of the variable of the plurality of variables associated with the value to an empty temporary order list; and (b) the mean squared error value of the variable of the plurality of variables associated with the value to an empty mean squared error list;
(F) counting a number of elements in the temporary order list;
(G) responsive to determining that the number of elements in the temporary order list is equal to zero, updating an order list based on the plurality of normality statistic values or responsive to determining that the number of elements in the temporary order list is not equal to zero, updating the order list based on at least one of the temporary order list or the mean squared error list;
(H) repeating (A) through (H) a plurality of times; and
(I) outputting the order list from (G) as the topological order of the DAG, wherein the topological order of the DAG is used to analyze the input data by one or more users as part of the data analytics project and transform, using the processor, the input data into output data that is meaningful for the consumption by a particular user of the one or more users, wherein the topological order of the DAG is indicative of the at least one of the cause or effect relationship that each variable of the plurality of variables has with the one or more other variables of the plurality of variables.

20. The system of claim 19, when to generate the topological order of the DAG, before (A), the computer-readable instructions cause the processor to:
(AA) initialize a first index value to zero;
(AB) initialize a second index value to zero;
(AC) initialize the order list for the plurality of variables as empty; and
(AD) compare the first index value with n, wherein n is a number of the plurality of variables in each of the plurality of observation vectors; and
(AE) responsive to determining that the first index value is less than n, create the plurality of residual series vectors in (A) or responsive to determining that the first index value is greater than or equal to n, execute (I), wherein repeating (A) through (H) comprises repeating (AD) through (H).

21. The system of claim 20, wherein to create the plurality of residual series vectors in (A), the computer-readable instructions cause the processor to:
compare the second index value to zero; and
responsive to determining that the second index value is equal to zero, create a first plurality of residual series vectors based on the variable values of the plurality of variables from the plurality of observation vectors, wherein the plurality of observation vectors are arranged in a plurality of rows and a plurality of columns, wherein each row of the plurality of rows corresponds to one observation vector of the plurality of observation vectors, wherein each column of the plurality of columns corresponds to one of the plurality of variables, and wherein each of the first plurality of residual series vectors comprises the variable values from one column of the plurality of columns; or
responsive to determining that the second index value is greater than zero, create a second plurality of residual series vectors based on residual values calculated from the variable values of the plurality of variables whose variable index is not in the order list, wherein a number of the first plurality of residual series vectors is equal to n, wherein a number of the second plurality of residual series vectors is less than n, and wherein each of the first plurality of residual series vectors and each of the second plurality of residual series vectors is a vector of size 1×N, where N is a number of the plurality of observation vectors.

22. The system of claim 21, wherein to calculate the residual values for each of the second plurality of residual series vectors, the computer-readable instructions further cause the processor to compute:

$$r_{i_m,t} = x_{i_m,t} - \widehat{x_{i_m,t}}$$

where $r_{i_m,t}$ is the $t^{th}$ residual value of the it residual series vector of the plurality of residual series vectors;

t=1, ..., N;

m=1, ..., n–k;

N is a number of the plurality of observation vectors;

(n–k) is a number of variables of the plurality of variables whose variable index is not in the order list;

$x_{i_m,t}$ $f(x_{j_1,t}, \ldots, x_{j_k,t}) + \varepsilon_{i_m,t}$, t=1, ..., N;

$\widehat{x_{i_m,t}} = \widehat{f_{ML}}(x_{j_1,t}, \ldots, x_{j_k,t})$, t=1, ..., N;

$(j_1, \ldots, j_k)$ is the order list;

$x_{i_m,t}$ is a $t^{th}$ variable value for the it variable of the plurality of variables;

$f(x_{j_1,t}, \ldots, x_{j_k,t})$ is a predictive function of projecting variables $x_{j_1}, \ldots, x_{j_k}$ on variable $x_{i_m}$;

$\varepsilon_{i_m,t}$ is an error term associated with the prediction of $x_{j_1,t}, \ldots, x_{j_k,t}$ on $x_{i_m,t}$;

$\widehat{x_{i_m,t}}$ is a $t^{th}$ predicted variable value for the $i_m^{th}$ variable of the plurality of variables; and $\widehat{f_{ML}}(x_{j_1,t}, \ldots, x_{j_k,t})$ is a machine-learning-model-fitted function of $f(x_{j_1,t}, \ldots, x_{j_k,t})$.

23. The system of claim 20, wherein before (H), the computer-readable instructions cause the processor to:

(GA) increment the first index value by a maximum of one or the number of elements in the temporary order list; and (GB) increment the second index value by one.

24. The system of claim 19, wherein the normality statistic value comprises an Anderson-Darling statistic value, and wherein to compute the Anderson-Darling statistic value for each of the plurality of residual series vectors, the computer-readable instructions further cause the processor to compute:

$$ADS^2 = N - S,$$

where $$S = \sum_{t=1}^{N} \frac{2t-1}{N}[\ln(\Phi(Y_t)) + \ln(1 - \Phi(Y_{N+1-t}))];$$

$Y_t$ is the $t^{th}$ value of the plurality of residual values;

$Y_{N+1-t}$ is the $(N+1-t)^{th}$ value of the plurality of residual values; and $\Phi$ is a cumulative distribution function of a standard normal distribution; and wherein to update the order list responsive to determining that the number of elements in the temporary order list is equal to zero, the computer-readable instructions further cause the processor to:

find a smallest value from all Anderson-Darling statistics values;

identify the variable corresponding to the smallest value; and add the variable index of the identified variable to the order list.

25. The system of claim 19, wherein to compute the mean squared error value for each of the plurality of residual series vectors, the computer-readable instructions further cause the processor to compute:

$$MSE_i = \frac{1}{N} \sum_{t=1,\ldots,N} r_{i,t}^2$$

where $r_{i,t}^2$ is the $t^{th}$ residual value from the $i^{th}$ residual series vector of the plurality of residual series vectors; and $MSE_i$ is the mean squared error value of the $i^{th}$ residual series vector of the plurality of residual series vectors.

26. A method comprising:

receiving, by a processor executing computer-readable instructions stored on a memory, input data from one or more network devices as part of a data analytics project for analyzing the input data, wherein the input data is based upon input streaming data or input non-streaming data received from the one or more network devices, wherein the input data comprises a plurality of observation vectors, each of the plurality of observation vectors comprising variable values of a plurality of variables, and wherein each of the plurality of variables is associated with a unique variable index;

determining at least one of a cause or effect relationship that each variable of the plurality of variables has with one or more other variables of the plurality of variables by generating, using machine learning, a topological order of a directed acyclic graph (DAG) by:

(A) creating, by the processor, a plurality of residual series vectors, each of the plurality of residual series vectors associated with one variable of the plurality of variables;

(B) calculating, by the processor, a normality statistic value for each of the plurality of residual series vectors to obtain a plurality of normality statistic values;

(C) calculating, by the processor, a mean squared error value for each of the plurality of residual series vectors;

(D) comparing, by the processor, each of the plurality of normality statistic values with a predefined critical value;

(E) for each value of the plurality of normality statistic values that is less than or equal to the predefined critical value, adding, by the processor, (a) the variable index of the variable of the plurality of variables associated with the value to an empty temporary order list;

and (b) the mean squared error value of the variable of the plurality of variables associated with the value to an empty mean squared error list;

(F) counting, by the processor, a number of elements in the temporary order list;

(G) responsive to determining that the number of elements in the temporary order list is equal to zero, updating, by the processor, an order list based on the plurality of normality statistic values or responsive to determining that the number of elements in the temporary order list is not equal to zero, updating the order list based on at least one of the temporary order list or the mean squared error list;

(H) repeating, by the processor, (A) through (H) a plurality of times; and (I) outputting, by the processor, the order list from (G) as the topological order of the DAG, wherein the topological order of the DAG is used to analyze the input data by one or more users as part of the data analytics project and transform, using the processor, the input data into output data that is meaningful for the consumption by a particular user of the one or more users, wherein the topological order of the DAG is indicative of the at least one of the cause or effect relationship that each variable of the plurality of variables has with the one or more other variables of the plurality of variables.

27. The method of claim 26, wherein to update the order list responsive to determining that the number of elements in the temporary order list is not equal to zero, the method further comprises:

responsive to determining that the number of elements in the temporary order list is equal to one, adding, by the processor, the variable index of the variable that is in the temporary order list to the order list; or responsive to determining that the number of elements in the temporary order list is greater than one:
sorting, by the processor, the elements in the temporary order list based on the mean squared error values in mean square error list to obtain a sorted order, wherein the sorted order is an ascending order; and
adding, by the processor, the elements from the temporary order list to the order list in the sorted order.

* * * * *